United States Patent
Yoshida

(10) Patent No.: US 11,150,392 B2
(45) Date of Patent: Oct. 19, 2021

(54) OPTICAL ELEMENT AND PRODUCTION METHOD FOR OPTICAL ELEMENT

(71) Applicant: OSAKA UNIVERSITY, Osaka (JP)

(72) Inventor: Hiroyuki Yoshida, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 216 days.

(21) Appl. No.: 16/463,676

(22) PCT Filed: Nov. 15, 2017

(86) PCT No.: PCT/JP2017/041117
§ 371 (c)(1),
(2) Date: May 23, 2019

(87) PCT Pub. No.: WO2018/097007
PCT Pub. Date: May 31, 2018

(65) Prior Publication Data
US 2020/0271842 A1    Aug. 27, 2020

(30) Foreign Application Priority Data
Nov. 24, 2016 (JP) .............................. JP2016-227847

(51) Int. Cl.
*G02B 5/30* (2006.01)
*G02B 5/18* (2006.01)
(Continued)

(52) U.S. Cl.
CPC ......... *G02B 5/3066* (2013.01); *G02B 5/1833* (2013.01); *G02F 1/133553* (2013.01);
(Continued)

(58) Field of Classification Search
CPC .. G02B 5/1833; G02B 5/3066; G02B 5/3083; G02F 2201/343
(Continued)

(56) References Cited

U.S. PATENT DOCUMENTS 6,734,936 B1    5/2004    Schadt et al.
7,292,292 B2   11/2007    Schadt et al.
(Continued)

FOREIGN PATENT DOCUMENTS

JP    H08-297280 A    11/1996
JP    H11-231304 A     8/1999
(Continued)

OTHER PUBLICATIONS

International Search Report issued in PCT/JP2017/041117; dated Feb. 6, 2018.
(Continued)

*Primary Examiner* — Ricky D Shafer
(74) *Attorney, Agent, or Firm* — Studebaker & Brackett PC

(57) ABSTRACT

An optical element 1 includes a first layer (A1) and a second layer (A2) that faces the first layer (A1). The first layer (A1) includes a plurality of first structural bodies (B1) that each have optical anisotropy. In reflection of light entering from the first layer (A1), the second layer (A2) reflects the light while maintaining a polarization state of the light at incidence and at the reflection. The first layer (A1) changes, according to directions of orientation of the first structural bodies (B1), a phase of the light from a phase at incidence to the first layer (A1) from outside of the first layer (A1) to a phase at output from the first layer (A1) toward the second layer (A2). The first layer (A1) changes the phase of the light from a phase at incidence to the first layer (A1) from the second layer (A2) to a phase at output from the first layer (A1) toward the outside of the first layer (A1) according to the directions of orientation of the first structural bodies (B1).

18 Claims, 30 Drawing Sheets

(51) Int. Cl.
    *G02F 1/1335*     (2006.01)
    *G02F 1/1337*     (2006.01)
    *G02F 1/29*     (2006.01)

(52) U.S. Cl.
    CPC .......... *G02F 1/133753* (2013.01); *G02F 1/29* (2013.01); *G02F 1/133557* (2021.01); *G02F 1/133757* (2021.01); *G02F 2201/343* (2013.01)

(58) Field of Classification Search
    USPC .................................................. 359/489.07
    See application file for complete search history.

(56) References Cited

U.S. PATENT DOCUMENTS

| | | | |
|---|---|---|---|
| 7,679,701 | B2 | 3/2010 | Schadt et al. |
| 7,787,080 | B2 | 8/2010 | Umeya |
| 8,168,080 | B2 * | 5/2012 | Hoshino .............. B42D 25/328 252/299.01 |
| 8,553,196 | B2 | 10/2013 | Schadt et al. |
| 8,830,425 | B2 | 9/2014 | Schadt et al. |
| 8,908,131 | B2 * | 12/2014 | Kitson .............. G02F 1/133553 349/115 |
| 8,970,953 | B2 | 3/2015 | Hoshino et al. |
| 9,046,729 | B2 | 6/2015 | Valyukh et al. |
| 9,643,445 | B2 | 5/2017 | Schadt et al. |
| 10,564,336 | B2 * | 2/2020 | Yoshida .............. G02B 5/0252 |
| 2002/0021392 | A1 | 2/2002 | Ohtake et al. |
| 2003/0160923 | A1 * | 8/2003 | Ma ..................... G02F 1/13718 349/115 |
| 2004/0189908 | A1 * | 9/2004 | Kawamoto ......... G02F 1/13362 349/117 |
| 2004/0252259 | A1 | 12/2004 | Schadt et al. |
| 2005/0254113 | A1 * | 11/2005 | Cirkel .................... G02B 30/25 359/259 |
| 2006/0152656 | A1 * | 7/2006 | Kashima .............. G02B 5/3016 349/113 |
| 2006/0171030 | A1 | 8/2006 | Umeya |
| 2006/0232734 | A1 | 10/2006 | Schadt et al. |
| 2008/0089073 | A1 | 4/2008 | Hikmet |
| 2008/0098488 | A1 | 4/2008 | Schadt et al. |
| 2010/0118256 | A1 | 5/2010 | Schadt et al. |
| 2010/0231847 | A1 | 9/2010 | Escuti |
| 2012/0236292 | A1 | 9/2012 | Hoshino et al. |
| 2014/0002780 | A1 | 1/2014 | Schadt et al. |
| 2014/0340626 | A1 | 11/2014 | Schadt et al. |
| 2016/0033698 | A1 | 2/2016 | Escuti et al. |
| 2016/0275884 | A1 | 9/2016 | Cho et al. |
| 2018/0164627 | A1 * | 6/2018 | Oh ........................... G02F 1/29 |

FOREIGN PATENT DOCUMENTS

| | | |
|---|---|---|
| JP | 2000-193962 A | 7/2000 |
| JP | 2001-183644 A | 7/2001 |
| JP | 2001-525080 A | 12/2001 |
| JP | 2005-003758 A | 1/2005 |
| JP | 2006-208786 A | 8/2006 |
| JP | 2008-522208 A | 6/2008 |
| JP | 2011-123257 A | 6/2011 |
| JP | 2014-002298 A | 1/2014 |
| JP | 2016-173570 A | 9/2016 |
| WO | 2011/065242 A1 | 6/2011 |
| WO | 2016/019123 A1 | 2/2016 |

OTHER PUBLICATIONS

Junji Kobashi et al.; "Planar Optics with Patterned Chiral Liquid Crystals"; nature photonics; Jun. 2016; pp. 389-392; vol. 10, No. 6; published online, Apr. 11, 2016.

Extended European Search Report issued by the European Patent Office dated Oct. 29, 2019, which corresponds to EP17874801.8-1210 and is related to U.S. Appl. No. 16/463,676.

Junji Kobashi, Hiroyuki Yoshida, and Masanori Ozaki, "Polychromatic Optical Vortex Generation from Patterned Cholesteric Liquid Crystals", Physical Review Letters, vol. 116, No. 25, Jun. 1, 2016, pp. 1-5.

R. K. Komanduri and M. J. Escuti, "High efficiency reflective liquid crystal polarization gratings", Applied Physics Letters, AIP Publishing LLC, US, vol. 95, No. 9, Sep. 3, 2009, pp. 1-3.

* cited by examiner

OPTICAL ELEMENT AND PRODUCTION METHOD FOR OPTICAL ELEMENT

TECHNICAL FIELD

The present invention relates to an optical element and a production method for the optical element.

BACKGROUND ART

Patent Literature 1 discloses an optical modulator. The optical modulator includes a liquid crystal layer. The liquid crystal layer includes a plurality of liquid crystal molecules. The liquid crystal molecules are nematic liquid crystal molecules. The optical modulator functions as a half-wavelength plate to change a direction of circularly polarizing light of incident light. That is, when left circularly-polarized light enters the optical modulator, right circularly-polarized light is output.

CITATION LIST

Patent Literature

[Patent Literature 1]
Japanese Patent Application Laid-Open Publication No. 2016-173570

SUMMARY OF INVENTION

Technical Problem

However, an amount of phase change of light output from the liquid crystal layer (i.e., an amount of phase modulation) is relatively small with respect to an amount of change in directions of orientation of the liquid crystal molecules in the optical modulator disclosed in Patent Literature 1.

The present invention has its object of providing an optical element and a production method for the optical element that can make an amount of phase change of output light relatively large.

Solution to Problem

An optical element according to the first aspect of the present invention includes a first layer and a second layer that faces the second layer. The first layer includes a plurality of first structural bodies each have optical anisotropy. In reflection of light entering from the first layer, the second layer reflects the light while maintaining a polarization state of the light at incidence and at the reflection.

In the optical element according to the present invention, the first layer is preferable that changes, according to directions of orientation of the first structural bodies, a phase of the light at output from the first layer toward the second layer relative to the phase at incidence to the first layer from outside of the first layer and that changes, according to the directions of orientation of the first structural bodies, the phase of the light at output from the first layer toward the outside of the first layer relative to the phase at incidence to the first layer from the second layer.

In the optical element according to the present invention, in transmission of light entering through the first layer, the second layer preferably transmits the light while maintaining a polarization state of the light at incidence and at emission.

In the optical element according to the present invention, the first layer preferably has a retardation of no less than $3\lambda c(2m+1)/8$ and no greater than $5\lambda c(2m+1)/8$. $\lambda c$ represents a wavelength of the light incident to the first layer, and it is preferable that m represents an integer of equal to or greater than 0.

In the optical element according to the present invention, m is preferably 0.

The optical element according to the present invention preferably further includes electrode units. The electrode units preferably each apply a voltage to a corresponding one or more first structural bodies of the first structural bodies. The voltage is for controlling directions of orientation of the corresponding one or more first structural bodies.

In the optical element according to the present invention, the first layer includes plural first structural bodies of the first structural bodies. The plural structural bodies differ from one another in direction of orientation.

In the optical element according to the present invention, it is preferable that the first layer outputs the light reflected by the second layer toward outside of the first layer to form an image of an object corresponding to the light.

In the optical element according to the present invention, the first layer preferably forms a structurer in which orientation order is set in one direction for each of the first structural bodies.

In the optical element according to the present invention, the second layer preferably includes a plurality of second structural bodies each forming a helix.

The optical element according to the present invention preferably further includes a third layer that faces the second layer. The third layer preferably includes a plurality of third structural bodies each having optical anisotropy. The second layer is preferably disposed between the first layer and the third layer.

In the optical element according to the present invention, the second layer preferably includes a ¼ wavelength layer and a reflection layer. The ¼ wavelength layer preferably faces the first layer. The reflection layer preferably faces the ¼ wavelength layer and reflects light. The ¼ wavelength layer preferably has a retardation equal to a ¼ wavelength of the light.

According to a second aspect of the present invention, the optical element is produced by a production method for an optical element. The production method includes forming a first layer and forming a second layer. The first layer includes a plurality of first structural bodies that each have optical anisotropy. In reflection of light, the second layer reflects the light while maintaining a polarization state of the light at incidence and at reflection.

The production method for an optical element according to the present invention preferably further includes: generating object data representing an object; generating first orientation data representing distribution of directions of orientation of the first structural bodies based on the object data; generating second orientation data based on the first orientation data. The second orientation data is used for determining either or both a surface structure and a surface property of an alignment layer that orients the first structural bodies. In the forming the first layer, the first layer is preferably formed based on the second orientation data.

Advantageous Effects of Invention

According to the present invention, the amount of phase change of output light can be relatively increased.

DESCRIPTION OF EMBODIMENTS

Figure 1:
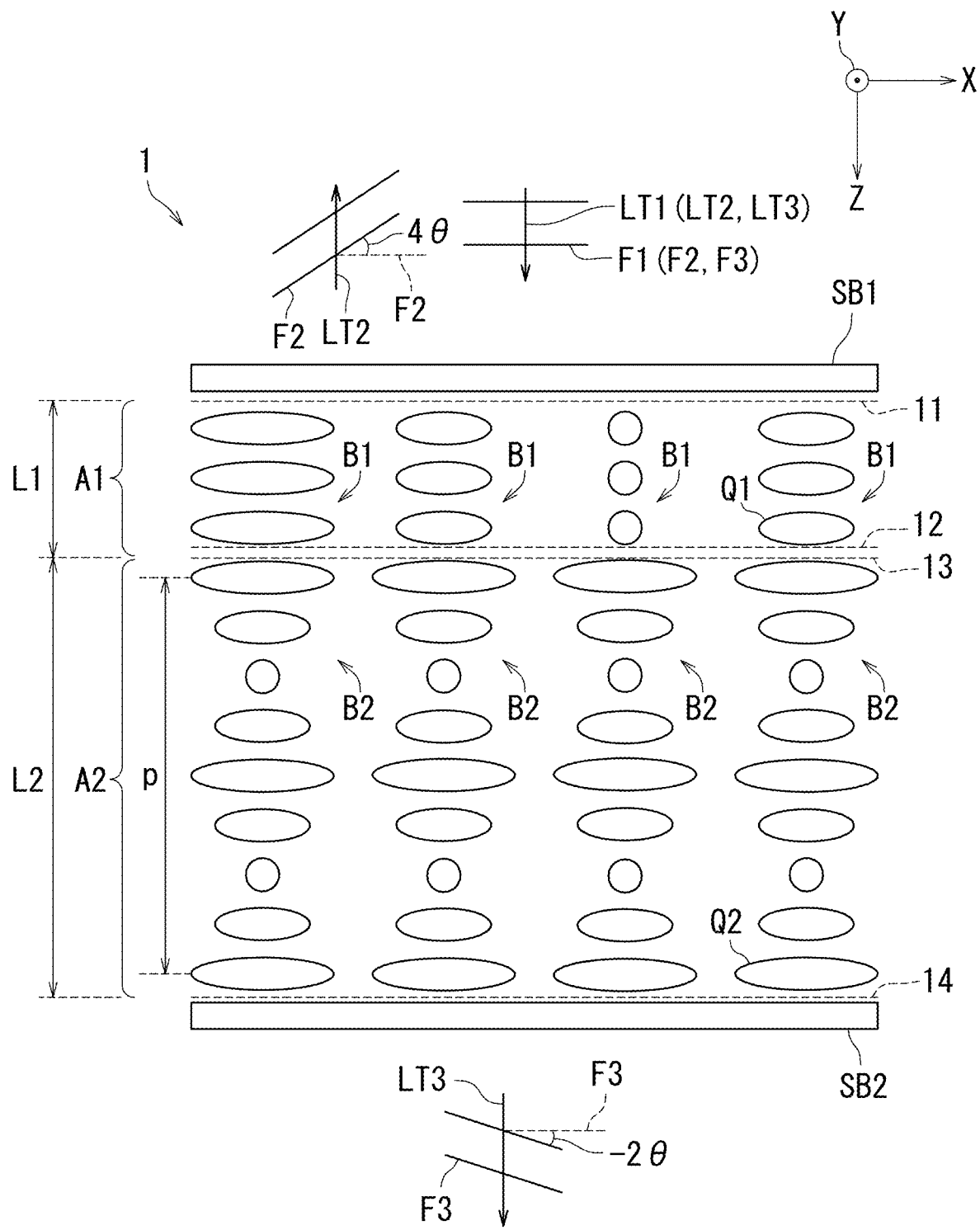
FIG. 1 is a cross-sectional view illustrating an optical element according to Embodiment 1 of the present invention.

Embodiments of the present invention will be described with reference to the accompanying drawings. The description with reference to the drawings uses a three-dimensional Cartesian coordinate system including an X-axis, a Y-axis, and a Z-axis orthogonal to one another. A Z direction (first direction) is a positive direction along the Z-axis. An X direction (second direction) is a positive direction along the X-axis. A Y direction (third direction) is a positive direction along the Y-axis. The X direction, the Y direction, and the Z direction are orthogonal to one another. Note that elements that are the same or equivalent are indicated by the same reference signs in the drawings and description thereof is not repeated. Furthermore, in order to simplify the drawings, hatched lines indicating cross-sections are omitted as appropriate.

Embodiment 1

FIG. 1 is a cross-sectional view illustrating an optical element 1 according to Embodiment 1 of the present invention. As illustrated in FIG. 1, the optical element 1 includes a first layer A1, a second layer A2, a substrate SB1, and a substrate SB2. The second layer A2 faces the first layer A1. The first layer A1 has a first boundary surface 11 and a second boundary surface 12 opposite to each other. The second layer A has a third boundary surface 13 and a fourth boundary surface 14 opposite to each other. The second boundary surface 12 and the third interface 13 face each other. The second boundary surface 12 and the third interface 13 are for example in contact with each other. The first boundary surface 11, the second boundary surface 12, the third boundary surface 13, and the fourth boundary surface 14 are perpendicular to the Z direction. The first layer A1 and the second layer A2 are located between the substrate SB1 and the substrate SB2. The first layer A1 faces the substrate SB1, while the second layer A2 faces the substrate SB2. The first boundary surface 11 faces the substrate SB1, while the fourth boundary surface 14 faces the substrate SB2. Each of the substrates SB1 and SB2 is for example a glass substrate.

Specifically, the first layer A1 is a liquid crystal layer formed of nematic liquid crystal. The nematic liquid crystal corresponds to a nematic phase. In the above configuration, the first layer A1 forms a structure having orientation order with respect to one direction for each of the first structural bodies B1.

The first layer A1 has a thickness L1. The thickness L1 is a thickness in the Z direction. The first layer A1 includes a plurality of first structural bodies B1. The first structural bodies B1 form nematic liquid crystal. Each of the first structural bodies B1 extends in the Z direction. Each of the first structural bodies B1 includes a plurality of first elements Q1 successive in the Z direction. Each of the first elements Q1 is a liquid crystal molecule. Each of the first elements Q1 is in a rod-like shape, for example. Note that although a limited number of first elements Q1 are illustrated in order to simplify the drawings of the present application, multiple first elements Q1 are successive in each of the first structural bodies B1.

Directions of orientation of the first elements Q1 are identical in each of the first structural bodies B1. Accordingly, the directions of orientation of the first elements Q1 in each of the first structural bodies B1 indicate a direction of orientation of the first structural body B1. The directions of orientation of the first elements Q being identical mean that the directions of orientation of the first elements Q1 are substantially parallel to one another. Therefore, the directions of orientation of the first elements Q1 being identical to one another mean both a case where the directions of orientation of the first elements Q1 are substantially the same as one another and a case where the directions of orientation of the first elements Q1 differ from one another by approximately 180 degrees.

Specifically, since the directions of orientation of the first elements Q1 fluctuate temporally and spatially, the directions of orientation of the first elements Q1 being identical in each of the first structural bodies B1 mean that directions of a plurality of directors are identical in each of the first structural bodies B1.

That is, in the drawings of the present application, one first element Q1 of a plurality of first elements Q1 located on one plane perpendicular to the Z direction represents first elements oriented along a director in order to simplify the drawings. Accordingly, in each of the first structural bodies B1, a plurality of first elements including the one first element Q1 (also referred to below as a "first element group") are located on a plane perpendicular to the Z direction. The first elements being located on the plane includes both a case where the first elements are located on the plane in a posture substantially parallel to the plane and a case where the first elements intersect with the plane in a posture inclining with respect to the plane.

The term a director herein is a unit vector that represents the average direction of orientation of the first elements included in the first element group. The director is determined for each of first element groups.

In each of the first structural bodies B1, the first element groups are aligned in the Z direction and the directors of the first element groups are identical. Therefore, in each of the first structural bodies B1, the directions of the directors of the first element groups indicate a direction of orientation of the first structural body B1. The directors of the first element groups being identical means that the directors of the first element groups are substantially parallel to one another. Therefore, the directors of the first element groups being identical indicates both a case where the directions of the directors of the first elements groups are substantially the same as one another and a case where the directions of the directors of the first element groups differ from one another by approximately 180 degrees.

Furthermore, the directors of the first element groups being identical in each first structural body B1 includes a case where directors arranged in the Z direction slightly differ from one another. For example, when the directions of orientation of the first structural bodies B1 are set by changing the direction of orientation of a first element group located in the vicinity of the first boundary surface 11 to make the directions of orientation of first element groups other than the first element group located in the vicinity of the first boundary surface 11 to follow to the changed direction, the direction of a director in the vicinity of the first boundary surface 11 may slightly differ from the direction of a director in the vicinity of the second boundary surface 12 depending on an alignment method, resulting in exhibition of minute distribution in the directors in the Z direction. Even a case with such minute distribution is equivalent to a case where the directors of the first element groups are identical.

As described above, the directions of orientation of the first elements Q1 (specifically, directors of the first element groups) in each first structural body B1 being identical is equivalent to a case where the first layer A1 forms a structural body in which orientation order is set in one direction for each of the first structural bodies B1.

Each first structural body B1 changes the phase of light at output from the first structural body B1 relative to the phase of light at incidence to the first structural body B1 according to the direction of orientation of the first structural body B1, that is, the direction of orientation of the first elements Q1.

Specifically, a plurality of light fluxes constituting light enters the respective first structural bodies B1. The first structural bodies B1 output the light fluxes while differentiating phases of the light fluxes from one another according to the directions of orientation. As a result, the phase of the light at output varies relative to the phase of the light at incidence.

Unless otherwise explicitly stated, the directions of orientation of the first structural bodies B1 are fixed so as to differ from one another in Embodiment 1. However, the directions of orientation of the first structural bodies B1 may be identical in an initial state of the optical element 1. As such, the directions of orientation of the first structural bodies B1 may be dynamically controlled to differ from one another.

Each first structural body B1 has optical anisotropy. That is, each first structural body B1 induces birefringence for light. Phase difference is accordingly caused between extraordinary light and ordinary light in each of the first structural bodies B1. As a result, each first structural body B1 changes the polarization state of light at output from the first structural body B1 relative to the polarization state of light at incidence to the first structural body B1. The polarization state of light is determined with reference to the propagation direction of the light. Note that the optical anisotropy is for example uniaxial anisotropy.

Specifically, birefringence by a first element Q1 is expressed by $\Delta n1$ $(=ne1-no1)$, where ne1 represents a refractive index of the first element Q1 for extraordinary light and no1 represents a refractive index of the first element Q1 for ordinary light. The polarization state of light at output changes relative to the polarization state of light at incidence according to the birefringence $\Delta n1$. Therefore, when a plurality of light fluxes constituting light enter the respective first structural bodies B1, the first structural bodies B1 change the polarization states of the respective light fluxes according to the birefringence $\Delta n1$. As a result, the polarization state of the light at light output is changed from the polarization state of the light at light incidence. The polarization states of the light fluxes are determined with reference to the propagation direction of the light.

For example, all of the first elements Q1 in the first layer A1 have the same birefringence $\Delta n1$. Therefore, the polarization states of the light fluxes output from the respective first structural bodies B1 are the same as one another. For example, when the first layer A1 functions as a half-wavelength plate, each first structural body B1 changes a light flux of right circularly polarized light to a light flux of left circularly polarized light, and outputs the light flux of the left circularly polarized light.

The light fluxes output from the respective first structural bodes B1 are the same as one another in the polarization state but are different from one another in phase according to the directions of orientation of the first structural bodies B1. Note that the first elements Q1 may have different birefringences $\Delta n1$, for example.

As described above, the first layer A1 changes the polarization state of light at output from the first layer A1 toward the second layer A2 relative to the polarization state of light at incidence to the first layer A from outside of the first layer A1 according to the birefringence of the first structural bodies B1. Furthermore, the first layer A1 changes the polarization state of light at output from the first layer A toward the outside of the first layer A1 relative to the polarization state of light at incidence to the first layer A from the outside of the first layer A1 according to the birefringence of the first structural bodies B1.

In addition, the first layer A1 changes, according to the directions of orientation of the first structural bodies B1, the phase of light at output from the first layer A1 toward the second layer A2 relative to the phase of light at incidence to the first layer A2 from the outside of the first layer A1. The first layer A1 accordingly can change, according to the directions of orientation of the first structural bodies B1, for example the wavefront of light at output toward the second layer A2 from the first layer A1 relative to the wavefront of light at incidence to the first layer A1 from the outside of the first layer A1. Furthermore, the first layer A1 changes, according to the directions of orientation of the first structural bodies B1, the phase of light at output from the first layer A1 toward the outside of the first layer A1 relative to the phase of light at incidence to the first layer A1 from the second layer A2. The first layer A1 accordingly can change, according to the directions of orientation of the first structural bodies B1, for example the wavefront of light at output from the first layer A1 toward the outside of the first layer A1 relative to the wavefront of light at incidence to the first layer A1 from the second layer A2.

By contrast, the second layer A2 reflects a portion of light output from the first layer A1 while transmitting the other portion of the light. Note that the second layer A2 may reflect or transmit all portions of the light output from the first layer A1.

The second layer A2 has a thickness L2. The thickness L2 is a thickness in the Z direction. The second layer A2 is a liquid crystal layer and is formed of cholesteric liquid crystal in Embodiment 1. The cholesteric liquid crystal is equivalent to a cholesteric phase. The cholesteric phase is an example of a chiral liquid crystal phase. The cholesteric liquid crystal has a structure in which elongated liquid crystal molecules are arranged with long axes thereof parallel to one another within a plane, and the direction of orientation thereof twists gradually from upstream to downstream in a direction perpendicular to the plane to form a helix.

The second layer A2 is formed of cholesteric liquid crystal. Therefore, in a situation in which the second layer A2 reflects light entering through the first layer A1 (e.g., circularly polarized light), the second layer A2 reflects the light while maintaining the polarization state of the light at incidence and at output. By contrast, the second layer A2 is formed of a cholesteric liquid crystal. In a situation in which the second layer A2 transmits light entering through the first layer A1 (e.g., circularly polarized light), the second layer A2 transmits the light while maintaining the polarization state of the light at incidence and at output. Furthermore, in a situation in which arbitrary polarized light is incident, the polarized light is divided into a right circularly polarized light component and a left circularly polarized light component. The right circularly polarized light component is reflected or transmitted according to the helical twist direction of helices of the cholesteric liquid crystal, and the left circularly polarized light component is reflected or transmitted according to the helical twist direction of the helices of the cholesteric liquid crystal.

The phrase "maintaining the polarization state of light" in claims and the specification of the present patent application means that a polarization state of light is substantially maintained. The "polarization state of light being substantially maintained" includes a case where the polarization state of the light is almost maintained in addition to a case where the polarization state of the light is maintained in the strict sense. For example, in light reflection, when the polarization state of light is changed between before incidence and after reflection (specifically, between in a forward light path and in a backward light path of the light in the first layer A1) within a range in which the direction of phase change of the light relative to a propagation direction of the light does not vary, the polarization state of the light is substantially maintained. For example, in light transmission, when the polarization state of light is changed between before incidence and after output (specifically, in a forward light path and in a backward light path of the light in the first layer A1) within a range in which the direction of phase change of the light relative to a propagation direction of the light does not vary, the polarization state of the light is substantially maintained.

For example, in reflection of circularly polarized light or elliptically polarized light, when the direction of circulation of the circularly polarized light or the elliptically polarized light with respect to the propagation direction of the light is maintained at incidence and at reflection of the light, that is, when the direction of circulation is not changed, the polarization state of the light is substantially maintained. In transmission, also, the polarization state of the light is substantially maintained when the direction of circulation is maintained, that is, the direction of circulation is not changed.

In reflection of linearly polarized light, the polarization state of light is substantially maintained for example when the linearly polarized light is maintained at incidence and at output of the light, that is, the linearly polarized light is not changed to circularly polarized light. In transmission, also, the polarization state of the light is substantially maintained when the linearly polarized light is maintained, that is, when the linearly polarized light is not changed to circularly polarized light.

For example, in reflection of linearly polarized light, when a direction of oscillation of the linearly polarized light varies by less than 45 degrees between at incidence and at reflection of the light, the polarization state of the light is substantially maintained. The same is applied to a case of transmission. For example, the direction of oscillation of linearly polarized light varies preferably by less than 35 degrees, more preferably by less than 25 degrees, further preferably by less than 15 degrees, and particularly preferably by less than 5 degrees.

The second layer A2 includes a plurality of second structural bodies B2. Each of the second structural bodies B2 is helical. The second structural bodies B2 form cholesteric liquid crystal. Each of the second structural bodies B2 extends in the Z direction. Each of the second structural bodies B2 includes a plurality of second element Q2 stacked in a twisted manner in the Z direction to form a helix. The second elements Q2 are liquid crystal molecules. Each of the second elements Q2 is in a rod-like shape, for example. Helix axes of the second structural bodies B2 extend in the Z direction. Note that although a limited number of the second elements Q2 are illustrated in order to simplify the drawings in the present application, multiple second elements Q2 are successive in each of the second structural bodies B2.

Specifically, in the drawings of the present application, one second element Q2 of a plurality of second elements Q2 located on one plane perpendicular to the Z direction represents second elements Q2 that extend in the direction of directors in order to simplify the drawings. Accordingly, in each of the second structural bodies B2, a plurality of second elements including the one second element Q2 (also referred to below as a "second element group") are located on a plane perpendicular to the Z direction. The second elements being located on a plane includes a case where the second elements are located across the plane in an inclined posture with respect to the plane in addition to a case where the second elements are located on the plane in a posture substantially parallel to the plane.

In each of the second structural bodies B2, a plurality of second element groups are arranged in the Z direction while gradually twisting their directions of orientation to form a helix. That is, the directors twist in a helical manner along a corresponding helix axis in each of the second structural bodies B2. The term a director is a unit vector that represents an average direction of orientation of second elements included in a second element group. The director is determined for each of the second element groups.

Each second structural body B2 has a pitch p. The pitch p represents a period of one helix in the second structural body B2. Therefore, a second element Q2 located at one end of two ends of one period of a helix twists by approximately 360 degrees with respect to a second element Q2 located at the other end of the helix in each second structural body B2. That is, the direction of orientation of the second element Q2 located at the one end thereof is identical to and substantially parallel to the direction of orientation of the second element Q2 located at the other end thereof. The directions of orientation of the second elements Q2 on respective planes perpendicular to the Z direction are identical to and substantially parallel to one another across the second structural bodies B2. That is, the directions of orientation of adjacent second elements Q2 are identical to and substantially parallel to each other on each plane perpendicular to the Z direction. In other words, spatial phases of the second structural bodies B2 are the same as one another. The helical directions of helices of the respective second structural bodies B2 are the same as one another. The directions of orientation of the second structural bodies B2 are fixed. The directions of orientation of the second elements Q2 on respective planes perpendicular to the Z direction may not be identical to one another across the second structural bodies B2. That is, the spatial phases of the second structural bodies B2 are not limited to being the same as one another and may differ from one another.

Each of the second structural bodies B2 reflects light that has a wavelength in a band according to structure and optical properties of the second structural body B2 (also referred to below as a "selective reflection band") and that is in a polarization state corresponding to the helical direction of the helix of the second structural body B2. Such light reflection may be referred to as selective reflection, and a characteristic of selective reflection may be referred to as selective reflectivity. Furthermore, each of the second structural bodies B2 transmits light in a polarization state contrary to the helical direction of the helix of the second structural body B2.

Specifically, selective reflection is as follows. That is, each of the second structural bodies B2 reflects light having a wavelength in a band according to the pitch p of the helix of the second structural body B2 and the refractive index of the second structural body B2 and having circular polarization in a direction of circulation that is the same direction as the helical direction of the helix of the second structural body B2. More specifically, each of the second structural bodies B2 reflects light having a wavelength in a band between "no2×p" and "ne2×p" and having circular polarization in a direction of circulation that is the same direction as the helical direction of the helix of the second structural body B2, where ne2 represents a refractive index of the liquid crystal molecules for extraordinary light and no2 represents a refractive index of the liquid crystal molecules for ordinary light. By contrast, each second structural body B2 transmits light having circular polarization in a direction of circulation opposite to the helical direction of the helix of the second structural body B2. Note that, the light having circular polarization may be light having precisely circular polarization or may be circularly polarized light approximate to elliptically polarized light.

In light reflection, each of the second structural bodies B2 reflects light while maintaining the polarization state of the light at incidence to the second structural body B2 and at reflection by the second structural body B2. Also, in light transmission and output, each of the second structural bodies B2 transmits and outputs light while maintaining the polarization state of the light at incidence to the second structural body B2 and at output from the second structural body B2.

Specifically, a plurality of light fluxes constituting light enter the second structural bodies B2. In reflection of the light fluxes, the second structural bodies B2 reflect the light fluxes while maintaining the polarization state of the light fluxes at incidence of the light fluxes on the second structural bodies B2 and at reflection of the light fluxes by the second structural bodies B2. Also in transmission and output of light fluxes, the second structural bodies B2 transmit and output the light fluxes while maintaining the polarization state of the light fluxes at incidence of the light fluxes on the second structural bodies B2 and at output of the light fluxes from the second structural bodies B2. Definition of the phrase "maintaining a polarization state of light fluxes" is the same as the definition of the phrase "maintaining a polarization state of light".

As described above, the second layer A2 includes the second structural bodies B2 each being helical. Therefore, when light in a polarization state corresponding to the helical direction of the helices of the second structural bodies B2 comes from the first layer A1, the second layer A2 reflects the light. The second layer A2 reflects the light while maintaining the polarization state of the light at incidence to the second layer A2 from the first layer A1 and at reflection by the second layer A2 toward the first layer A1. Furthermore, when light in a polarization state contrary to the helical direction of the helices of the second structural bodies B2 enters the first layer A1, the second layer A2 transmits the light. The second layer A2 transmits and outputs the light while maintaining the polarization state of the light at incidence to the second layer A2 from the first layer A1 and at output from the second layer A2 toward the outside of the second layer A2.

In the present specification, the outside of the first layer A1 is the outside of the optical element 1 (i.e., outside of the first boundary surface 11 of the first layer A1) and the outside of the second layer A2 is the outside of the optical element 1 (i.e., outside of the fourth boundary surface 14 of the second layer A2).

The direction of orientation of each first structural body B1 is represented by the orientation angle of the first element Q1 or the orientation angle of a director of the first element group. The orientation angle of the first element Q1 represents the rotational angle of the first element Q1 about the Z-axis, and is represented by a rotational angle of the first element Q1 with respect to the X direction. The orientation angle of the director of a first element group represents the rotational angle of the director about the Z-axis and is represented by a rotational angle of the director with respect to the X direction. A rotational angle in a clockwise direction when a first structural body B1 is viewed in the Z direction is defined as a "+" (positive) angle, and a rotational angle in a counterclockwise direction when the first structural body B1 is viewed in the Z direction is defined as a "−" (negative) angle". Furthermore, the direction of orientation of a first structural body B1 may be referred to as an orientation angle of the first structural body B1.

As described above with reference to FIG. 1, the second layer A2 according to Embodiment 1 reflects light while maintaining the polarization state of the light. In the above configuration, a direction of the phase change of the light with respect to the propagation direction of the light is the same between in the forward path and in the backward path of the light in the first layer A1. In addition, the first layer A1 changes the phase of light in both the forward light path and the backward light path of the light in the first layer A1.

Accordingly, the amount of phase change of light output from the first layer A1 toward the outside of the first layer A1 (output light) can be relatively increased with respect to the amount of change in directions of orientation of the first structural bodies B1. As a result, for example, change in wavefront of light output from the first layer A1 toward the outside of the first layer A1 can be relatively increased with respect to change in directions of orientation of the first structural bodies B1.

In particular, the second structural bodies B2 in Embodiment 1, which are helical in form, are each suitable as a structural body that reflects light while maintaining the polarization state of the light.

Specifically, phase change can be doubled when compared to a case where light entering an optical element according to Comparative Example 1 that includes only a nematic liquid crystal layer is transmitted and output. The reason thereof is that light passes through the nematic liquid crystal layer only once in Comparative Example 1 while light passes through the first layer A1 twice in Embodiment 1.

For example, in a situation in which the optical element according to Comparative Example 1 functions as a half-wavelength plate, change in orientation angle of liquid crystal molecules from 0 (radians) to π (radians) changes the phase of the light from 0 (radians) to 2π (radians). That is, a rate of phase change of light to change in orientation angle of the liquid crystal molecules doubles. By contrast, in a situation in which the optical element 1 according to Embodiment 1 functions as a half-wavelength plate, change in orientation angle of the first structural bodies B1 from 0 (radians) to π/2 (radians) changes the phase of the light from 0 (radians) to 2π (radians). That is, the rate of phase change to change in orientation angle of the first structural bodies B1 is 4 times.

According to Embodiment 1, phase change can be doubled when compared to a case where light entering an optical element according to Comparative Example 2 that includes only a cholesteric liquid crystal layer is reflected.

For example, when the orientation angle of liquid crystal molecules of the cholesteric liquid crystal layer according to Comparative Example 2 is changed from 0 (radians) to π (radians), the phase of light changes from 0 (radians) to 2π (radians). That is, the rate of phase change to change in orientation angle of the liquid crystal molecules doubles. By contrast, when a retardation Rd (=Δn1×L1) of the first layer A1 is set to a half wavelength of light in Embodiment 1, that is, when the first layer A1 functions as a half-wavelength plate, the rate of phase change of the light to the orientation angle of the first structural bodies B1 is 4 times. The half-wavelength plate gives a phase difference of 180 degrees between extraordinary light and ordinary light, and reverses for example a direction of circulation of circularly polarized light.

In the following description of the present specification, the rate of phase change of light to change in orientation angles of the first structural bodies B1 may be referred to as a "phase change rate". The "phase of light" in such a case is the phase of light output from the first layer A1 through the first boundary surface 11 toward the outside of the first layer A1.

Also, since the phase change rate of light can be increased in Embodiment 1, an amount of change in orientation angle can be reduced within a certain range when the first structural bodies B1 are arranged with their orientation angles differentiated. That is, a desired phase change can be achieved with a sparse alignment pattern. As a result, patterning of the first structural bodies B1 can be facilitated, resulting in easy production of the optical element 1. For example, a desired wavefront change can be achieved with a sparse alignment pattern.

For example, in Comparative Example 1, the orientation angles of liquid crystal molecules within a specific distance D in the X direction are changed from 0 (radians) to π (radians) to changes the phase of light from 0 (radians) to 2π (radians). By contrast, in Embodiment 1, change in orientation angles of first elements Q1 within the specific distance D in the X direction only from 0 (radians) to π/2 (radians) can changes the phase of light from 0 (radians) to 2π (radians). Accordingly, density of the alignment pattern can be reduced to ½ in Embodiment 1 when compared to Comparative Example 1. As a result, patterning of the first structural bodies B1 can be facilitated. The density of the alignment pattern is the amount of change in orientation angles within the specific distance D.

Furthermore, the second layer A2 transmits and outputs light output from the first layer A1 in Embodiment 1. In the above configuration, the light output from the second layer A2 has already been transmitted through the first layer A1. The phase of the light output from the second layer A2 accordingly has been changed. Therefore, the optical element 1 is suitable as a transmission element for changing a phase of light.

Moreover, the first layer A1 has selective reflectivity in Embodiment 1. In the above configuration, selection of a polarization state of light entering the first layer A1 (specifically, right circularly polarized light or left circularly polarized light) can result in the optical element 1 functioning as a reflection element only or the optical element 1 functioning as a transmission element only. However, linearly polarized light may be incident on the first layer A1. In such a case, transmitted light and reflected light are output each with their phases changed according to its characteristic.

Yet, the first layer A1 includes the first structural bodies B1 having different directions of orientation from one another in Embodiment 1. In the above configuration, the phase of light at output from the first layer A1 toward the outside of the first layer A1 is changed from the phase of the light at incidence to the first layer A1 from the outside of the first layer A1. That is, the wavefront of light output from the first layer A1 toward the outside of the first layer A1 is non-parallel to the wavefront of the light at incidence to the first layer A1 from the outside of the first layer A1. Accordingly, differentiation of the directions of orientation of the first structural bodies B1 can enable output of light having any desirable wavefront from the first layer A1.

Similarly, the wavefront of light output from the second layer A2 toward the outside of the second layer A2 is non-parallel to the wavefront of the light at incidence to the first layer A1 from the outside of the first layer A1. Accordingly, differentiation of the directions of orientation of the first structural bodies B1 can enable output of light having any desirable wavefront from the second layer A2.

Furthermore, the directions of orientation of the first elements Q1 are identical in each of the first structural bodies B1 in Embodiment 1. That is, the first elements Q1 have orientation order with respect to one direction in each first structural body B1, and therefore, the first structural bodies B1 have relatively low viscosity. Specifically, each first structural body B1 forms nematic liquid crystal. Therefore, the first structural bodies B1 can be patterned easily when compared to a case of cholesteric liquid crystal, and the first structural bodies B1 can be easily and precisely formed into a desired alignment pattern.

Moreover, when the first layer A1 receives light LT2 in a polarization state corresponding to the helical direction of the helices of the second structural bodies B2 (specifically, the direction of circulation) at incidence to the second layer A2, the light LT2 with a changed phase can be taken out at high efficiency. For example, when the first layer A1 functions as a half-wavelength plate, the first layer A1 receives the light LT2 in a polarization state contrary to the helical direction of the helices of the second structural bodies B2 (specifically, direction of circulation).

The following describes reflection and transmission of light using specific examples with further reference to FIG. 1.

First, conditions as examples will be described. Light LT1 is normally incident on the first boundary surface 11 of the first layer A1 through the substrate SB1. The light LT1 has a wavefront F1. The light LT1 includes light LT2 in a first polarization state at incidence on the first boundary surface 11 and light LT3 in a second polarization state at incidence on the first boundary surface 11. A direction of circulation of light represented by the second polarization state is opposite to a direction of circulation of light represented by the first polarization state. That is, the direction of polarization of the light represented by the second polarization state is perpendicular to a direction of polarization of the light represented by the first polarization state. For example, the first polarization state represents right circular polarization and the second polarization state represents left circular polarization. The light LT2 has a wavefront F2, and the light LT3 has a wavefront F3. The polarization state of the light LT2 is defined with respect to the propagation direction of the light LT2. The polarization state of the light LT3 is defined with respect to the propagation direction of the light LT3.

The first layer A1 functions as a half-wavelength plate. That is, a retardation Rd ($=\Delta n1 \times L1$) of the first layer A1 corresponds to a half-wavelength of the light LT1 (light LT2 and light LT3). Therefore, the first layer A1 changes the polarization state. In a case for example where light is circularly polarized, the first layer A1 reverses the direction of circulation of the light. That is, the first layer A1 reverses the polarization state of the light LT2 from the first polarization state to the second polarization state and outputs the light LT2. Also, the first layer A1 reverses the polarization state of the light LT3 from the second polarization state to the first polarization state and outputs the light LT3.

The helical directions of the helices of the second structural bodies B2 of the second layer A2 each are either a first helical direction or a second helical direction. The second helical direction is opposite to the first helical direction. When the helical direction of the helices is the first helical direction, the second layer A2 reflects circularly polarized light of the light LT2 and the light LT3 that is in a polarization state (specifically, direction of circulation) corresponding to the first helical direction, and transmits circularly polarized light of the light LT2 and the light LT3 that is in a polarization state (specifically, direction of circulation) contrary to the first helical direction. By contrast, when the helical direction of the helices is the second helical direction, the second layer A2 reflects circularly polarized light of the light LT2 and the light LT3 that is in a polarization state (specifically, direction of circulation) corresponding to the second helical direction, and transmits circularly polarized light of the light LT2 and the light LT3 in a polarization state (specifically, direction of circulation) contrary to the second helical direction. The phase of the reflected light LT2 is modulated spatially according to distribution of orientation angles of the first layer A1 so that the reflected light LT2 has a wavefront F2 different from that of the incident light LT1. The phase of the transmitted light LT3 is modulated spatially according to distribution of orientation angles of the first layer A1 so that the light LT3 has a wavefront F3 different from that of the incident light LT1. Note that in a case where for example orientation angles of the first layer A1 are not spatially distributed, the wavefront F2 and the wavefront F3 may be the same as the wavefront F1.

In the following description of reflection and transmission of light, the first polarization state possesses a left circulation direction and the second polarization state possesses a right circulation direction. Therefore, the light LT2 is in left circular polarization at light incidence and the light LT3 is in right circular polarization at light incidence. That is, the light LT1 is in linear polarization. Also, the helical direction of the helices of the second structural bodies B2 is the first helical direction, and the first helical direction has right circulation direction. Therefore, the second polarization state corresponds to the first helical direction and the first polarization state is contrary to the first helical direction. That is, the direction of circulation represented by the second polarization state is the same as the first helical direction and the direction of circulation represented by the first polarization state is opposite to the first helical direction.

Furthermore, for easy understanding, as one example, the directions of orientation of the first structural bodies B1 arranged in the Y direction are identical to one another and the directions of orientation of the first structural bodies B1 arranged in the X direction vary linearly. Specifically, the directions of orientation of the first structural bodies B1 vary an angle θ by an angle θ in the X direction.

The conditions as examples have been described so far. Under the above-mentioned conditions, the first layer A1 transmits the light LT1 entering the first layer A1 through the first boundary surface 11 and outputs the light LT1 from the second boundary surface 12 toward the second layer A2. Specifically, the first layer A1 reverses the polarization state of the light LT2 from the first polarization state to the second polarization state and outputs the light LT2. Also, the first layer A1 reverses the polarization state of the light LT3 from the second polarization state to the first polarization state and outputs the light LT3. Furthermore, the first layer A1 changes the phase of the light LT2 at incidence on the first boundary surface 11 by an angle of 2θ(=2×θ) and outputs the light LT2. Also, the first layer A1 changes the phase of the light LT3 at incidence on the first boundary surface 11 by an angle of "−2θ" (=−2×θ) and outputs the light LT3. Herein, a plus sign (+) of the angle indicates phase delay and a minus sign (−) of the angle indicates phase advance.

The second layer A2 reflects the light LT2 output by the first layer A1 through the second boundary surface 12 from the third boundary surface 13 toward the second boundary surface 12 of the first layer A1 while maintaining the polarization state. That is, the second layer A2 reflects the light LT2 in the second polarization state output from the first layer A1 toward the first layer A1 with the second polarization state maintained.

The first layer A1 transmits the light LT2 incident to the first layer A1 through the second boundary surface 12 and outputs the light LT2 from the first boundary surface 11 toward the outside of the first layer A1. Specifically, the first layer A1 reverses the polarization state of the light LT2 from the second polarization state to the first polarization state and outputs the light LT2. Therefore, the polarization state of the light LT2 at incidence on the first boundary surface 11 is the same as the polarization state of the light LT2 at output through the first boundary surface 11. Furthermore, the first layer A1 changes the phase of the light LT2 at incidence on the second boundary surface 12 from the third boundary surface 13 by an angle of 2θ, and outputs the light LT2.

The first layer A1 changes the phase of the light LT2 by an angle of 2θ both in a forward light path and in a backward light path of the light LT2, and outputs the light LT2 from the first boundary surface 11. That is, the first layer A1 changes the phase of the light LT2 by an angle of 4θ (=4×θ). As a result, the light LT2 is output in a state in which the wavefront F2 of the light LT2 output through the first boundary surface 11 is inclined by an angle of 4θ with respect to the wavefront F2 of the light LT2 entering through the first boundary surface 11.

By contrast, the second layer A2 transmits through the third boundary surface 13 the light LT3 output from the first layer A1 through the first boundary surface 11 and outputs the light LT3 from the fourth boundary surface 14 toward the outside of the second layer A2. Specifically, the second layer A2 outputs the light LT3 while maintaining the polarization state of the light LT3. That is, the second layer A2 outputs the light LT3 in the first polarization state, which is output from the first layer A1 and which has a phase at an angle of "−2θ", toward the outside of the second layer A2 while maintaining the first polarization state. As a result, the light LT3 is output in a state in which the wavefront F3 of the light LT3 output through the fourth boundary surface 14 is inclined by an angle of "−2θ" with respect to the wavefront F3 of the light LT3 entering through the first boundary surface 11.

Note that the light LT1 may obliquely enter the first layer A1. Further, the light LT1 may include only the light LT2 or only the light LT3.

The following describes definitions of circular polarization and helical directions of helices of the second structural bodies B2. A right helical direction of a helix is a direction of a second element Q2 twisting clockwise gradually from upstream to downstream in the Z direction. A left helical direction of a helix is a direction of a second element Q2 twisting counterclockwise gradually from upstream to downstream in the Z direction. By contrast, the right circular polarization is circular polarization in which the electric field vector of the light that passes through a fixed point (i.e., a specific site) turns clockwise with time when light (i.e., electromagnetic waves) at the fixed point is viewed in a direction opposite to a propagation direction of the light (i.e., toward a light source). When the polarization state of light at a certain fixed time point indicates a direction of spatially right circulation, the light is in a right circular polarization. The left circular polarization is circular polarization in which the electric field vector of light passing through a fixed point turns counterclockwise with time when light at the fixed point is viewed in a direction opposite to a propagation direction of the light. When the polarization state of light at a certain fixed time point indicates a direction of spatially left circulation, the light is in a left circular polarization.

The following describes, using Jones vector, a principle that the phase of the light LT2 output toward the outside of the first layer A1 is changed by an angle of "4θ" when the direction of orientation of the first structural bodies B1 varies by an angle of "θ".

The following calculation is performed on the assumption that light waves propagate in the Z direction and a vibration term of the phase of the light waves is expressed by φ=kz−ωt. "k" represents a wave number, "z" represents a position on the Z direction, "ω" represents an angular frequency, and "t" represents a time variation.

In the present specification, the polarization state of light is represented by a two-dimensional column vector, where typically, the components $M_{11}=1$ and $M_{21}=$(i or −i). The vector represents right circular polarization when the sign of the imaginary unit "i" of component $M_{21}$ is minus (−), and represents left circular polarization when the sign is plus (+).

Phase change by an optical element according to Comparative Example 3 will be described first for facilitating understanding. The optical element according to Comparative Example 3 has a structure of the optical element 1 illustrated in FIG. 1 from which the second layer A2 is removed.

That is, the optical element according to Comparative Example 3 includes only the first layer A1 (nematic liquid crystal). The first layer A1 according to Comparative Example 3 has a retardation Rd (=Δn1×L1) that enables a function as a half-wavelength plate for the light LT1 having a wavelength λ. Note that Comparative Example 3 will be descried using the same reference signs as in Embodiment 1 for the sake of description. Furthermore, Comparative Example 3 will be described with reference to FIG. 1 for convenience sake.

As illustrated in FIG. 1, the light LT1 propagating in the Z direction enters the first layer A1 in Comparative Example 3. A Jones matrix $M_0$ of the first layer A1 when the directions of orientation of the first structural bodies B1 are identical to the X direction is given by the following expression (1).

[Expression 1]

$$M_0 = \begin{bmatrix} \exp\left(i\frac{\pi R}{\lambda}\right) & 0 \\ 0 & \exp\left(-i\frac{\pi R}{\lambda}\right) \end{bmatrix} = \begin{bmatrix} \exp\left(i\frac{\pi}{2}\right) & 0 \\ 0 & \exp\left(-i\frac{\pi}{2}\right) \end{bmatrix} = i\begin{bmatrix} 1 & 0 \\ 0 & -1 \end{bmatrix} \quad (1)$$

A Jones matrix M of the first layer A1 when the directions of orientation of the first structural bodies B1 are rotated by an angle of "θ" (also referred to below as a rotational angle "θ") with respect to the X direction is given by the following expression (2).

[Expression 2]

$$M = R(\theta)M_0R(-\theta) = i\begin{bmatrix} \cos2\theta & \sin2\theta \\ \sin2\theta & -\cos2\theta \end{bmatrix} \quad (2)$$

Among expressions in the present specification, "R(0)" is expressed by the following expression (3) and represents a rotation matrix of the rotational angle "0". Furthermore, "R" represents "R(0)" and "i" represents an imaginary unit in the expressions in the present specification.

[Expression 3]

$$R(\theta) = \begin{bmatrix} \cos\theta & -\sin\theta \\ \sin\theta & \cos\theta \end{bmatrix} \quad (3)$$

The polarization state of the light LT1 is represented by a Jones vector $V_{in}$. A Jones vector $V_{in}$ of the light LT1 having right circular polarization in entering through the first boundary surface 11 is expressed by the following expression (4).

[Expression 4]

$$V_{in} = \begin{bmatrix} 1 \\ -i \end{bmatrix} \quad (4)$$

A Jones vector $V_{out}$ of the light LT1 at output through the second boundary surface 12 is accordingly expressed by the following expression (5).

[Expression 5]

$$V_{out} = MV_{in} = i\begin{bmatrix} \cos2\theta - i\sin2\theta \\ \sin2\theta + i\cos2\theta \end{bmatrix} = i\begin{bmatrix} \exp(-i2\theta) \\ i\exp(-i2\theta) \end{bmatrix} = i\exp(-i2\theta)\begin{bmatrix} 1 \\ i \end{bmatrix} \quad (5)$$

As is clear from expressions (4) and (5), the polarization state of the light LT1 is changed from the right circular polarization at incidence to left circular polarization at output in Comparative Example 3.

Furthermore, the light LT1 at output through the second boundary surface 12 has an absolute phase in proportion to "−2θ" in Comparative Example 3. That is, when the directions of orientation of the first structural bodies B1 (nematic liquid crystal) are spatially changed by patterning to spatially change the rotational angle "θ", phase change (−2θ) of the light LT1 in proportion to the rotational angle "θ" is caused in each of the first structural bodies B1.

By contrast, the Jones vector $V_{in}$ of the light LT1 having left circular polarization at incidence on the first boundary surface 11 is expressed by the following expression (6).

[Expression 6]

$$V_{in} = \begin{bmatrix} 1 \\ i \end{bmatrix} \quad (6)$$

As a result, the Jones vector $V_{out}$ of the light LT1 output through the second boundary surface 12 is expressed by the following expression (7).

[Expression 7]

$$V_{out} = MV_{in} = i\begin{bmatrix} \cos2\theta + i\sin2\theta \\ \sin2\theta - i\cos2\theta \end{bmatrix} = i\begin{bmatrix} \exp(-i2\theta) \\ -i\exp(-i2\theta) \end{bmatrix} = i\exp(i2\theta)\begin{bmatrix} 1 \\ -i \end{bmatrix} \quad (7)$$

As is clear from expressions (6) and (7), the polarization state of the light LT1 is changed from the left circular polarization at incidence to the right circular polarization at output.

Furthermore, upon incidence of left circularly polarized light in Comparative Example 3, the light LT1 at output through the second boundary surface 12 has an absolute phase in proportion to "2θ" in Comparative Example 3. That is, the acquired phase is reversed depending on the polarization state (i.e., right circular polarization or left circular polarization) at incidence of the light LT1.

The following describes phase change by the optical element 1 according to Embodiment 1. The first layer A1 (nematic liquid crystal) has a retardation Rd (=Δn1×L1) such that the first layer A1 functions as a half-wavelength plate with respect to the light LT1 having a wavelength λ. The light LT1 propagating in the Z direction enters the first layer A1. The light LT1 includes the light LT2 with left circular polarization and the light LT3 with right circular polarization. The helical direction of the helices of the second structural bodies B2 indicates a right helical direction (right twist) in the second layer A2 (cholesteric liquid crystal). Therefore, the second layer A2 reflects the light LT2 and transmits the light LT3.

Specifically, a Jones vector $V_{in}$ of the light LT3 with right circular polarization at incidence through the first boundary surface 11 is expressed by the following expression (8).

[Expression 8]

$$V_{in} = \begin{bmatrix} 1 \\ -i \end{bmatrix} \quad (8)$$

A Jones vector $V_{out}$ of the light LT3 at output through the second boundary surface 12 is expressed by the following expression (9).

[Expression 9]

$$V_{out} = MV_{in} = i\begin{bmatrix} \cos2\theta - i\sin2\theta \\ \sin2\theta + i\cos2\theta \end{bmatrix} = i\begin{bmatrix} \exp(-i2\theta) \\ i\exp(-i2\theta) \end{bmatrix} = i\exp(-i2\theta)\begin{bmatrix} 1 \\ i \end{bmatrix} \quad (9)$$

As is clear from expression (9), the light LT3 at output through the second boundary surface 12 has left circular polarization. Therefore, the light LT3 is transmitted through the second layer A2 without being reflected by the second layer A2. In such a case, the light LT3 with the left circular polarization propagates in the second layer A2 while hardly receiving influence of the phase and the polarization state from the second layer A2.

That is, when the light LT3 with right circular polarization enters the optical element 1 in which the second structural bodies B2 of the second layer A2 twist right, the light LT3 serves as left circularly polarized light to be transmitted through the second layer A2. The light LT3 has a phase having an angle of "−2θ" in correspondence to the rotational angle "θ" indicating the direction of orientation of the first structural bodies B1.

By contrast, a Jones vector $V_{in}$ of the light LT2 with left circular polarization at incidence on the first boundary surface 11 is expressed by the following expression (10).

[Expression 10]

$$V_{in} = \begin{bmatrix} 1 \\ i \end{bmatrix} \quad (10)$$

A Jones vector $V'_{in}$ of the light LT2 at output through the second boundary surface 12 is expressed by the following expression (11).

[Expression 11]

$$V'_{in} = MV_{in} = i\begin{bmatrix} \cos2\theta + i\sin2\theta \\ \sin2\theta - i\cos2\theta \end{bmatrix} = i\begin{bmatrix} \exp(i2\theta) \\ -i\exp(i2\theta) \end{bmatrix} = i\exp(i2\theta)\begin{bmatrix} 1 \\ -i \end{bmatrix} \quad (11)$$

As is clear from expression (11), the light LT2 at output through the second boundary surface 12 has right circular polarization. Therefore, the light LT2 is reflected by the second layer A2 including the second structural bodies B2 that twist right. By contrast, the light LT2 with right circular polarization enters the second layer A2 through the second boundary surface 12 while maintaining the polarization state with only the propagation direction reversed. That is, the light LT2 is incident as right circularly polarized light traveling in a direction opposite to the Z direction. The light LT2 then propagates in the first layer A1 and is re-transmitted through the first layer A1.

Since the propagation direction of the light LT2 is reversed when the light LT3 is re-transmitted through the first layer A1, the first structural bodies B1 indicating the direction of orientation at an angle of "θ" function as the first structural bodies B1 indicating a direction of orientation at an angle of "π−θ". A Jones matrix M' of the first layer A1 including the first structural bodies B1 indicating the direction of orientation at an angle of "π−θ" is expressed by the following expression (12).

[Expression 12]

$$M' = R(\pi - \theta)M_0 R(-\pi + \theta) = i\begin{bmatrix} \cos2\theta & -\sin2\theta \\ -\sin2\theta & -\cos2\theta \end{bmatrix} \quad (12)$$

A Jones vector $V'_{in}$ of the light LT2 with right circular polarization at incidence on the second boundary surface 12 is expressed by the following expression (13).

[Expression 13]

$$V'_{in} = \begin{bmatrix} 1 \\ -i \end{bmatrix} \quad (13)$$

A Jones vector $V_{out}$ of the light LT2 at output through the first boundary surface 11 is expressed by the following expression (14).

[Expression 14]

$$V_{out} = M'V'_{in} = i\begin{bmatrix} \cos2\theta & -\sin2\theta \\ -\sin2\theta & -\cos2\theta \end{bmatrix} \propto \exp(i2\theta)\begin{bmatrix} 1 \\ i \end{bmatrix} \quad (14)$$

As is clear from expression (14), the light LT2 at output through the first boundary surface 11 has left circular polarization. In the course of the light LT2, which enters through the second boundary surface 12, being output through the first boundary surface 11, the light LT2 has a phase at an angle of "2θ" in correspondence to a rotational angle "θ" indicating the direction of orientation of the first structural bodies B1. Therefore, as is clear from expressions (11) and (14), the light LT2 has a phase at "4θ" (=2θ+2θ) according to a rotational angle "θ" indicating the direction of orientation of the first structural bodies B1 with respect to the phase at incidence.

It is clear from the following expression (15) that the light LT2 has a phase at an angle of "4θ" because expression (15) collectively describes a course series of incidence, propagation in the first layer A1, reflection by the second layer A2, re-propagation in the first layer A1, and output.

[Expression 15]

$$V_{out} = M'MV_{in} = \quad (15)$$
$$i\begin{bmatrix} \cos2\theta & -\sin2\theta \\ -\sin2\theta & -\cos2\theta \end{bmatrix}i\begin{bmatrix} \cos2\theta & \sin2\theta \\ \sin2\theta & -\cos2\theta \end{bmatrix}\begin{bmatrix} 1 \\ i \end{bmatrix} \propto \exp(i4\theta)\begin{bmatrix} 1 \\ i \end{bmatrix}$$

By contrast, when the light LT2 at incidence has right circular polarization in a situation in which the helical direction of the second structural bodies B2 of the second layer A2 is a left helical circulation direction (twists left), the second layer A2 reflects the light LT2.

A Jones vector $V_{in}$ of the light LT2 with right circular polarization at incidence from the first boundary surface 11 is expressed by the following expression (16).

[Expression 16]

$$V_{in} = \begin{bmatrix} 1 \\ -i \end{bmatrix} \quad (16)$$

Through calculation similar to that using expression (14), a Jones vector $V_{out}$ of the light LT2 at output through the first boundary surface 112, which has been re-transmitted through the first layer A1, is expressed by the following expression (17).

[Expression 17]

$$V_{out} \propto \exp(-i4\theta)\begin{bmatrix} 1 \\ -i \end{bmatrix} \quad (17)$$

As is clear from expression (17), the light LT2 at output through the first boundary surface 11 has right circular polarization. The light LT2 has a phase at an angle of "−4θ" in correspondence to a rotational angle "θ" indicating the direction of orientation of the first structural bodies B1.

As is clear from expressions (14) and (17), in order to change the phase of the light LT2 having a wavelength λ from 0 (radians) to 2π (radians), it is only required that the rotational angle "θ" indicating the direction of orientation of the first structural bodies B1 be changed from 0 (radians) to π/2 (radians).

That is, in Embodiment 1, the second layer A2 reflects circularly polarized light while maintaining the polarization state, that is, maintaining the direction of circulation of the circularly polarized light at incidence of the circularly polarized light to the second layer A2 and at reflection of the circularly polarized light by the second layer A2 toward the first layer A1. Therefore, the direction of phase change of the circularly polarized light with respect to the propagation direction of the circularly polarized light does not change between before incidence and after reflection of the circularly polarized light. As a result, the first layer A1 changes the phase in the same direction in both the forward and backward light paths of the circularly polarized light. Thus, the rate of phase change of the circularly polarized light with respect to change in orientation angle of the first structural bodies B1 can be relatively increased. In particular, in a situation in which the first layer A1 functions as a half-wavelength plate, the rate of phase change of circularly polarized light to change in orientation angle of the first structural bodies B1 is 4 times, which is favorable. Note that the second layer A2 outputs circularly polarized light while maintaining the polarization state, that is, maintaining the direction of circulation of the circularly polarized light at incidence of the circularly polarized light on the second layer A2 and at transmission of the circularly polarized light through the second layer A2.

Note that expressions (1) to (17) are calculated under conditions that the light LT1 (including the light LT2 and the light LT3) is incident normally on the first boundary surface 11. However, the phase characteristic is the same as that calculated using expressions (1) to (17) even when the light LT1 is obliquely incident on the first boundary surface 11. However, the reflection characteristic depends on properties of the first layer A1.

Figure 2:
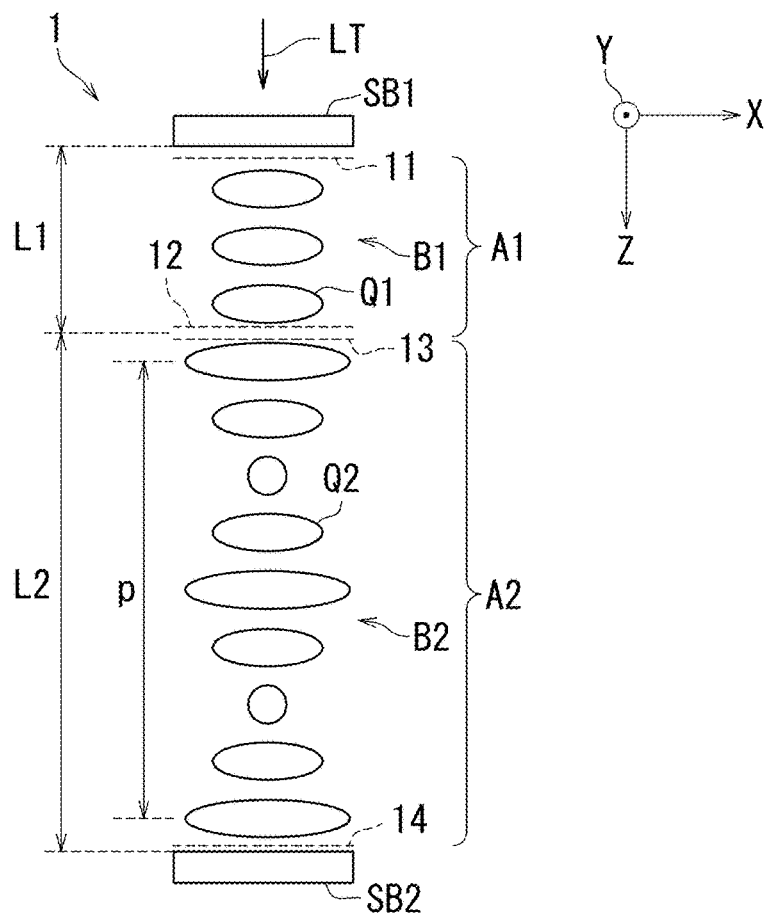
FIG. 2 is a cross-sectional view illustrating the optical element according to Embodiment 1 that includes one first structural body and one second structural body.

The following describes optical properties of the optical element 1 under a specific condition with reference to FIGS. 2 to 8. FIG. 2 is a cross-sectional view illustrating the optical element 1 including one first structural body B1 and one second structural body B2. Calculation by a matrix method is performed for the optical element 1 illustrated in FIG. 2 to calculate a reflectance, a transmittance, and a phase characteristic at incidence of circularly polarized light.

The first structural body B1 forms nematic liquid crystal. The first layer A1 functions as a half-wavelength plate at a center wavelength (608 nm) in the selective reflection band of the second layer A2 to reverse the direction of circulation of circularly polarized light. That is, the retardation Rd (=Δn1×L1) of the first layer A1 equals to ½ of the center wavelength. The center wavelength is a wavelength at a center of the selective reflection band.

The refractive index ne1 of extraordinary light with respect to the first layer A1 is "1.7", and the refractive index no1 of ordinary light with respect to the first layer A1 is "1.5". The first layer A1 has a thickness L1 of "1,520 nm". Furthermore, the direction of orientation of the first structural body B1 is represented by an orientation angle φ. The orientation angle φ represents a rotational angle of the first elements Q1 about the Z-axis, and is represented by a rotational angle of the first elements Q1 with respect to the X direction. The orientation angle φ is changed within a range from no less than 0 (radians) to no greater than π (radians).

The second structural body B2 forms cholesteric liquid crystal. The helical direction of a helix of the second structural body B2 is a right helical direction. Therefore, the second layer A2 reflects right circularly polarized light and transmits left circularly polarized light.

The second layer A2 reflects (specifically, Bragg reflection) right circularly polarized light having a wavelength in the selective reflection band (from 570 nm to 646 nm). The refractive index ne2 of extraordinary light with respect to the second layer A2 is "1.7", and the refractive index no2 of ordinary light with respect to the second layer A2 is "1.5". Therefore, the birefringence Δn2 (=ne2−no2) of the second layer A2 is equal to the birefringence Δn1 (=ne1−no1) of the first layer A1.

The thickness L2 of the second layer A2 is "7,600 nm", and the pitch p of the helix of the second structural body B2 is "380 nm". Furthermore, the direction of orientation of the second structural body B2 is represented by an orientation angle φ0. The orientation angle φ0 represents a rotational angle of a second element Q2 on the third boundary surface 13 about the Z-axis, and is represented by a rotational angle of the second elements Q2 with respect to the X direction. The orientation angle φ0 is 0 (radians).

Figure 3:
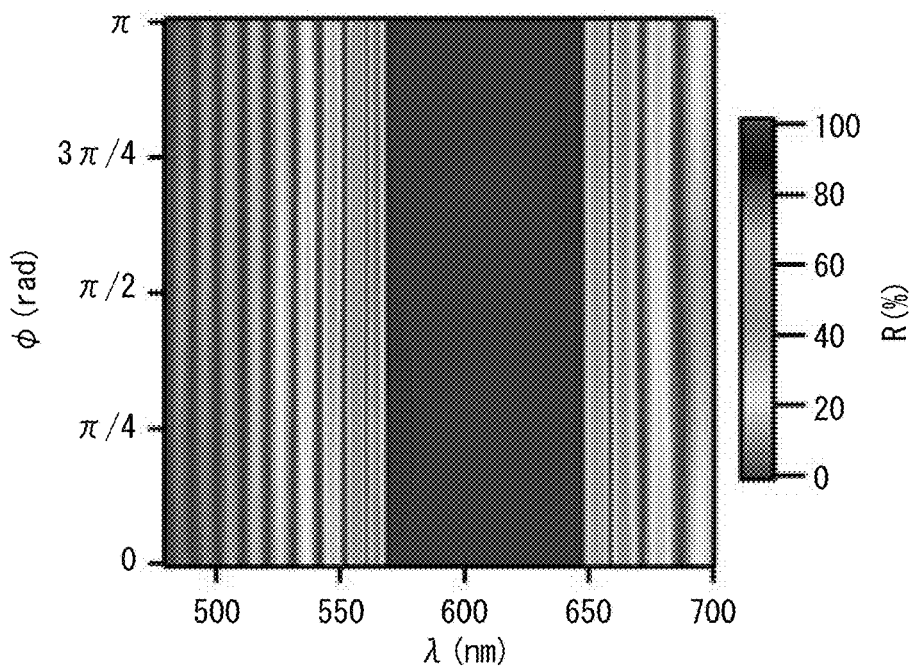
FIG. 3 is a graph representation showing dependencies of reflectance on wavelength and orientation angle when left circularly polarized light enters the optical element according to Embodiment 1.
Figure 4:
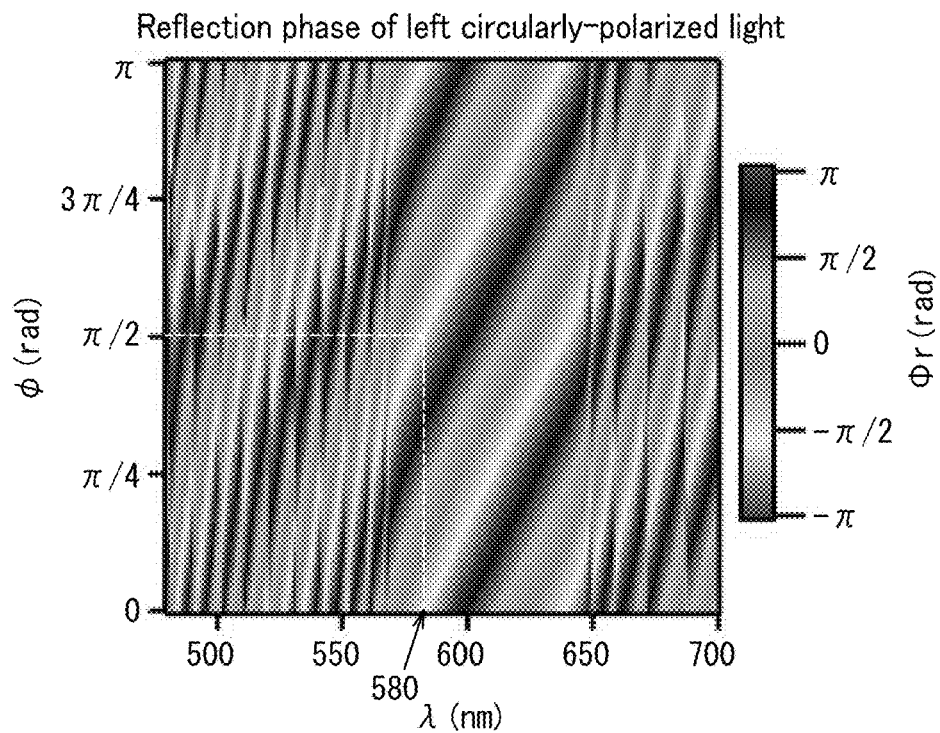
FIG. 4 is a graph representation showing dependencies of reflection phase on wavelength and orientation angle when left circularly polarized light enters the optical element according to Embodiment 1.
Figure 5:
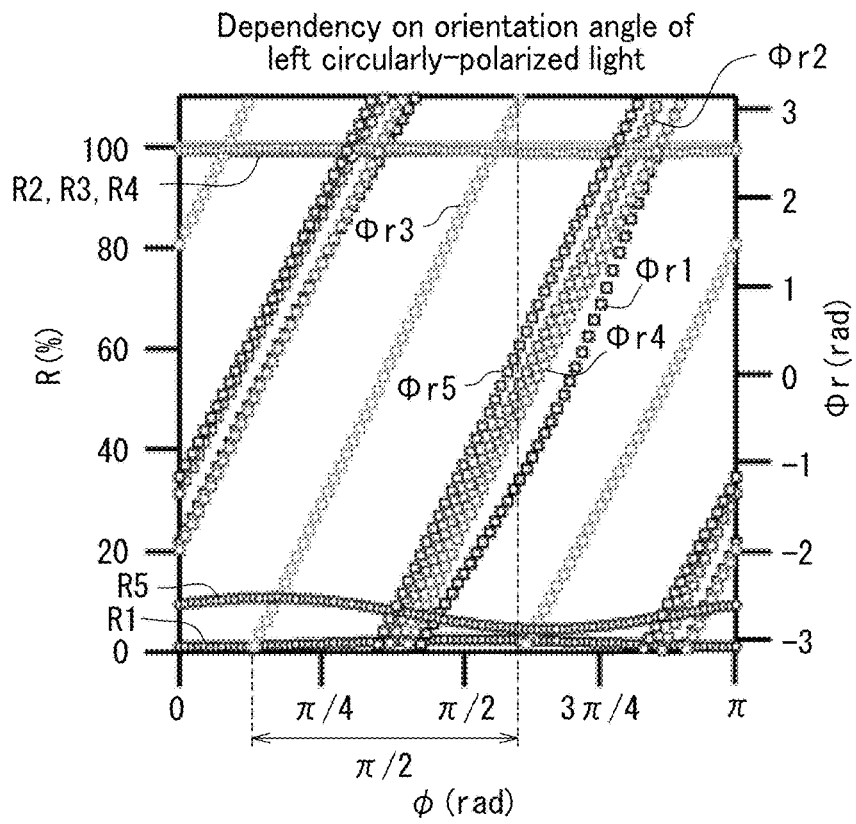
FIG. 5 is a graph representation showing respective dependencies of reflectance and reflection phase on orientation angle when rays of left circularly polarized light having different wavelengths enter the optical element according to Embodiment 1.

The following describes results of calculation of the reflectance and the phase characteristic at incidence of left circularly polarized light as the light LT with reference to FIGS. 3 to 5. The light LT is incident normally on the first boundary surface 11. When the left circularly polarized light enters the optical element 1, the first layer A1 reverses the left circularly polarized light to right circularly polarized light. Accordingly, the second layer A2 reflects the right circularly polarized light. Note that grayscales in FIGS. 3 and 4 are color scales actually.

FIG. 3 is a graph representation showing dependencies of reflectance R on wavelength λ and orientation angle φ when left circularly polarized light enters the optical element 1. In FIG. 3, a horizontal axis indicates wavelength λ (nm) of the light LT, a vertical axis on the left side indicates orientation angle φ (radian) of the first structural body B1, and a grayscale on the right side indicates reflectance R (%) of the light LT. The reflectance R is a ratio of intensity of the light LT reflected by the third boundary surface 13 to intensity of the light LT incident on the third boundary surface 13.

As shown in FIG. 3, the second layer A2 reflects light (right circularly polarized light at incidence on the third boundary surface 13) of the light LT having a wavelength λ in the selective reflection band (from 570 nm to 646 nm) when the orientation angle φ of the first structural body B1 is in a range between no less than 0 and no greater than π. This is because the left circularly polarized light entering the optical element 1 is reversed to right circularly polarized light by the first layer A1.

FIG. 4 is a graph representation showing dependencies of reflection phase Φr on wavelength λ and orientation angle φ when left circularly polarized light enters the optical element 1. In FIG. 4, a horizontal axis indicates wavelength λ (nm) of the light LT, a vertical axis on the left side indicates orientation angle φ (radian) of the first structural body B1, and a grayscale on the right side indicates reflection phase Φr (in radians) of the light LT. The reflection phase Φr is the phase of the light Lt when the light LT entering through the first boundary surface 11 is reflected by the third boundary surface 13 and output through the first boundary surface 11.

As shown in FIG. 4, the reflection phase Φr of light, of the light LT, having a wavelength λ in the selective reflection band (from 570 nm to 646 nm) changes depending on the orientation angle φ of the first structural body B1. For example, when the orientation angle φ is changed from 0 to π/2, the reflection phase Φr of light having a wavelength of 580 nm changes from −π/2 to −π/2, that is, by 2π.

FIG. 5 is a graph representation showing dependencies of reflectance R and reflection phase Φr on orientation angle φ when rays of left circularly polarized light having different wavelengths enter the optical element 1. In FIG. 5, a horizontal axis indicates orientation angle φ (radian) of the first structural body B1, a vertical axis on the left side indicates reflectance R (%) of the light LT, and a vertical axis on the right side indicates reflection phase Φr (radian) of the light LT.

Furthermore, circles R1 represent the reflectance R of light of the light LT having a wavelength λ of 520 nm. Circles R2 represent the reflectance R of light of the light LT having a wavelength λ of 580 nm. Circles R3 represent the reflectance R of light of the light LT having a wavelength λ of 608 nm. Circles R4 represent the reflectance R of light of the light LT having a wavelength λ of 640 nm. Circles R5 represent the reflectance R of light of the light LT having a wavelength λ of 700 nm.

The circles R1 to R5 form straight lines extending in a horizontal direction. Light having a wavelength in the selective reflection band (circles R2 to R4) has a reflectance R of 100% when the orientation angle φ of the first structural body B1 is in a range from no less than 0 to no greater than 71 By contrast, light having a wavelength outside the selective reflection band (circles R1 and R5) has a reflectance R of no greater than 10%.

Furthermore, squares Φr1 represent the reflection phase Φr of light of the light LT having a wavelength λ of 520 nm. Squares Φr2 represent the reflection phase Φr of light of the light LT having a wavelength λ of 580 nm. Squares Φr3 represent the reflection phase Φr of light of the light LT having a wavelength λ of 608 nm. Squares Φr4 represent the reflection phase Φr of light of the light LT having a wavelength λ of 640 nm. Squares Φr5 represent the reflection phase Φr of light of the light LT having a wavelength λ of 700 nm.

The squares Φr1 to Φr5 form oblique lines extending in an obliquely upper right direction. For example, the reflection phase Φr (squares Φr3) of the light having a wavelength of 608 nm changes by 2π with respect to change in orientation angle φ by π/2. Similarly, the reflection phases Φr of light having other wavelengths (squares Φr1, Φr2, Φr4, and Φr5) also change by 2π with respect to change in orientation angle φ by π/2.

Figure 6:
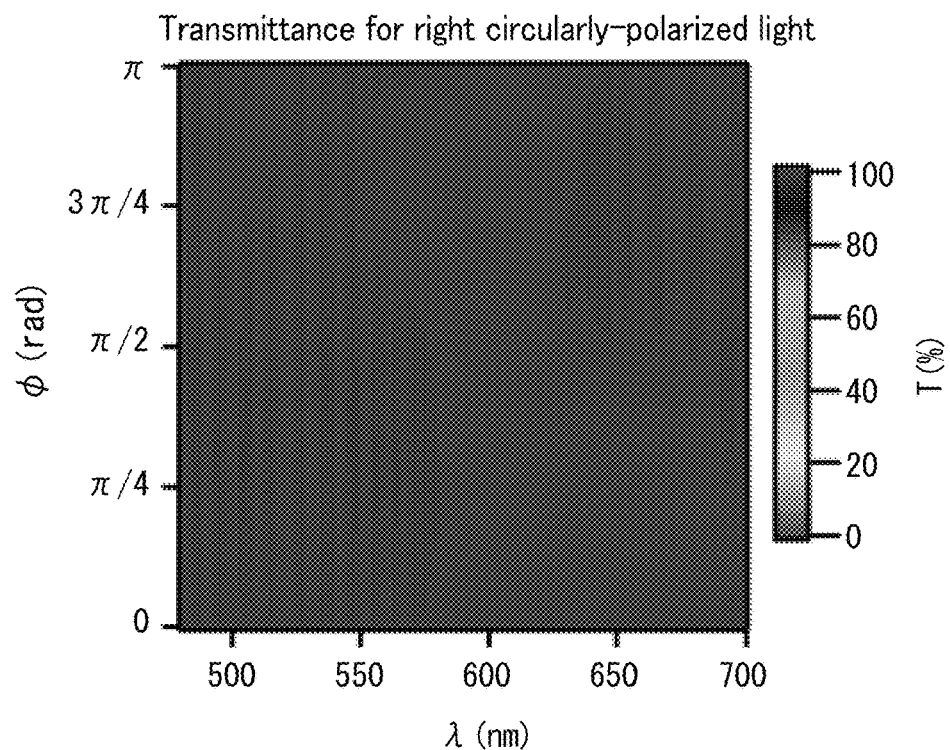
FIG. 6 is a graph representation showing dependencies of transmittance on wavelength and orientation angle when right circularly polarized light enters the optical element according to Embodiment 1.
Figure 7:
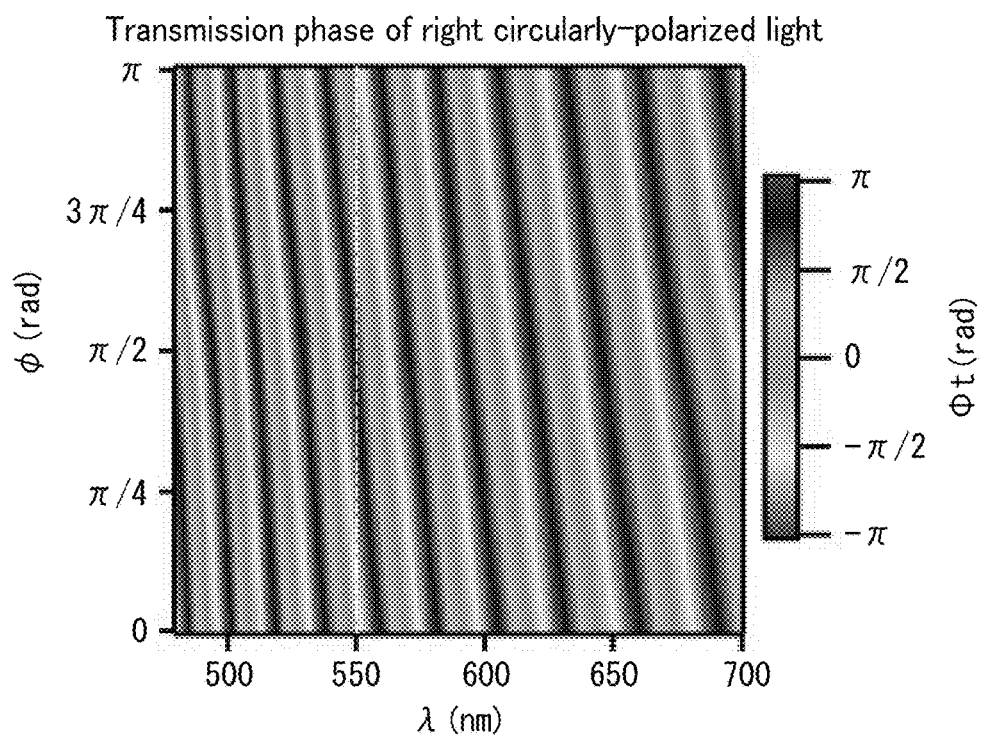
FIG. 7 is a graph representation showing dependencies of transmission phase on wavelength and orientation angle when right circularly polarized light enters the optical element according to Embodiment 1.
Figure 8:
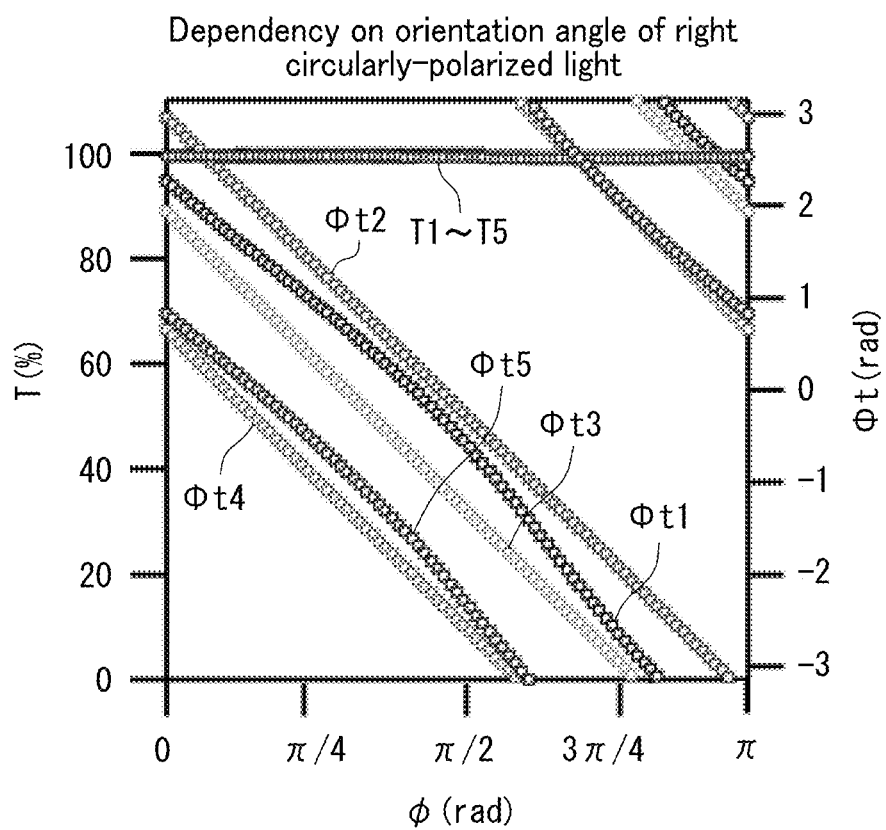
FIG. 8 is a graph representation showing respective dependencies of transmittance and transmission phase on orientation angle when rays of right circularly polarized light having different wavelengths enter the optical element according to Embodiment 1.

The following describes results of calculation of reflectance and a phase characteristic at incidence of right circularly polarized light as the light LT with reference to FIGS. 6 to 8. When the right circularly polarized light enters the optical element 1, the first layer A1 reverses the right circularly polarized light to left circularly polarized light. The second layer A2 that twists right accordingly transmits the left circularly polarized light without reflection. Note that grayscales in FIGS. 6 and 7 are color scales actually.

FIG. 6 is a graph representation showing dependencies of transmittance T on wavelength λ and orientation angle φ when right circularly polarized light enters the optical element 1. In FIG. 6, a horizontal axis indicates wavelength λ (nm) of the light LT, a vertical axis on the left side indicates orientation angle φ (radian) of the first structural body B1, and a grayscale on the right side indicates transmittance T (%) of the light LT. The reflectance R is a ratio of intensity of the light LT transmitted through the third boundary surface 13 to intensity of the light LT incident on the third boundary surface 13.

As illustrated in FIG. 6, the second layer A2 transmits light, of the light LT1, having any wavelength in the entire range (left circularly polarized light at incidence on the third boundary surface 13) when the orientation angle φ of the first structural body B1 is in a range from no less than 0 to no greater than 71 This is because the right circularly polarized light entering the optical element 1 is reversed to left circularly polarized light by the first layer A1.

FIG. 7 is a graph representation showing dependencies of transmission phase Φt on wavelength λ and orientation angle φ when right circularly polarized light enters the optical element 1. In FIG. 7, a horizontal axis indicates wavelength λ (nm) of the light LT, a vertical axis on the left side indicates orientation angle φ (radian) of the first structural body B1, and a grayscale on the right side indicates transmission phase Φt (radian) of the light LT. The transmission phase Φt is the phase of the light LT when the light LT having entered through the first boundary surface 11 is transmitted through the third boundary surface 13 and output through the fourth boundary surface 14.

As illustrated in FIG. 7, the transmission phase Φt of light, of the light LT, having any wavelength λ in the entire range changes depending on the orientation angle φ of the first structural body B1. For example, when the orientation angle φ is changed from 0 to π, the transmission phase Φt of light having a wavelength of 550 nm changes from $-\pi/2$ to $-\pi/2$, that is, by $2\pi$ (see a broken line).

FIG. 8 is a graph representation showing dependencies of transmittance T and transmission phase Φt on orientation angle φ when right circularly polarized light having different wavelengths enters the optical element 1. In FIG. 8, a horizontal axis indicates orientation angle φ (radian) of the first structural body B1, a vertical axis on the left side indicates transmittance T (%) of the light LT, and a vertical axis on the right side indicates transmission phase Φt (radian) of the light LT.

Furthermore, circles T1 represent the transmittance T of light of the light LT having a wavelength λ of 520 nm. Circles T2 represent the transmittance T of light of the light LT having a wavelength λ of 580 nm. Circle T3 represent the transmittance T of light of the light LT having a wavelength λ of 608 nm. Circle T4 represent the transmittance T of light of the light LT having a wavelength λ of 640 nm. Circles T5 represent the transmittance T of light of the light LT having a wavelength λ of 700 nm.

The circles T1 to T5 form straight lines extending in a horizontal direction. Rays of light having the respective wavelengths λ (circles T1 to T5) have a transmittance T of 100% when the orientation angle φ of the first structural body B1 is in a range from no less than 0 to no greater than π.

Furthermore, squares Φt1 represent the transmission phase Φt of light of the light LT having a wavelength λ of 520 nm. Squares Φt2 represent the transmission phase Φt of light of the light LT having a wavelength λ of 580 nm. Squares Φt3 represent the transmission phase Φt of light of the light LT having a wavelength λ of 608 nm. Squares Φt4 represent the transmission phase Φt of light of the light LT having a wavelength λ of 640 nm. Squares Φt5 represent the transmission phase Φt of light of the light LT having a wavelength λ of 700 nm.

The squares Φt1 to Φt5 form lines extending in an obliquely upper left direction. For example, the transmission phase Φt (square marks Φt2) of the light having a wavelength of 580 nm changes by $2\pi$ with respect to change in orientation angle φ by π. Similarly, the transmission phases Φt of rays of the light having the other wavelengths λ (squares Φt1, Φt3, Φt4, and Φt5) also changes by $2\pi$ with respect to change in orientation angle φ by π.

As shown in FIGS. 5 and 8, a change rate ($2\pi/(\pi/2)$) of the reflection phase Φr to the orientation angle φ is double a change rate ($2\pi/\pi$) of the transmission phase Φt to the orientation angle φ.

Figure 9:
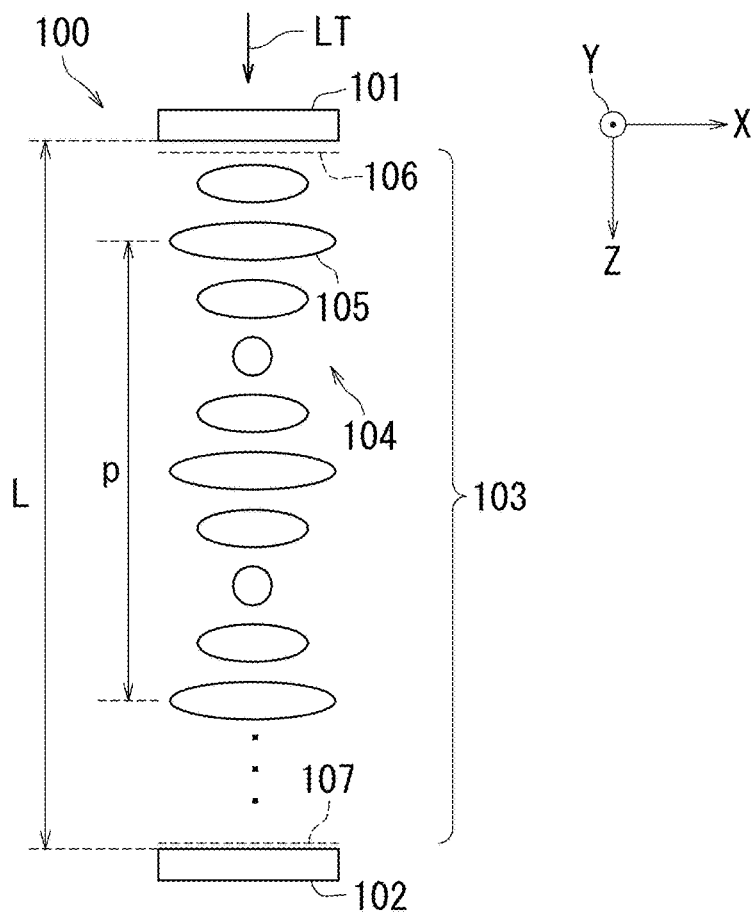
FIG. 9 is a cross-sectional view illustrating an optical element according to Comparative Example 4.
Figure 10:
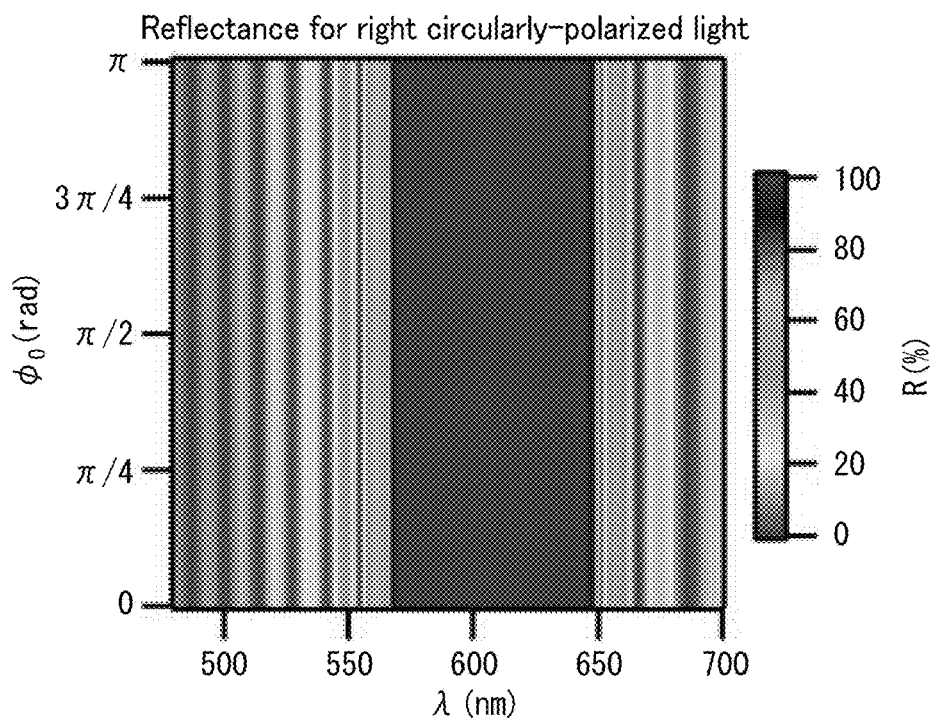
FIG. 10 is a graph representation showing dependencies of reflectance on wavelength and orientation angle when right circularly polarized light enters an optical element according to Comparative Example 4.
Figure 11:
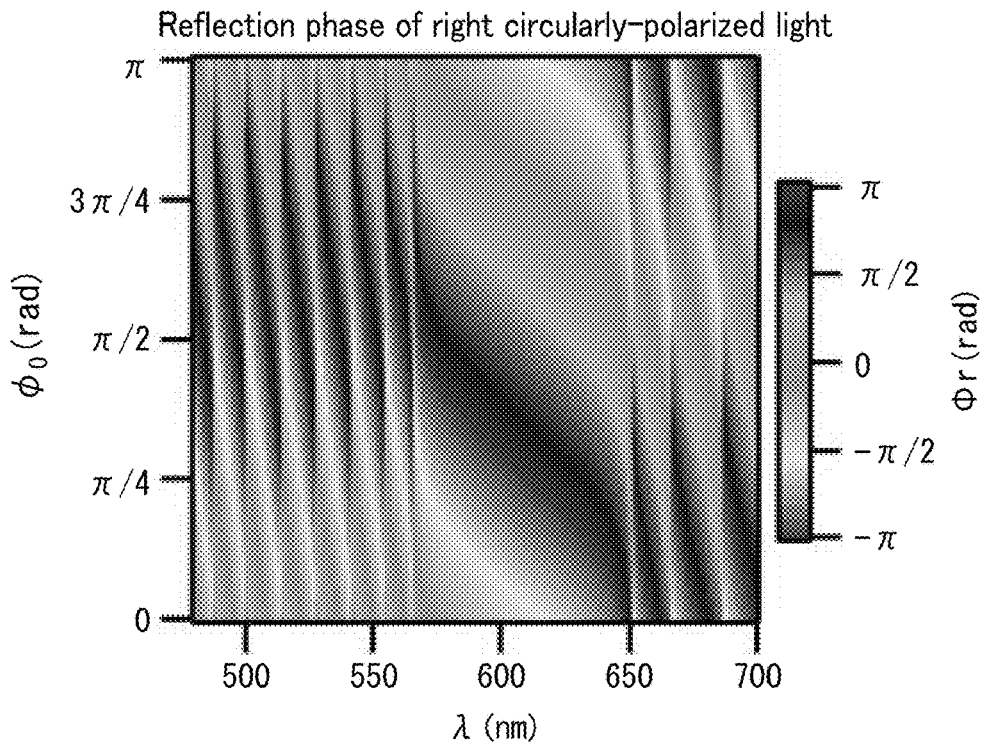
FIG. 11 is a graph representation showing dependencies of reflection phase on wavelength and orientation angle when right circularly polarized light enters the optical element according to Comparative Example 4.

The following describes optical properties of an optical element 100 according to Comparative Example 4 under specific conditions with reference to FIGS. 9 to 12. Note that grayscales in FIGS. 10 and 11 are color scales actually. FIG. 9 is a cross-sectional view illustrating the optical element 100 according to Comparative Example 4. As illustrated in FIG. 9, the optical element 100 includes a substrate 101, a layer 103, and a substrate 102. The layer 103 has a boundary surface 106 and a boundary surface 107. The layer 103 has a thickness L. The layer 103 includes a single structural body 104. The structural body 104 is helical and has a pitch p. The structural body 104 includes a plurality of elements 105 that twist in a helical manner in the Z direction to form a helix. The elements 105 are liquid crystal molecules.

Calculation by a matrix method is performed to calculate a reflectance and a phase characteristic of the optical element 100 at incidence of right circularly polarized light.

The structural body 104 forms cholesteric liquid crystal. The helical direction of the helix of the structural body 104 is a right helical direction. The layer 103 accordingly reflects right circularly polarized light and transmits left circularly polarized light.

The layer 103 reflects right circularly polarized light having a wavelength in the selective reflection band (from 570 nm to 646 nm). The refractive index ne2 of extraordinary light with respect to the layer 103 is "1.7", and the refractive index no2 of ordinary light with respect to the layer 103 is "1.5". The thickness L2 of the layer 103 is "7,600 nm", and the pitch p of the helix of the structural body 104 is "380 nm". Furthermore, the direction of orientation of the structural body 104 is represented by an orientation angle φ0. The orientation angle φ0 represents a rotational angle of an element 105 on the boundary surface 106 about the Z-axis, and represented by a rotational angle of the element 105 with respect to the X direction. The orientation angle φ0 is changed from no less than 0 (radians) to no greater than π (radians).

As illustrated in FIG. 9, right circularly polarized light is incident as the light LT. When the right circularly polarized light enters the optical element 100, the layer 103 reflects the right circularly polarized light.

FIG. 10 is a graph representation showing dependencies of reflectance R on wavelength λ and orientation angle φ0 when right circularly polarized light enters the optical element 1. In FIG. 10, a horizontal axis indicates wavelength λ

(nm) of the light LT, a vertical axis on the left side indicates orientation angle φ0 (radian) of the structural body 104, and a grayscale on the right side indicates reflectance R (%) of the light LT. The reflectance R is a ratio of intensity of the light LT reflected by the layer 103 to intensity of the light LT incident on the boundary surface 106.

As shown in FIG. 10, the layer 103 reflects light (right circularly polarized light) of the light LT1 having a wavelength λ in the selective reflection band (from 570 nm to 646 nm) when the orientation angle φ0 of the structural body 104 is no less than 0 and no greater than π.

FIG. 11 is a graph representation showing dependencies of reflection phase Φr on wavelength λ and orientation angle φ0 when right circularly polarized light enters the optical element 100. In FIG. 11, a horizontal axis indicates wavelength λ (nm) of the light LT, a vertical axis on the left side indicates orientation angle φ0 (radian) of the structural body 104, and a grayscale on the right side indicates reflection phase Φr (radian) of the light LT. The reflection phase Φr is the phase of the light LT reflected by the layer 103.

As shown in FIG. 11, the reflection phase Φr of light, of the light LT, having a wavelength λ in the selective reflection band (from 570 nm to 646 nm) changes depending on the orientation angle φ0 of the structural body 104. Note that although not illustrated, in a situation in which left circularly polarized light is incident as the light LT, the transmission phase Φt of the light LT does not depend on the orientation angle φ0 of the structural body 104.

Figure 12:
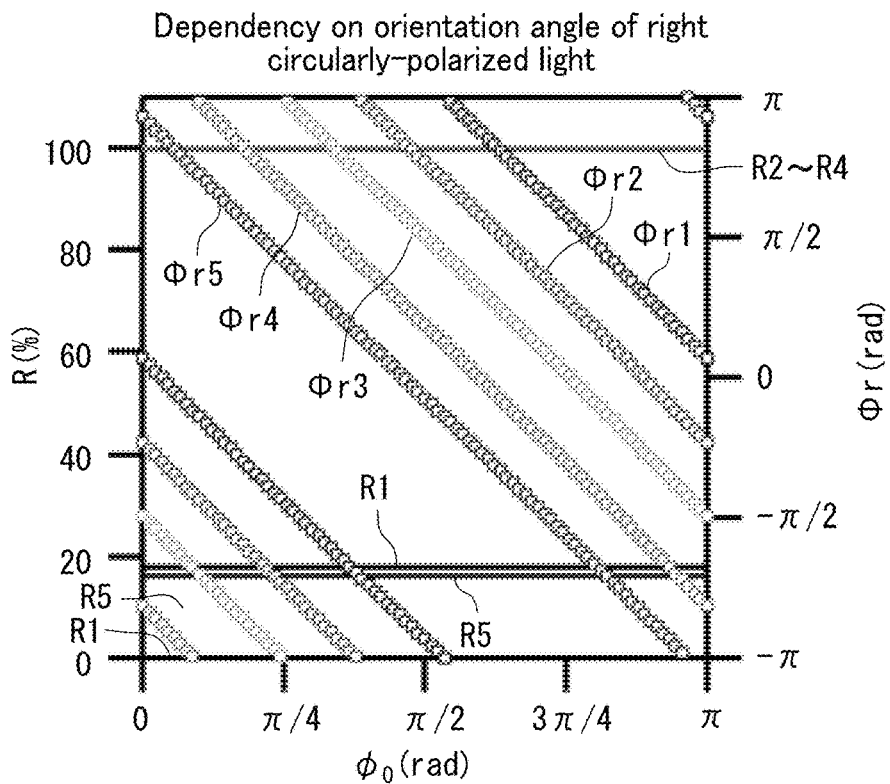
FIG. 12 is a graph representation showing respective dependencies of reflectance and reflection phase on orientation angle when rays of right circularly polarized light having different wavelengths enter the optical element according to Comparative Example 4.

FIG. 12 is a graph representation showing dependencies of reflectance R and reflection phase Φr on orientation angle φ when rays of right circularly polarized light having different wavelengths enter the optical element 1. In FIG. 12, a horizontal axis indicates orientation angle φ0 (radian) of the structural body 104, a vertical axis on the left side indicates reflectance R (%) of the light LT, and a vertical axis on the right side indicates reflection phase Φr (radian) of the light LT.

Furthermore, a straight line R1 represents the reflectance R of light, of the light LT, having a wavelength λ of 520 nm. A straight line R2 represents the reflectance R of light of the light LT having a wavelength λ of 580 nm. A straight line R3 represents the reflectance R of light, of the light LT, having a wavelength λ of 608 nm. A straight line R4 represents the reflectance R of light of the light LT having a wavelength λ of 640 nm. A straight line R5 represents the reflectance R of light of the light LT having a wavelength λ of 700 nm.

Light having a wavelength λ in the selective reflection band (straight lines R2 to R4) has a reflectance R of 100% when the orientation angle φ0 of the structural body 104 is in a range from no less than 0 to no greater than 71 By contrast, light having a wavelength λ outside the selective reflection band (straight lines R1 and R5) has a reflectance R of 20% or lower.

Furthermore, squares Φr1 represent the reflection phase Φr of light, of the light LT, having a wavelength λ of 520 nm. Squares Φr2 represent the reflection phase Φr of light of the light LT having a wavelength λ of 580 nm. Square Φr3 represents the reflection phase Φr of light, of the light LT, having a wavelength λ of 608 nm. Squares Φr4 represent the reflection phase Φr of light of the light LT having a wavelength λ of 640 nm. Squares Φr5 represent the reflection phase Φr of light of the light LT having a wavelength λ of 700 nm.

The squares Φr1 to Φr5 form oblique lines extending in an obliquely upper left direction. For example, the reflection phase Φr (square Φr5) of the light having a wavelength of 700 nm changes by 2π with respect to change in orientation angle φ0 by π. Similarly, the reflection phases Φr of light rays having the other wavelengths (squares Φr1 to Φr4) change by 2π with respect to change in orientation angle φ by π.

As shown in FIGS. 5 and 12, the change rate (2π/(π/2)) of the reflection phase Φr to the orientation angle φ in the optical element 1 according to Embodiment 1 is double the change rate (2π/π) of the reflection phase Φr to the orientation angle φ0 in the optical element 100 according to Comparative Example 4.

The following describes the retardation Rd of the first layer A1 with reference to FIGS. 1, 2, and 13A-17B. Note that grayscales in FIGS. 13A to 17B are color scales actually. As illustrated in FIG. 1, the retardation Rd of the first layer A1 is expressed by the following expression where Δn1 represents a birefringence of the first elements Q1 of the first layer A1 and L1 represents a thickness of the first layer A1.

$$Rd = \Delta n1 \times L1$$

The retardation Rd of the first layer A1 is preferably no less than $3\lambda c(2m+1)/8$ and no greater than $5\lambda c(2m+1)/8$ where λc represents a wavelength. "m" represents an integer of equal to or greater than 0. The wavelength λc is a wavelength of light entering the first layer A1 from the outside of the first layer A1.

For example, in a situation in which the optical element 1 is used as a reflection element, the wavelength λc is a wavelength of light capable of being selectively reflected by the second layer A2 and has a value in the selective reflection band of the second layer A2. The wavelength λc is for example a center wavelength of the selective reflection band, but is not limited to the center wavelength.

For example, in a situation in which the optical element 1 is used as a transmission element, the wavelength λc is a wavelength of light in a case where the polarization state of the light at incidence to the second layer A2 from the first layer A1 is contrary to the helical direction of the helix of each second structural body B2.

When the retardation Rd is no less than $3\lambda c(2m+1)/8$ and no greater than $5\lambda c(2m+1)/8$, 80% or more reflectance R of light having the wavelength λc can be attained in the optical element 1 used as a reflection element. Also, 80% or more transmittance T of light having the wavelength λc can be attained in the optical element 1 used as a transmission element.

It is the most preferable that "m" represents 0. That is, it is the most preferable that the retardation Rd of the first layer A1 is no less than $3\lambda c/8$ and no greater than $5\lambda c/8$. This is because the thickness L1 of the first layer A1 can be reduced when compared to a case where "m" represents any value other than 0. Moreover, reduction in thickness L1 of the first layer A1 can increase response speed of the first elements Q1.

For example, the retardation Rd of the first layer A1 is preferably no less than 210 nm and no greater than 350 nm when the wavelength λc is 560 nm.

For example, the thickness L1 of the first layer A1 is preferably no less than 1,050 nm and no greater than 1,750 nm when the wavelength λc is 560 nm and the birefringence Δn1 is "0.2".

Note that the wavelength λc can be used as a reference in designing the optical element 1, and therefore, may be referred to as a "reference wavelength λc".

Hereinafter, various calculations are performed under specific conditions using the retardation Rd of the first layer A1 as a variable with reference to FIGS. 2 and 13A-17B. Calculation by a matrix method is performed to calculate a reflectance R, a transmittance T, a reflection phase Φr, and a transmission phase Φt of the optical element 1 illustrated in FIG. 2 using the retardation Rd as a variable. The light LT is incident normally on the first boundary surface 11.

The first structural body B1 forms nematic liquid crystal. The refractive index ne1 of extraordinary light with respect to the first layer A1 is "1.7", and the refractive index no1 of ordinary light with respect to the first layer A1 is "1.5".

Figure 13A:
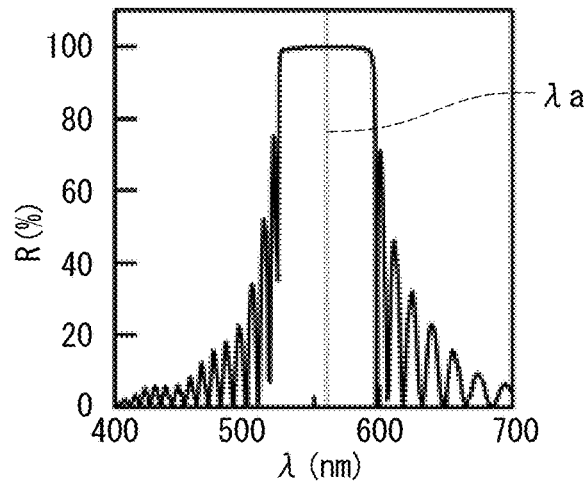
FIG. 13A is a graph representation showing reflectance when left circularly-polarized light enters the optical element according to Embodiment 1.
Figure 13B:
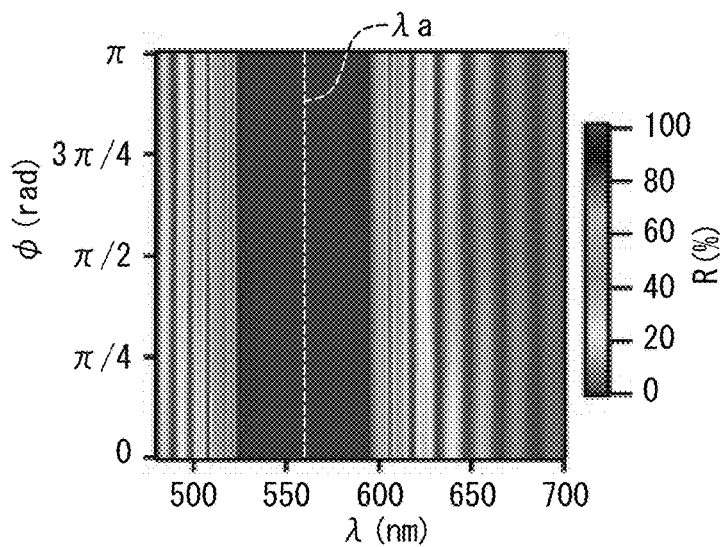
FIG. 13B is a graph representation showing dependencies of reflectance on wavelength and orientation angle when left circularly polarized light enters the optical element according to Embodiment 1.
Figure 13C:
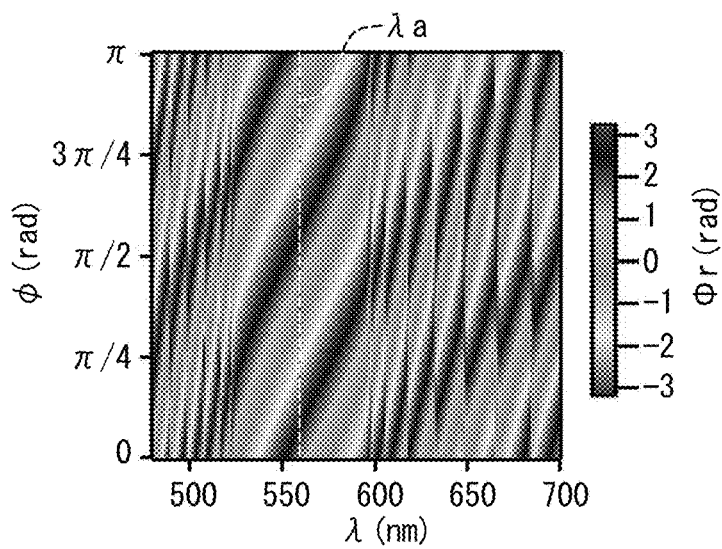
FIG. 13C is a graph representation showing dependencies of reflection phase on wavelength and orientation angle when left circularly polarized light enters the optical element according to Embodiment 1.

In calculation of the reflectance R and the reflection phase 1r shown in FIGS. 13A-13C, the thickness L1 of the first layer A1 is "1,400 nm". That is, the first layer A1 has a retardation of 280 nm and functions as a half-wavelength plate.

In calculation of the reflectance R, the transmittance T, the reflection phase Φr, and the transmission phase Φt shown in FIGS. 14A-17B, the thickness L1 of the first layer A1 is changed in increments of 25 nm in a range between 25 nm and 5,600 nm. In such a case, the wavelength λ of the light LT is fixed at a center wavelength λa (=560 nm) of the selective reflection band (from 525 nm to 595 nm) of the second layer A2. Furthermore, the direction of orientation of the first structural body B1 is represented by an orientation angle φ. The orientation angle φ is changed in increments of π/90 (radians) in a range between 0 (radians) to π (radians).

The second structural body B2 forms cholesteric liquid crystal. The helical direction of the helix of the second structural body B2 is a right helical direction. The second layer A2 accordingly reflects right circularly polarized light and transmits left circularly polarized light.

The second layer A2 reflects right circularly polarized light having a wavelength in the selective reflection band (from 525 nm to 595 nm). The center wavelength λa is 560 nm. The refractive index ne2 of extraordinary light with respect to the second layer A2 is "1.7", and the refractive index no2 of ordinary light with respect to the second layer A2 is "1.5". The thickness L2 of the second layer A2 is "7,000 nm", and the pitch p of the helix of the second structural body B2 is "350 nm". Furthermore, the direction of orientation of the second structural body B2 is represented by an orientation angle φ0. The orientation angle φ0 is 0 (radians).

FIG. 13A is a graph representation showing reflectance R of left circularly polarized light at incidence to the optical element 1 as the light LT. In FIG. 13A, a horizontal axis indicates wavelength λ of the light LT and a vertical axis indicates reflectance R. As shown in FIG. 13A, the reflectance R of the left circularly polarized light is approximately 100% in the selective reflection band (from 525 nm to 595 nm). The center wavelength λa is 560 nm. The orientation angle φ in this example is 0 (radians). Note that the first layer A1 reverses the direction of circulation of the circularly polarized light with a result that left circularly polarized light is reversed to right circularly polarized light at incidence to the second layer A2.

FIG. 13B is a graph representation showing dependencies of reflectance R on wavelength λ and orientation angle φ when left circularly polarized light enters the optical element 1 as the light LT1. In FIG. 13B, a horizontal axis indicates wavelength λ (nm), a vertical axis on the left side indicates orientation angle φ (radian) of the first structural body B1, and a grayscale on the right side indicates reflectance R (%) of the light LT.

As shown in FIG. 13B, the second layer A2 reflects light (right circularly polarized light at incidence on the third boundary surface 13), of the light LT1, having a wavelength λ in the selective reflection band (from 525 nm to 595 nm) when the orientation angle φ of the first structural body B1 is in a range from no less than 0 to no greater than π. This is because left circularly polarized light entering the optical element 1 is reversed to the right circularly polarized light by the first layer A1.

FIG. 13C is a graph representation showing dependencies of reflection phase Φr on wavelength λ and orientation angle φ when left circularly polarized light enters the optical element 1 as the light LT. In FIG. 13C, a horizontal axis indicates wavelength λ (nm) of the light LT, a vertical axis on the left side indicates orientation angle φ (radian) of the first structural body B1, and a grayscale on the right side indicates reflection phase Φr (radian) of the light LT.

As illustrated in FIG. 13C, the reflection phase Φr of light, of the light LT, having a wavelength λ in the selective reflection band (from 525 nm to 595 nm) changes depending on the orientation angle φ of the first structural body B1.

Figure 14A:
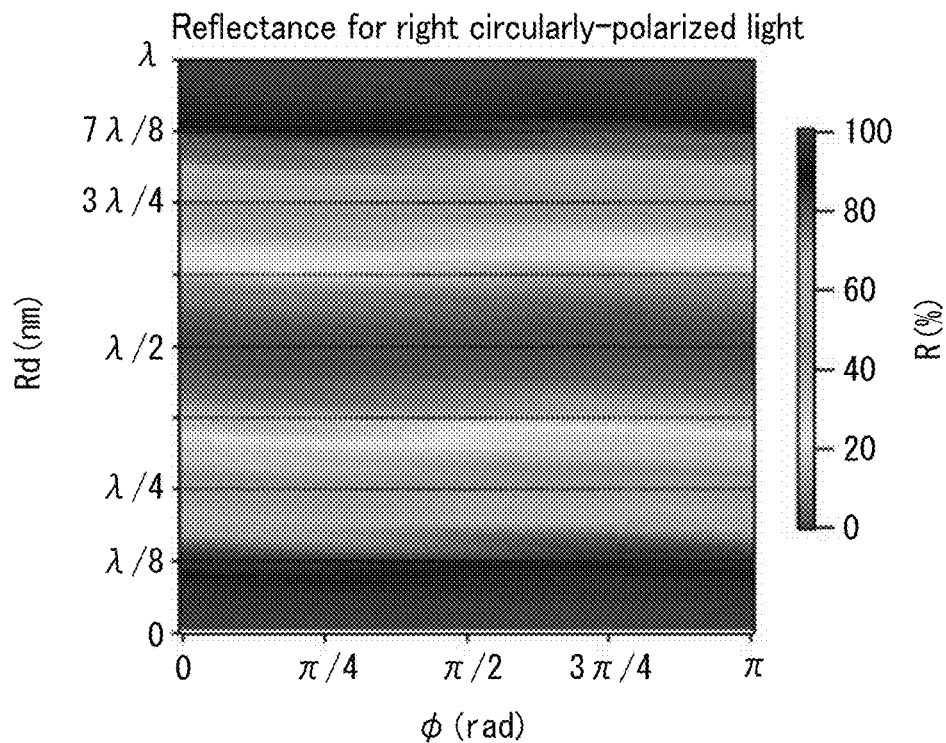
FIG. 14A is a graph representation showing retardation and reflectance when right circularly-polarized light enters the optical element according to Embodiment 1.
Figure 14B:
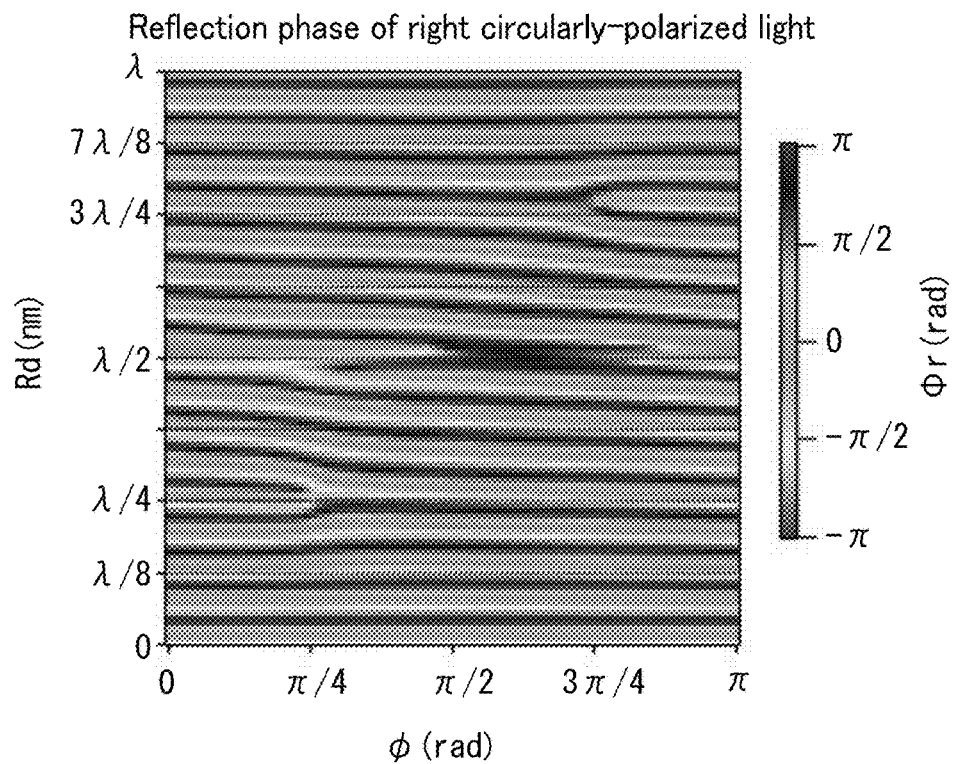
FIG. 14B is a graph representation showing retardation and reflection phase when right circularly-polarized light enters the optical element according to Embodiment 1.

FIG. 14A is a graph representation showing dependencies of reflectance R on orientation angle φ and retardation Rd when right circularly polarized light is incident as the light LT. FIG. 14B is a graph representation showing dependencies of reflection phase Φr on orientation angle φ and retardation Rd when right circularly polarized light is incident as the light LT. In each of FIGS. 14A and 14B, a horizontal axis indicates orientation angle φ of the first structural body B1 and a vertical axis on the left side indicates retardation Rd. A grayscale on the right side in FIG. 14A indicates reflectance R, while a grayscale on the right side in FIG. 14B indicates reflection phase Φr.

As illustrated in FIG. 14A, the reflectance R is no less than 80% when the retardation Rd is in a range from no less than 0 (radians) to no greater than λ/8 (radians). When the retardation Rd is in a range from no less than 7λ/8 (radians) to no greater than λ (radians), the reflectance R is no less than 80%.

By contrast, as shown in FIG. 14B, the reflection phase Φr does not depend on the orientation angle φ when the retardation Rd is in a range from no less than 0 (radians) to no greater than λ/8 (radians). The reflection phase Φr also does not depend on the orientation angle φ when the retardation Rd is in a range from no less than 7λ/8 (radians) to no greater than λ (radians).

Figure 15A:
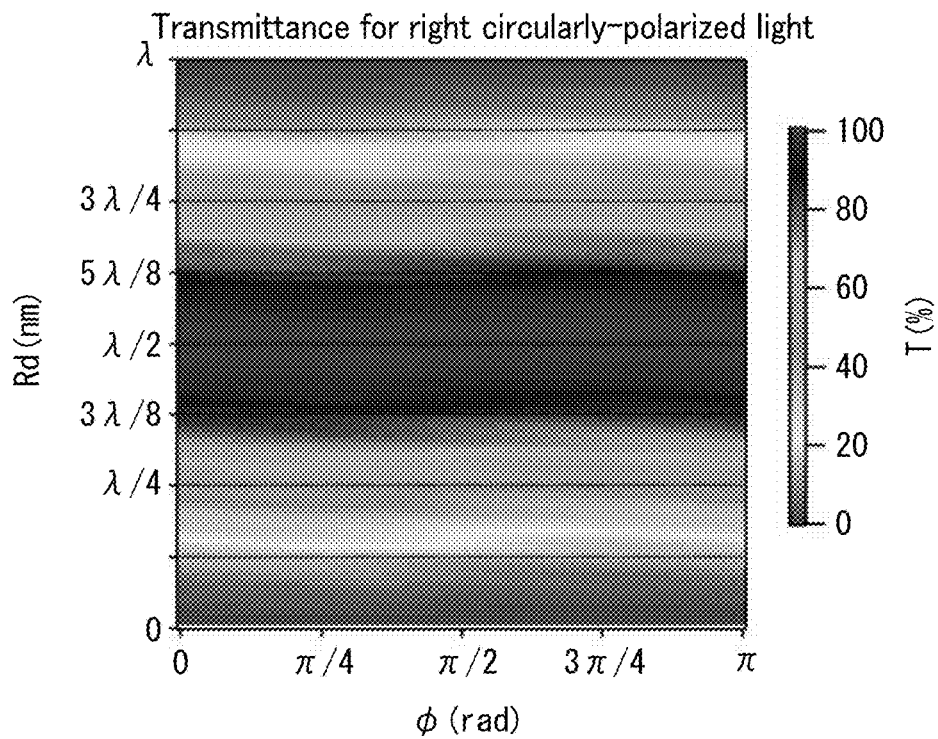
FIG. 15A is a graph representation showing retardation and transmittance when right circularly-polarized light enters the optical element according to Embodiment 1.
Figure 15B:
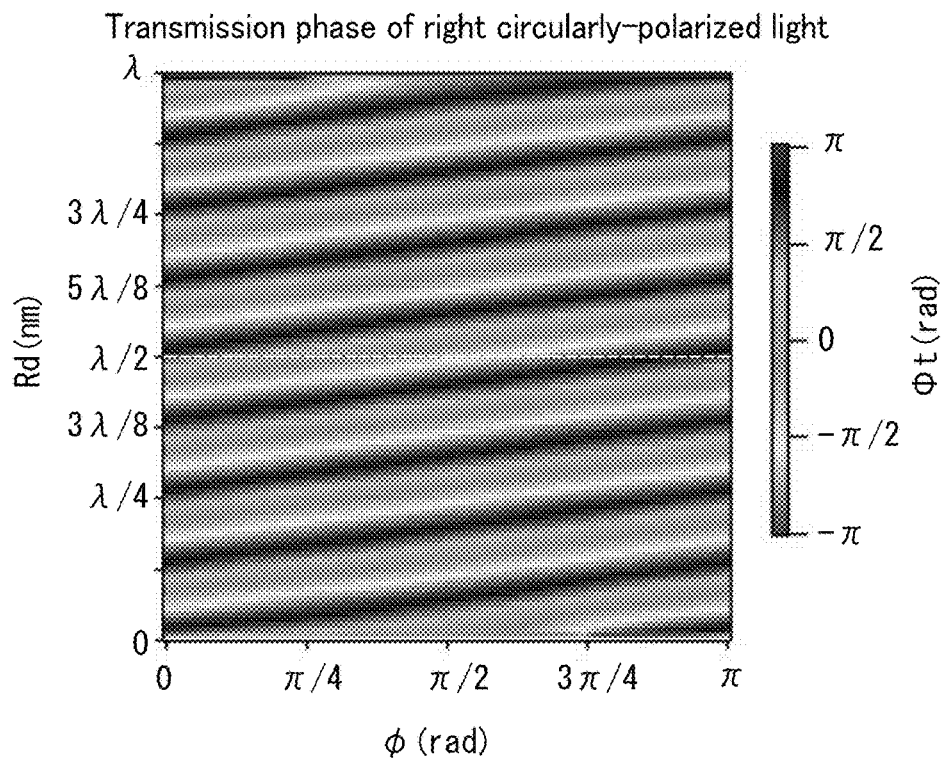
FIG. 15B is a graph representation showing retardation and transmission phase when right circularly-polarized light enters the optical element according to Embodiment 1.

FIG. 15A is a graph representation showing dependencies of transmittance T on orientation angle φ and retardation Rd when right circularly polarized light is incident as the light LT. FIG. 15B is a graph representation showing dependencies of transmission phase Φt on orientation angle φ and retardation Rd when right circularly polarized light is incident as the light LT. In each of FIGS. 15A and 15B, a horizontal axis indicates orientation angle φ of the first structural body B1 and a vertical axis on the left side indicates retardation Rd. A grayscale on the right side in FIG. 15A indicates transmittance T, while a grayscale on the right side in FIG. 15B indicates transmission phase Φt.

As illustrated in FIG. 15A, the transmittance T is no less than 80% when the retardation Rd is in a range from no less than 3λ/8 (radians) to no greater than 5λ/8 (radians).

By contrast, as shown in FIG. 15B, the transmission phase Φt depends on the orientation angle φ when the retardation Rd is in a range from no less than 3λ/8 (radians) to no greater than 5λ/8 (radians). Specifically, the transmission phase Φt changes by 2π with respect to change in orientation angle φ (see broken line in the drawing) by π (radian) within the above range.

Figure 16A:
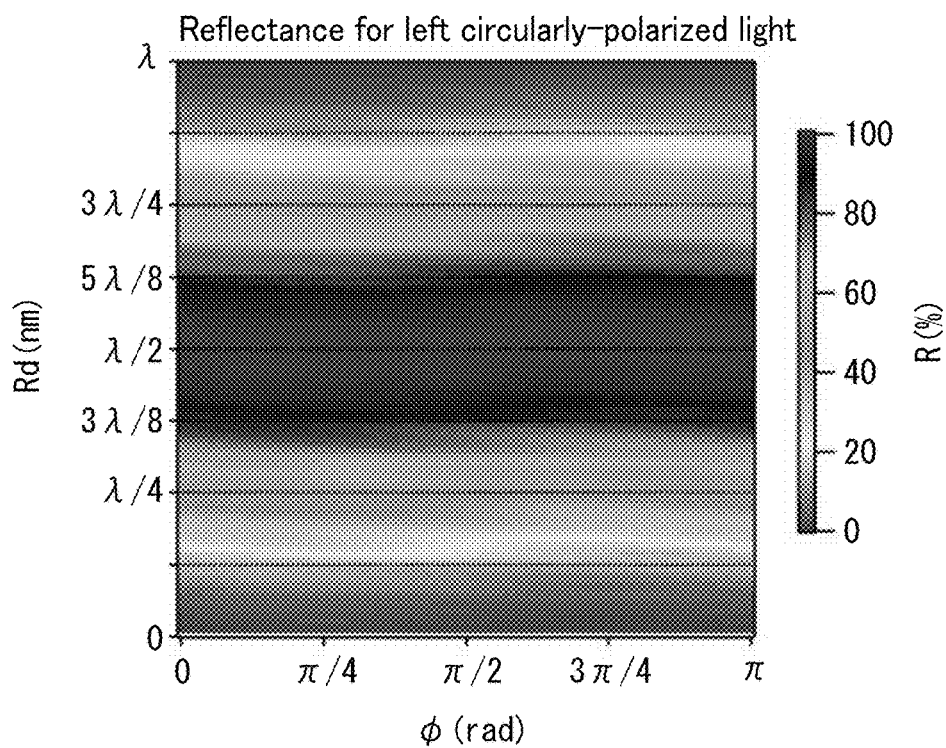
FIG. 16A is a graph representation showing retardation and reflectance when left circularly-polarized light enters the optical element according to Embodiment 1.
Figure 16B:
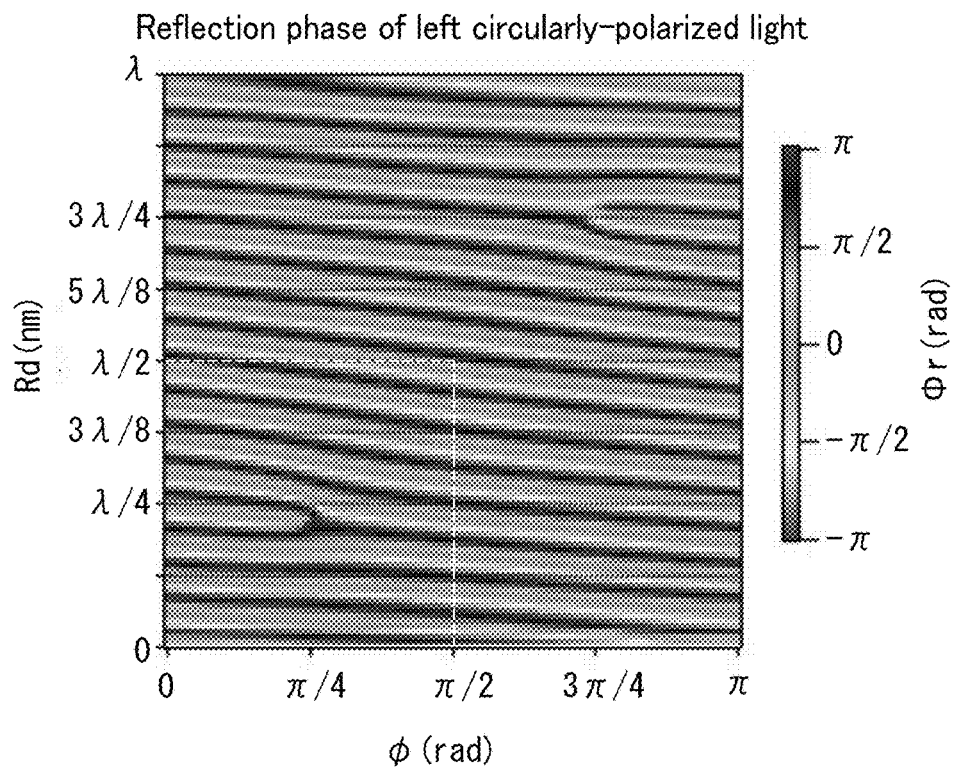
FIG. 16B is a graph representation showing retardation and reflection phase when left circularly-polarized light enters the optical element according to Embodiment 1.

FIG. 16A is a graph representation showing dependencies of reflectance R on orientation angle φ and retardation Rd when left circularly polarized light is incident as the light LT. FIG. 16B is a graph representation showing dependencies of reflection phase Φr on orientation angle φ and retardation Rd when left circularly polarized light is incident as the light LT. In each of FIGS. 16A and 16B, a horizontal axis indicates orientation angle φ of the first structural body B1 and a vertical axis on the left side indicates retardation Rd. A grayscale on the right side in FIG. 16A indicates reflectance R, while a grayscale on the right side in FIG. 16B indicates reflection phase Φr.

As illustrated in FIG. 16A, the reflectance R is no less than 80% when the retardation Rd is in a range from no less than 3λ/8 (radians) to no greater than 5λ/8 (radians).

By contrast, as shown in FIG. 16B, the reflection phase Φr depends on the orientation angle φ when the retardation Rd is in a range from no less than 3λ/8 (radians) to no greater than 5λ/8 (radians). Specifically, the reflection phase Φr changes by 2π (radians) with respect to change in orientation angle φ (see broken line in the drawing) by π/2 (radians) within the above range.

Figure 17A:
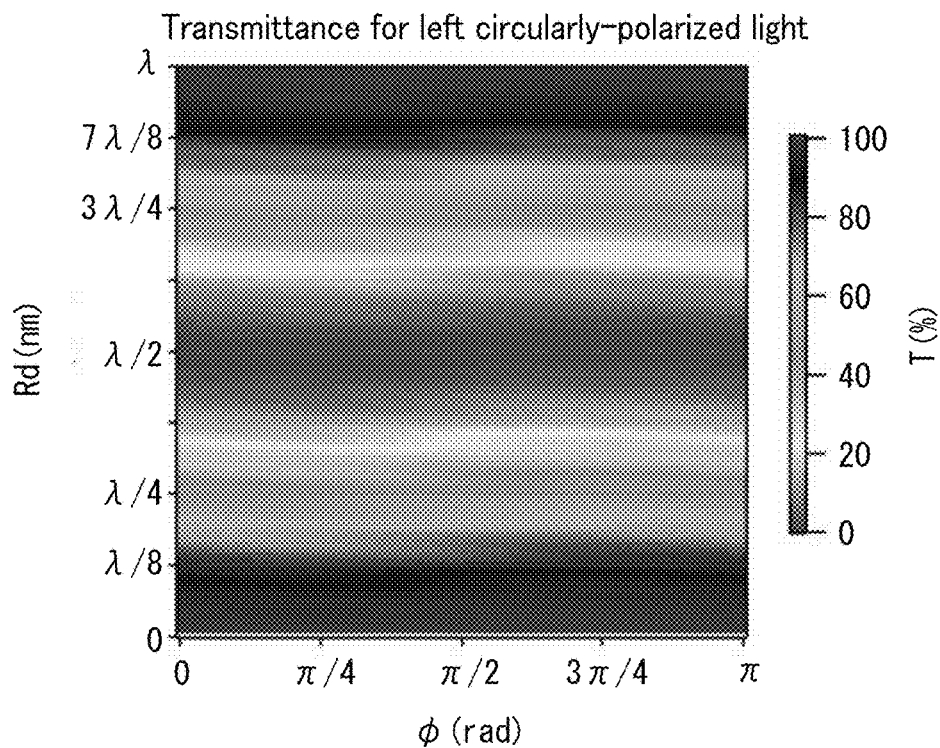
FIG. 17A is a graph representation showing retardation and transmittance when left circularly-polarized light enters the optical element according to Embodiment 1.
Figure 17B:
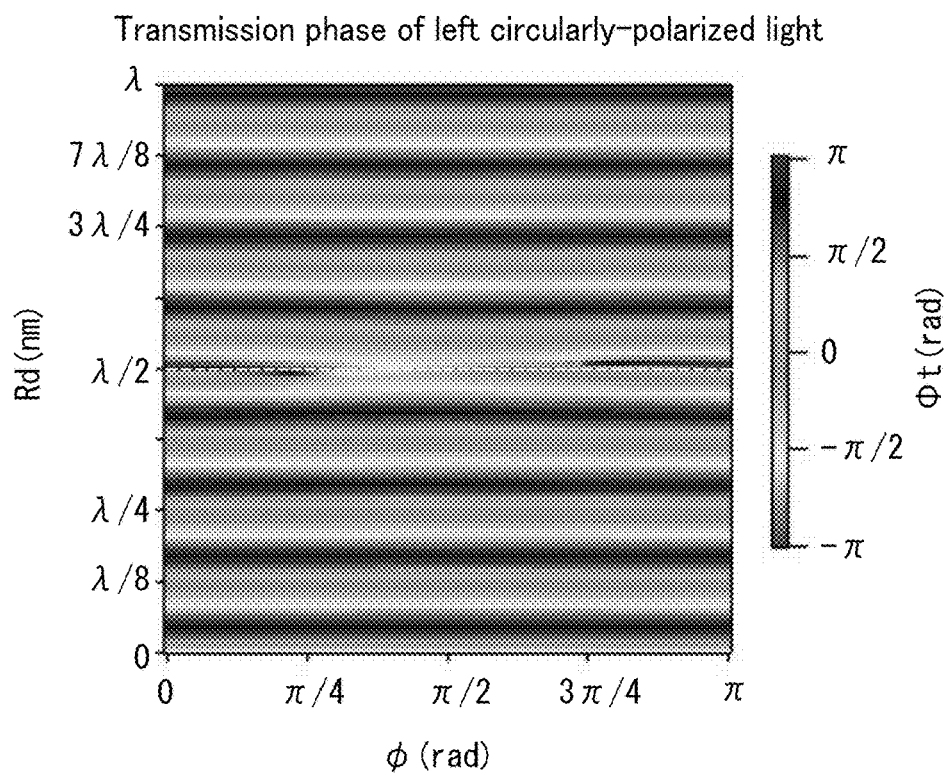
FIG. 17B is a graph representation showing retardation and transmission phase when left circularly-polarized light enters the optical element according to Embodiment 1.

FIG. 17A is a graph representation showing dependencies of transmittance T on orientation angle φ and retardation Rd when left circularly polarized light is incident as the light LT. FIG. 17B is a graph representation showing dependencies of transmission phase Φt on orientation angle φ and retardation Rd when left circularly polarized light is incident as the light LT. In each of FIGS. 17A and 17B, a horizontal axis indicates orientation angle φ of the first structural body B1 and a vertical axis on the left side indicates retardation Rd. A grayscale on the right side in FIG. 17A indicates transmittance T, while a grayscale on the right side in FIG. 17B indicates transmission phase Φt.

As illustrated in FIG. 17A, the transmittance T is no less than 80% when the retardation Rd is in a range from no less than 0 (radians) to no greater than λ/8 (radians). When the retardation Rd is in a range from no less than 7λ/8 (radians) to no greater than λ (radians), the transmittance T is no less than 80%.

By contrast, as shown in FIG. 17B, the transmission phase Φt does not depend on the orientation angle φ when the retardation Rd is in a range from no less than 3λ/8 (radians) to no greater than 5λ/8 (radians). The transmission phase Φt also does not depend on the orientation angle φ when the retardation Rd is in a range from no less than 7λ/8 (radians) to no greater than λ (radians).

For utilization of the wavefront of light entering the optical element 1 through change of the wavefront, the reflectance of the light on the second layer A2 is preferably high. By contrast, for realization of a hologram element precisely exhibiting a wavefront of a three-dimensional object through use of the optical element 1, a complex amplitude of light, that is, both the phase and the intensity of reflected light are preferably modulated.

Specifically, as is clear from FIGS. 16A and 16B, both the reflection phase Φr and the reflectance R can be controlled by spatially changing both the orientation angle φ and the retardation Rd of the first structural bodies B1 of the first layer A1. For example, the direction of orientation of the first elements Q1 is not limited within a plane perpendicular to the Z-axis, and the retardation Rd can be changed spatially by arranging the first elements Q1 across the plane. That is, inclination of the direction of orientation of the first elements Q1 with respect to a plane perpendicular to the Z-axis can change the retardation Rd spatially. In such a case, the retardation Rd may be dynamically controlled by using an alignment film that aligns the direction of orientation of the first elements Q1 outward of the plane or by aligning the direction of orientation of the first elements Q1 outward of the plane through voltage application.

The following describes an example of a configuration addable to the optical element 1 with reference to FIG. 1. A medium that encourages alignment of the liquid crystal may be disposed between the first layer A1 and the second layer A2. Alternatively, an insulative thin film or a conductive thin film may be disposed between the first layer A1 and the second layer A2. Furthermore, a medium that encourages alignment of the liquid crystal may be disposed between the substrate SB1 and the first layer A1. Alternatively, an electrode, an insulation thin film, or a conductive thin film may be disposed between the substrate SB1 and the first layer A1. Furthermore, a medium that encourages alignment of the liquid crystal may be disposed between the substrate SB2 and the second layer A2. Alternatively, an insulative thin film or a conductive thin film may be disposed between the substrate SB2 and the second layer A2.

The medium that encourages alignment of the liquid crystal is for example polyimide. The insulative thin film is made of for example polymer. The conductive thin film is made of for example an indium tin oxide (ITO).

The following describes alignment patterns of the first structural bodies B1 of the first layer A1 with reference to FIGS. 1 and 18-23B using specific examples. The first layer A1 includes a plurality of first structural bodies different from one another in direction of orientation. In the above configuration, the first structural bodies B1 can be in a linear alignment pattern or a non-linear alignment pattern. The linear alignment pattern is a pattern in which the direction of orientation of the first structural bodies B1 changes linearly. The words "changes linearly" means for example that an amount of change in direction of orientation of the first structural bodies B1 is expressed by a linear function. The non-linear alignment pattern refers to a pattern in which the direction of orientation of the first structural bodies B1 changes non-linearly. The words "changes non-linearly" means for example that an amount of change in direction of orientation of the first structural bodies B1 is expressed by an N-order function. "N" represents an integer of equal to or greater than 2.

Figure 18:
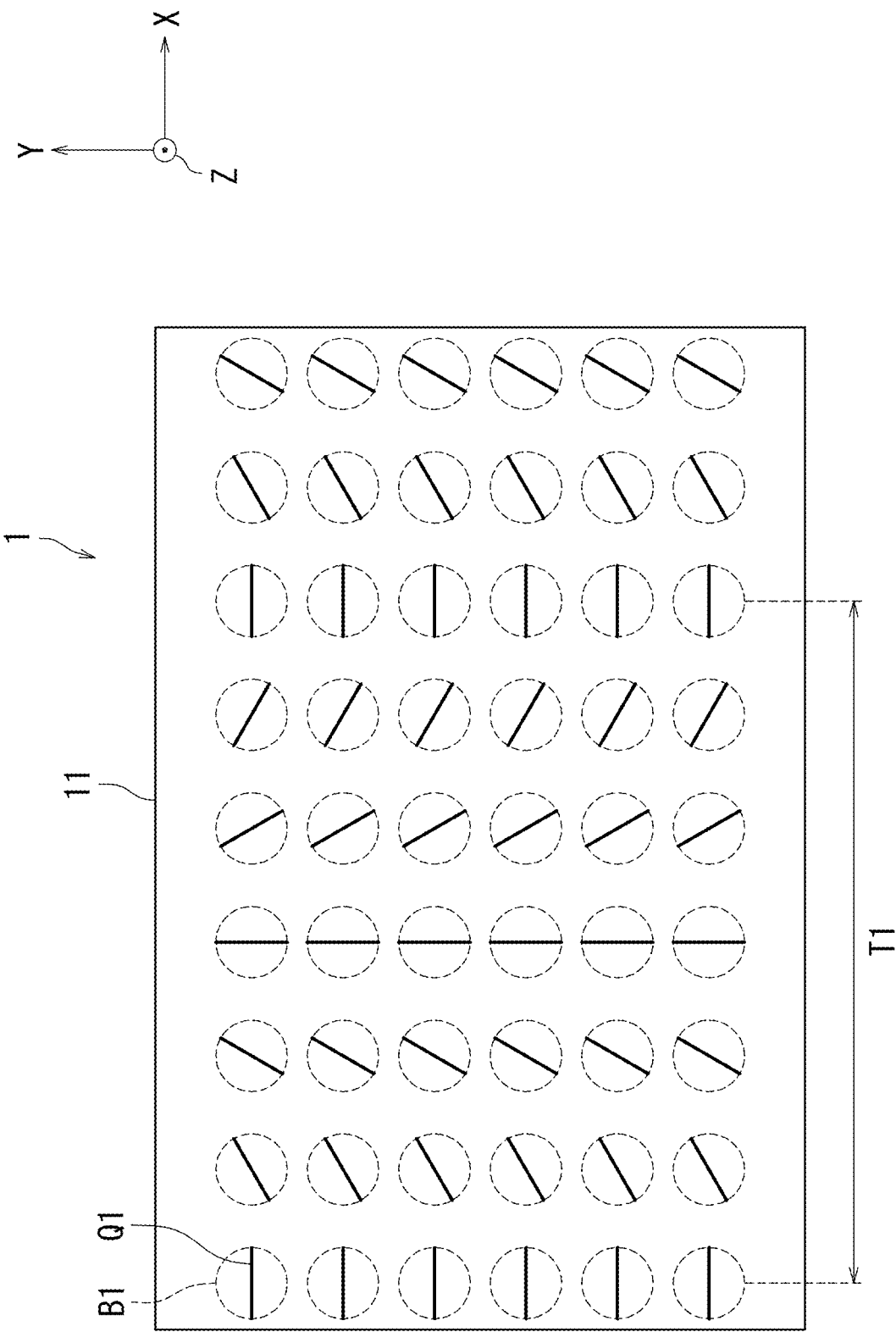
FIG. 18 is a plan view illustrating the optical element according to Embodiment 1 that has a first alignment pattern.
Figure 19:
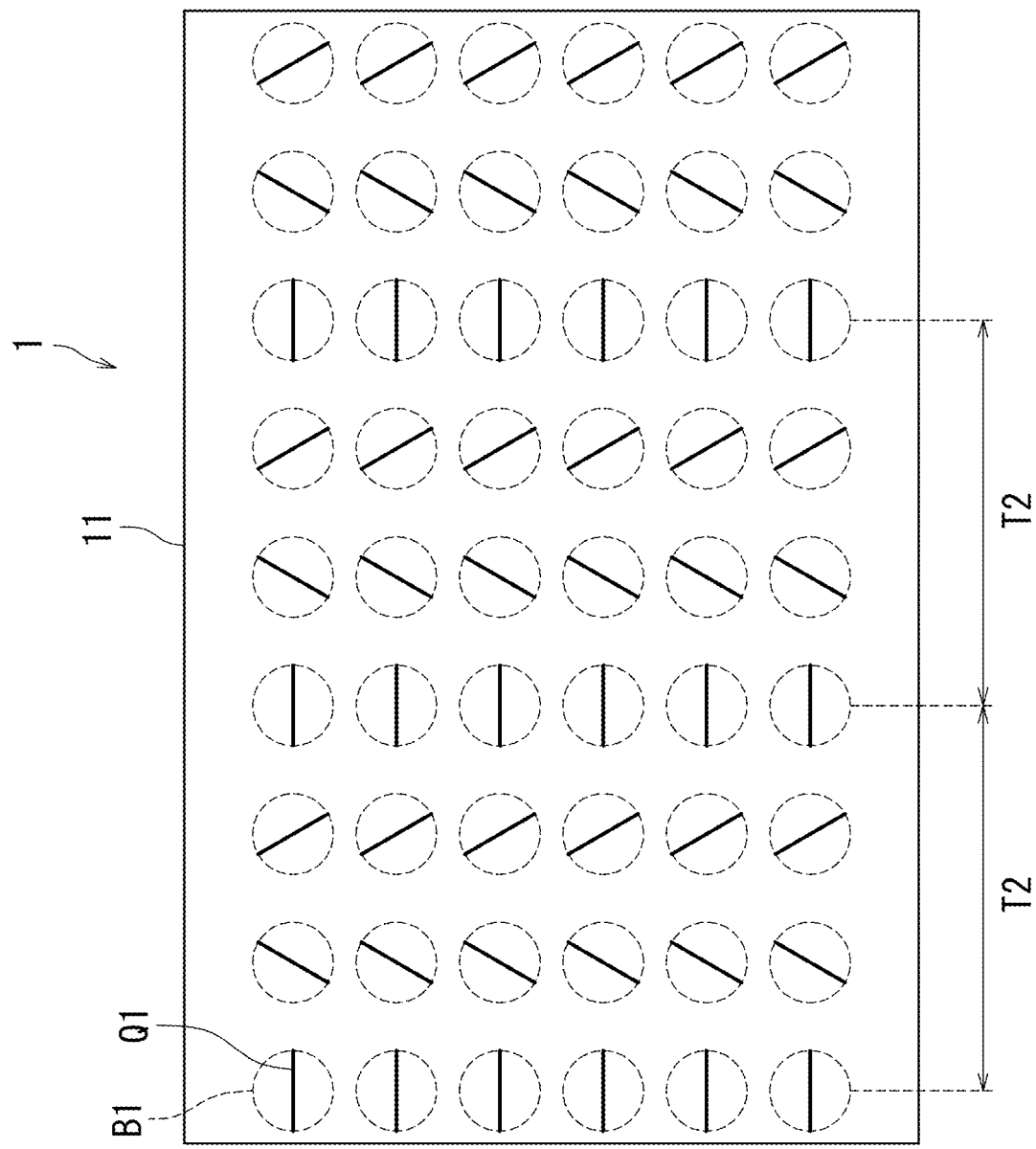
FIG. 19 is a plan view illustrating the optical element according to Embodiment 1 that has a second alignment pattern.

FIGS. 18 and 19 respectively illustrate a first alignment pattern and a second alignment pattern in Embodiment 1 as examples of the linear alignment pattern. FIGS. 20 to 23B illustrate third to sixth alignment patterns in Embodiment 1 as examples of the non-linear alignment pattern. In FIGS. 18-23B, the substrate SB1 is omitted and the first boundary surface 11 is illustrated in order to simplify the drawings. Also, the optical element 1 is viewed in the Z direction.

(First Alignment Pattern)

The first alignment pattern will be described with reference to FIGS. 1 and 18. FIG. 18 is a plan view illustrating the optical element 1 having the first alignment pattern. As illustrated in FIG. 18, the first structural bodies B1 are arranged in the first alignment pattern. Specifically, the first structural bodies B1 are arranged in the X direction and the Y direction. The directions of orientation of first structural bodies B1, among the first structural bodies B1, arranged in the X direction vary linearly in the X direction. Specifically, the directions of orientation of the first structural bodies B1 vary at constant angles.

By contrast, the directions of orientation of first structural bodies B1, among the first structural bodies B1, arranged in the Y direction are identical to one another.

When the first structural bodies B1 are arranged in the first alignment pattern, the wavefront F2 of the light LT2 output through the first boundary surface 11 inclines with respect to the wavefront F2 of the light LT2 incident on the first boundary surface 11 and has a linear gradient. For example, when the directions of orientation of the first structural bodies B1 vary angle θ by angle θ in the X direction, the inclination angle of the wavefront F2 at output is 40 with respect to the wavefront F2 of the light LT2 at incidence. In the first alignment pattern, the directions of orientation of the first structural bodies B1 vary so that the wavefront F2 has a linear gradient.

When the first structural bodies B1 are arranged in the first alignment pattern in Embodiment 1, the light LT2 having the inclined wavefront F2 can be output. That is, the light LT2 that is deflected can be output. As a result, for example, the optical element 1 is applicable to a circular polarization beam splitter or an optical isolator.

In the following description of the present specification, an interval between two first structural bodies B1 where the directions of orientation vary by 180 degrees in a specific direction is defined as a period T of the first structural bodies B1. Accordingly, the direction of orientation at the end of a period T is 180 degrees and the direction of orientation at the beginning of the next period T is 0 degrees. However, since the end of one period T is the beginning of the next period, the direction of orientation of a first structural body B1 at the end of the one period T and the direction of orientation of a first structural body B1 at the beginning of the next period T1 are identical to each other. In the first alignment pattern, an interval between structural bodies B1 located on the opposite ends of which directions of orientation differ from each other by 180 degrees in the X direction A2 is a period T of the first structural bodies B1. The period T of the first structural body B1 in the first alignment pattern is referred to as a "period T1".

Note that the wavefront F3 of the light LT3 output toward the outside from the second layer A2 also inclines with respect to the wavefront F3 of the light LT3 incident on the first boundary surface 11, and has a linear gradient corresponding to the phase of the light LT3 at incidence to the second layer A2 according to the first alignment pattern.

(Second Alignment Pattern)

The following describes the second alignment pattern with reference to FIGS. 1 and 19. The second alignment pattern is different from the first alignment pattern in that the period T of the second structural bodies B1 is shorter than that in the first alignment pattern. The following mainly describes differences of the second alignment pattern from the first alignment pattern.

FIG. 19 is a plan view illustrating the optical element 1 having the second alignment pattern. As illustrated in FIG. 19, the period T of the first structural bodies B1 in the second alignment pattern (also referred to below as a "period T2") is approximately ½ of the period T1 in the first alignment pattern. Accordingly, in a configuration in which the first structural bodies B1 are arranged in the second alignment pattern, the inclination angle of the wavefront F2 at output with respect to the wavefront F2 at incidence is approximately double the inclination angle of the wavefront F2 in the first alignment pattern. In the second alignment pattern, the directions of orientation of the first structural bodies B1 vary so that the wavefront F2 has a linear gradient.

As described with reference to FIGS. 18 and 19, adjustment of the period T of the first structural bodies B1 can facilitate adjustment of the inclination angle of the wavefront F2 of the light LT2 in Embodiment 1. That is, the deflection direction of the light LT2 can be easily adjusted. Increasing the period T can reduce the inclination angle of the wavefront F2. Reducing the period T can increase the inclination angle of the wavefront F2. Furthermore, the optical element 1 may have three or more periods T.

Note that the wavefront F3 of the light LT3 output toward the outside from the second layer A2 also inclines with respect to the wavefront F3 of the light LT3 incident on the first boundary surface 11, and has a linear gradient corresponding to the phase of the light LT3 at incidence to the second layer A2 according to the second alignment pattern.

(Third Alignment Pattern)

Figure 20:
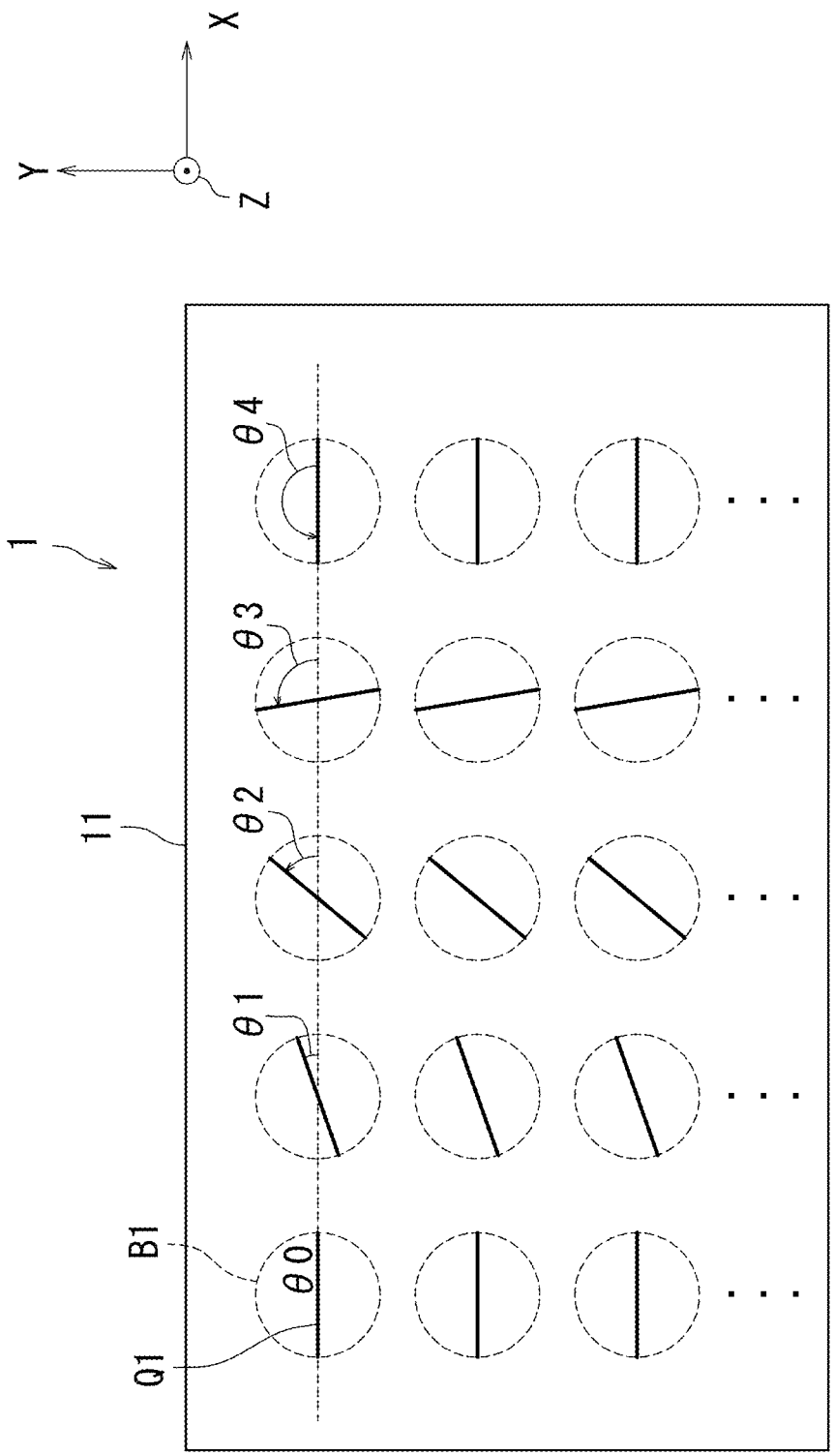
FIG. 20 is a plan view illustrating the optical element according to Embodiment 1 that has a third alignment pattern.

The following describes the third alignment pattern with reference to FIGS. 1 and 20. The third alignment pattern is different from the first alignment pattern in that the wavefront F2 of the light LT2 at output toward the outside is a curved surface rather than a flat surface as in the first alignment pattern. The following mainly describes differences of the third alignment pattern from the first alignment pattern.

FIG. 20 is a plan view illustrating the optical element 1 having the third alignment pattern. As illustrated in FIG. 20, the first structural bodies B1 are arranged in the third alignment pattern. Specifically, the first structural bodies B1 are arranged in the X direction and the Y direction. The directions of orientation of first structural bodies B1, among the first structural bodies B1, arranged in the X direction vary non-linearly in the X direction. Specifically, an amount of change in directions of orientation of the first structural bodies B1 is expressed by a quadratic function. For example, the directions of orientation of the first structural bodies B1 change from at an angle of θ0 to at an angle of θ1, an angle of θ2, an angle of θ3, and then an angle of θ4 (θ0<θ1<θ2<θ3<θ4) in the X direction. The amounts of change in direction of orientation of the first structural bodies B1 are (θ1-θ0), (θ2-θ1), (θ3-θ2), and (θ4-θ3) in the X direction. That is, the amount of change in direction of orientation of the first structural bodies B1 gradually increases in the X direction.

According to Embodiment 1, when the first structural bodies B1 are arranged in the third alignment pattern, the wavefront F2 of the light LT2 output through the first boundary surface 11 has a curved surface. That is, in the third alignment pattern, the directions of orientation of the first structural bodies B1 vary such that the wavefront F2 has a curved surface.

Note that the wavefront F3 of the light LT3 output toward the outside from the second layer A2 also has a curved surface corresponding to the phase of the light LT3 at incidence to the second layer A2 according to the third alignment pattern.

(Fourth Alignment Pattern)

Figure 21A:
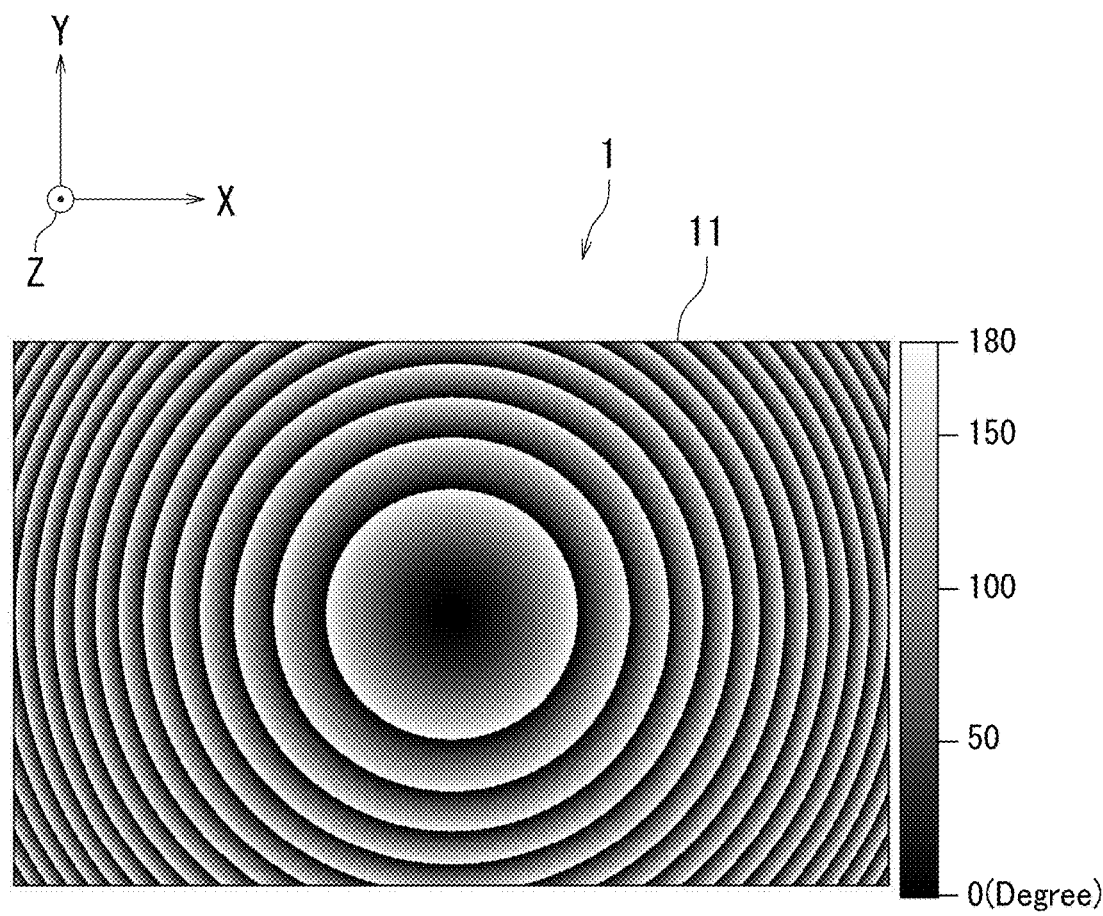
FIG. 21A is a plan view illustrating the optical element according to Embodiment 1 that has a fourth alignment pattern.
Figure 21B:
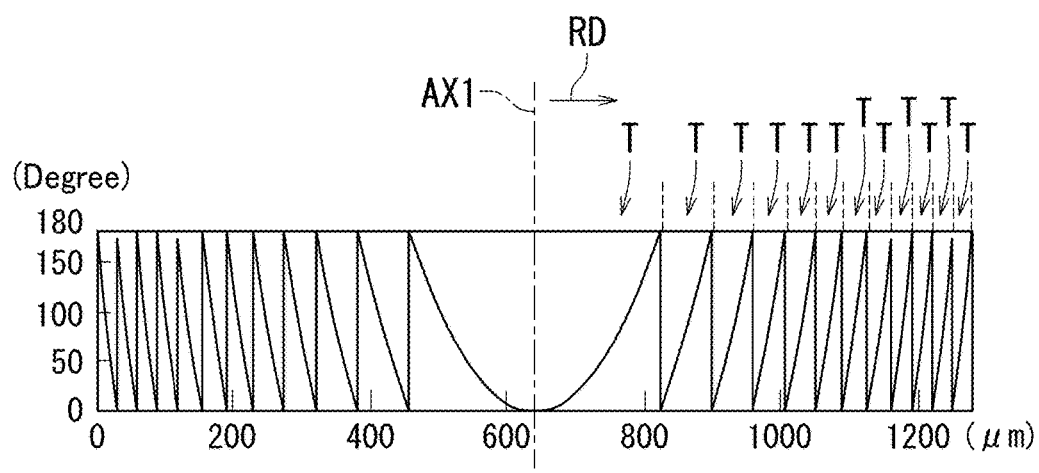
FIG. 21B is a graph representation showing orientation distribution of a plurality of first structural bodies according to Embodiment 1.

The following describes the fourth alignment pattern with reference to FIGS. 1, 21A, and 21B. The fourth alignment pattern is different from the third alignment pattern in that the wavefront F2 of the light LT2 at output toward the outside is a line-symmetrical curved surface in the fourth alignment pattern. The following mainly describes differences of the fourth alignment pattern from the third alignment pattern.

That is, the first structural bodies B1 are arranged in the fourth alignment pattern. Specifically, the first structural bodies B1 are arranged in a radial manner about a symmetry axis AX1 as a center such as to be symmetrical with respect to the symmetry axis AX1 of the first layer A1. The symmetry axis AX1 is substantially parallel to the Z direction. That is, the directions of orientation of the first structural bodies B1 are symmetrical with respect to the symmetry axis AX1.

FIG. 21A is a plan view illustrating the optical element 1 having the fourth alignment pattern. In FIG. 21A, the directions of orientation of the first structural bodies B1 are represented by rotational angles of the first elements Q1 when the optical element 1 is viewed in the Z direction. Furthermore, FIG. 21A shows a rotational angle of 0 degrees in a black color and a rotational angle of 180 degrees in a white color. Gray colors having different brightness are used to show values between 0 degrees and 180 degrees. A darker gray color represents a value closer to 0 degrees, and a lighter gray color represents a value closer to 180 degrees.

FIG. 21B is a graph representation showing the orientation distribution of the first structural bodies B1. A vertical axis indicates rotational angle of the first elements Q1, while a horizontal axis indicates location on the first layer A1 in a radial direction RD. The radial direction RD is a direction substantially perpendicular to the symmetry axis AX1 of the first layer A1 and a direction away from the symmetry axis AX1. It is possible that the radial direction RD is a direction at any degree(s) of 360 degrees so long as being substantially perpendicular to the symmetry axis AX1 and being a direction away from the symmetry axis AX1.

As illustrated in FIGS. 21A and 21B, the rotational angles of the first elements Q1 arranged in the radial direction RD differ from one another. That is, the directions of orientation of the first structural bodies B1 arranged in the radial direction RD differ from one another.

Specifically, distribution of rotational angles of the first elements Q1 is symmetrical with respect to the symmetry axis AX1 and concentric. Further, the rotational angles of the first elements Q1 vary in a sawtooth manner in the radial direction R. The rotational angles of the first elements Q1 vary in a curved manner from 0 degrees to 180 degrees in the radial direction RD, starting from the symmetry axis AX1 in each of periods T of the first structural bodies B1. For example, the rotational angles vary parabolically (i.e., quadratically). Note that the rotational angles of the first elements Q1 may vary in a sawtooth manner in each half (T/2) of the periods of the first structural bodies B1. In such a case, the rotational angles of the first elements Q1 vary in a curved manner from 0 degrees to 90 degrees or from 90 degrees to 180 degrees in the radial direction RD, starting from the symmetric axis AX1 in each half period.

The periods T of the first structural bodies B1 decrease stepwise in the radial direction RD starting from the symmetric axis AX1 in the fourth alignment pattern. The longer the period T is, the smaller change in gradient of the rotational angles of the first elements Q1 is. The shorter the period T is, the larger the change in gradient of the rotational angles of the first elements Q1 is.

As illustrated in FIGS. 21A and 21B, when the rotational angles of the first elements Q1 are changed, that is, when the directions of orientation of the first structural bodies B are changed, the wavefront F2 of the light LT2 at output toward the outside has a curved surface symmetrical with respect to the symmetry axis AX1. That is, in the fourth alignment pattern, the directions of orientation of the first structural bodies B1 vary such that the wavefront F2 has a curved surface symmetrical with respect to the symmetry axis AX1. The curved surface is projected in a direction opposite to an incident direction of the light LT2 (direction opposite to the Z direction). The curved surface is for example a dome-like surface or a truncated dome-like surface.

According to Embodiment 1, when the first structural bodies B1 are arranged in the fourth alignment pattern, the wavefront F2 of the light LT2 at output toward the outside has a curved surface projecting in a direction opposite to the indecent direction of the light LT2. Thus, the light LT2 can be diffused. As a result, the optical element 1 is applicable to for example a holographic optical element. The optical element 1 is also applicable to a concave lens. Furthermore, the wavefront F2 is symmetrical with respect to the symmetry axis AX1. Therefore, the light L2 can be diffused evenly about the symmetry axis AX1 as a center.

Furthermore, adjustment of the periods T of the first structural bodies B1 can facilitate adjustment of a diffusion range of the light LT2 (i.e., a range in which the light LT2 diffuses). The longer the period T is, the larger the radius of curvature of the wavefront F2 is. Therefore, the diffusion range of the light LT2 can be reduced. The shorter the period T is, the smaller the radius of curvature of the wavefront F2 is. Therefore, the diffusion range of the light LT2 can be increased. For example, since a viewing angle characteristic that is the diffusion range of the light LT2 can be easily adjusted, application of the optical element 1 to a display is favorable.

Furthermore, the rotational angles of the first elements Q1 vary in a sawtooth manner in the radial direction RD in Embodiment 1. Thus, the light LT2 can be diffused further effectively.

Note that the symmetric axis AX1 may incline with respect to the Z direction. In such a case, the direction of the wavefront F2 at output toward the outside changes, and thus, the light LT2 can be deflected and diffused. Alternatively, the directions of orientation of the first structural bodies B1 may be changed such that the curved surface in the wavefront F2 is a curved surface projecting in the incident direction of the light LT2 (Z direction). In such a case, the light LT2 at output is condensed. Accordingly, the optical element 1 is applicable to a convex lens. The longer the period T is, the larger the radius of curvature of the wavefront F2 is. Therefore, the focal length of the light LT2 can be increased. The shorter the period T is, the smaller the radius of curvature of the wavefront F2 is. Therefore, the focal length of the light LT2 can be reduced.

Furthermore, the wavefront F3 of the light LT3 output toward the outside from the second layer A2 also has a curved surface corresponding to the phase of the light LT3 at incidence to the second layer A2 according to the fourth alignment pattern.

(Fifth Alignment Pattern)

Figure 22:
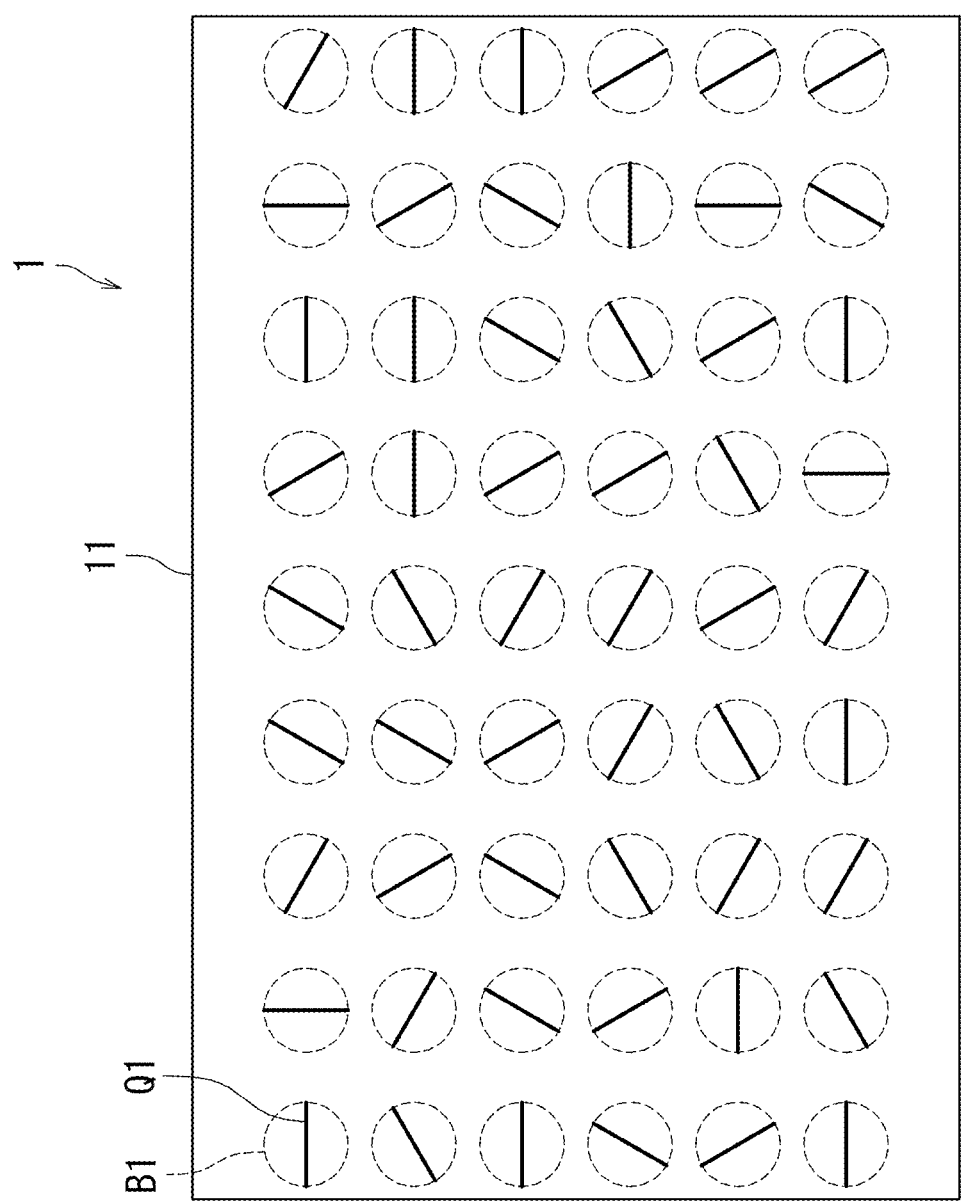
FIG. 22 is a plan view illustrating the optical element according to Embodiment 1 that has a fifth alignment pattern.

The following describes the fifth alignment pattern with reference to FIGS. 1 and 22. The fifth alignment pattern is different from the first alignment pattern in that the wavefront F3 of the light LT2 at output in the fifth alignment pattern is in an irregular shape. The following mainly describes differences of the fifth alignment pattern from the first alignment pattern.

FIG. 22 is a plan view illustrating the optical element 1 having the fifth alignment pattern. As illustrated in FIG. 22, the first structural bodies B1 are arranged in the X direction and the Y direction. The directions of orientation of first structural bodies B1, among the first structural bodies B1, arranged in the X direction vary irregularly. The directions of orientation of first structural bodies B1, among the first structural bodies B1, arranged in the Y direction also vary irregularly. Accordingly, the wavefront F2 of the light LT2 at output toward the outside has an irregular shape. That is, in the fifth alignment pattern, the directions of orientation of the first structural bodies B1 vary such that the wavefront F2 has an irregular shape.

According to Embodiment 1, when the first structural bodies B1 are arranged in the fifth alignment pattern, the wavefront F2 has an irregular shape. Therefore, the light LT2 can be diffused according to the irregular shape without depending on the incidence angle of the light LT2. That is, the light LT2 can be diffused without depending on the incident angle of the light LT2 by changing the directions of orientation of the first structural bodies B1 in a minute period. For example, the optical element 1 is applicable to an optical reflection element or a screen with no viewing angle characteristic or for authenticity checking.

Furthermore, the second layer A2 is formed such that the light LT2 reflected by the second layer A2 has a wavelength in a near-infrared wavelength band. That is, the pitch p, the refractive index ne2, and the refractive index no2 of the second structural bodies B2 are set such that the reflected light LT2 has a wavelength in a near-infrared wavelength band. In such a case, the optical element 1 can for example reflect heat rays (for example, sunlight) effectively. Therefore, effective utilization for example as a heat ray reflection element can be achieved. The near-infrared wavelength band is for example in a range from no less than 0.75 µm to no greater 1.4 µm.

The wavefront F2 having an irregular shape can reduce glossiness of the optical element 1, with a result that a matte optical element 1 can be provided. Furthermore, the direction of orientation of each of the first structural bodies B1 is changed in a minute period to form the wavefront F2 having an irregular shape, and thus, a principle of light reflection by Morpho butterfly wing scales can be duplicated.

Note that the wavefront F3 of the light LT3 output toward the outside from the second layer A2 also has an irregular shape corresponding to the phase of the light LT3 at incidence to the second layer A2 according to the fifth alignment pattern.

(Sixth Alignment Pattern)

Figure 23A:
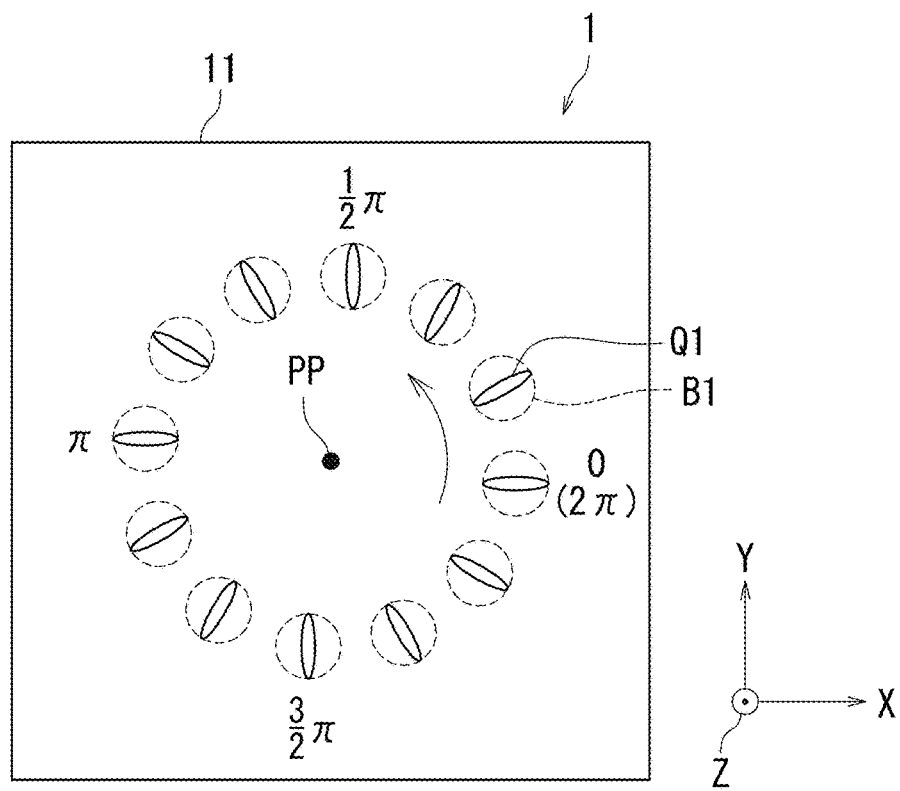
FIG. 23A is a plan view illustrating the optical element according to Embodiment 1 that has a sixth alignment pattern.
Figure 23B:
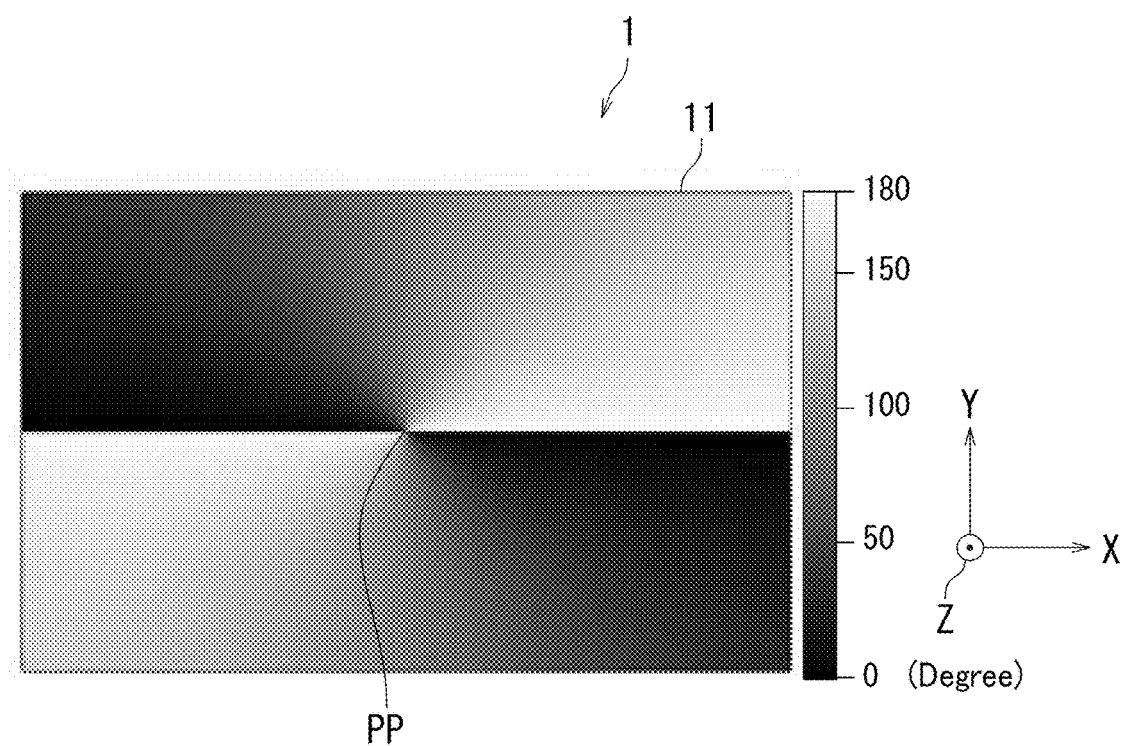
FIG. 23B is a plan view illustrating orientation distribution of the first structural bodies according to Embodiment 1.

The following describes the sixth alignment pattern with reference to FIGS. 1, 23A, and 23B. The sixth alignment pattern is different from the third alignment pattern in that the wavefront F2 is formed in a helical surface in the sixth alignment pattern. The following mainly describes differences of the sixth alignment pattern from the third alignment pattern.

FIG. 23A is a plan view illustrating the optical element 1 having the sixth alignment pattern. As illustrated in FIG. 23A, the directions of orientation of the first structural bodies B1 vary by $2\pi$ (radians) about a specific point PP. Specifically, the first elements Q1 rotate by $2\pi$ (radians) about the specific point PP.

In the above configuration, the wavefront F2 of the light LT2 at output toward the outside has a helical surface. That is, the light LT2 is output as an optical vortex. The optical vortex is light having a singularity and having an equiphasic surface that forms a helical surface. The light intensity at the singularity is 0. The singularity corresponds to the specific point PP. Note that change in directions of orientation of the first structural bodies B1 by $2\pi$ (radians) changes the phase of light by $8\pi$.

FIG. 23B is a plan view illustrating orientation distribution of the first structural bodies B1. FIG. 23B illustrates rotational angle in the same manner as in FIG. 21A. As illustrated in FIG. 23B, the rotational angles of the first elements Q1 vary by $2\pi$ about the specific point PP.

However, the rotational angles of the first elements Q1 may vary by $n\pi$ (radians) about the specific point PP. n represents an integer of equal to or greater than 1. That is, the directions of orientation of the first structural bodies Q1 may vary by $n\pi$ (radians) about the specific point PP. Note that change in directions of orientation of the first structural bodies B1 by $n\pi$ (radians) changes the phase of light by $4n\pi$.

When the directions of orientation of the first structural bodies B1 are changed by $n\pi$ (radians) about the specific point PP, the wavefront F2 of the light LT2 at output has a helical surface. That is, the light LT2 is output as an optical vortex.

According to Embodiment 1, when the first structural bodies B1 are arranged in the sixth alignment pattern, the wavefront F2 of the light LT2 at output toward the outside has a helical surface. The light L2 can therefore be output as an optical vortex. Thus, use of the optical element 1 enables generation of optical vortex through an optical system having a simple configuration. Optical vortices are for example used for laser processing or microscopic manipulation of cells. Therefore, the optical element 1 is suitably applicable to such fields.

Note that the wavefront F3 of the light LT3 output toward the outside from the second layer A2 also has a helical surface corresponding to the phase of the light LT3 at incidence to the second layer A2 according to the sixth alignment pattern. The light L3 can therefore be output as an optical vortex.

Embodiment 2

Figure 24:
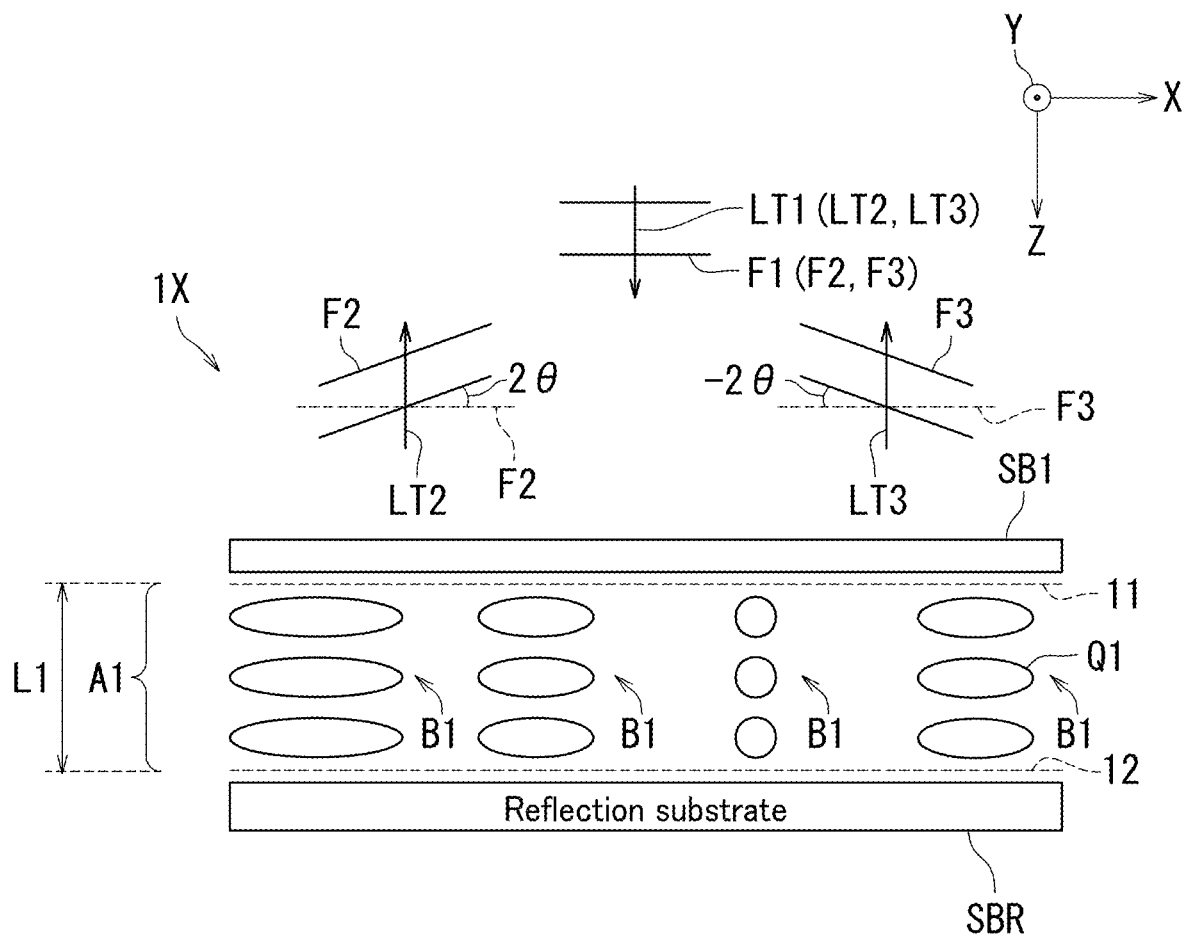
FIG. 24 is a cross-sectional view illustrating an optical element according to Embodiment 2 of the present invention.

The following describes an optical element 1X according to Embodiment 2 of the present invention with reference to FIG. 24. The optical element 1X according to Embodiment 2 is different from that according to Embodiment 1 in that the optical element 1X includes a reflection substrate SBR in place of the second layer A2 and the substrate SB2 (see FIG. 1) in Embodiment 1. The following mainly describes differences of Embodiment 2 from Embodiment 1.

FIG. 24 is a cross-sectional view illustrating the optical element 1X according to Embodiment 2. As illustrated in FIG. 24, the optical element 1X has the same configuration as the optical element 1 according to Embodiment 1. However, the optical element 1X includes the reflection substrate SBR in place of the second layer A2 and the substrate SB2 in Embodiment 1. The reflection substrate SBR functions as a second layer with respect to the first layer A1 according to Embodiment 2.

The reflection substrate SBR reflects incident light. The reflection substrate SBR for example specularly reflects incident light. The reflection substrate SBR is for example a polymer-based mirror, a metal mirror, a dielectric mirror, or a glass mirror. The dielectric mirror is for example a dielectric multi-layered film mirror.

The following further describes reflection and transmission of light using specific examples with reference to FIG. 24.

The light LT1 is normally incident on the first boundary surface 11 of the first layer A1 through the substrate SB1. Note that the light LT1 may obliquely enter the first layer A1. The light LT1 includes the light LT2 or the light LT3. The light LT2 is in a first polarization state (e.g., left circular polarization), while the light LT3 is in a second polarization state (e.g., right circular polarization).

First, light reflection and transmission where the first layer A1 functions as a half-wavelength plate will be described as a comparative example. That is, in a configuration in which the first layer A1 has a retardation corresponding to a half wavelength of the light LT1 (including light LT2 and light LT3), the first layer A1 changes the polarization state of the light LT2 from the first polarization state to the second polarization state, and changes the polarization state of the light LT3 from the second polarization state to the first polarization state. The first layer A1 also changes the phase of the light LT2 at incidence on the first boundary surface 11 by an angle of θa and outputs the light LT2 toward the reflection substrate SBR. The first layer further changes the phase of the light LT3 at incidence on the first boundary surface 11 by an angle of "−θa" and outputs the light LT3 toward the reflection substrate SBR.

The light LT2 and the light LT3 having transmitted through the first layer A1 are reflected by the reflection substrate SBR. In such a case, the reflection substrate SBR reflects light while changing the polarization state of the light LT2 from the second polarization state to the first polarization state and changing the polarization state of the light LT3 from the first polarization state to the second polarization state.

Furthermore, the first layer A1 transmits the light LT2 in the first polarization state and the light LT3 in the second polarization state and outputs the light LT2 and the light LT3 from the first boundary surface 11. The first layer A1 outputs the light LT2 toward the outside while changing the phase of the light LT2 at incidence on the second boundary surface 12 from the reflection substrate SBR by an angle of "−θa". The first layer A1 also outputs the light LT3 toward the outside while changing the phase of the light LT3 at incidence on the second boundary surface 12 from the reflection substrate SBR by an angle of θa. As a result, change in each of the phases of the light LT2 and the light LT3 is canceled between at incidence on the first boundary surface 11 and at output through the first boundary surface 11.

Embodiment 2 considers the case where the first layer A1 functions as a ¼ wavelength plate. The ¼ wavelength plate converts for example circularly polarized light to linearly polarized light by inducing a 90-degree phase difference between extraordinary light and ordinary light. Specifically, the retardation Rd of the first layer A1 corresponds a ¼ wavelength of the light LT1 (light LT2 and light LT3). That is, the retardation Rd corresponds to ¼ of the wavelength of the light LT1 (light LT2 and light LT3). The first layer A1 changes the polarization state of light. The light LT2 is in the first polarization state before entering the optical element 1. The first polarization state represents circular polarization (e.g., left circular polarization). The light LT3 is in the second polarization state before entering the optical element 1. The second polarization state represents circular polarization (e.g., right circular polarization) contrary to the circular polarization represented by the first polarization state. The first layer A1 changes the polarization state of the light LT2 from the first polarization state (e.g., left circular polarization) to a third polarization state and outputs the light LT2. The third polarization state represents linear polarization (e.g., linear polarization in a first oscillation direction). The first layer A1 further changes the polarization state of the light LT3 (e.g., right circular polarization) from the second polarization state to a fourth polarization state and outputs the light LT3. The fourth polarization state represents linear polarization (e.g., linear polarization in a second oscillation direction) perpendicular to the linearly polarized light represented by the third polarization state. The first oscillation direction is perpendicular to the second oscillation direction.

The following description is focused on the light LT2 for the sake of easy understanding, and assumes as an example that the directions of orientation of the first structural bodies B1 arranged in the Y direction are identical to one another and the directions of orientation of the first structural bodies B1 arranged in the X direction vary lineally. Specifically, the directions of orientation of the first structural bodies B1 vary angle θ by angle θ in the X direction. For the sake of convenience, the first polarization state is referred to as "circular polarization" and the third polarization state is referred to as "linear polarization".

The first layer A1 transmits the light LT2 entering the first layer A1 through the first boundary surface 11 and outputs the light LT2 toward the reflection substrate SBR through the second boundary surface 12. Specifically, the first layer A1 outputs the light LT2 while changing the polarization state of the light LT2 from circular polarization to linear polarization. Furthermore, the first layer A1 outputs the light LT2 while changing the phase of the light LT2 at incidence on the first boundary surface 11 by an angle of "θ".

The reflection substrate SBR reflects the light LT2 output from the first layer A1 through the second boundary surface 12 toward the second boundary surface 12 of the first layer A1 while maintaining the polarization state. That is, the reflection substrate SBR reflects the light LT2 output from the first layer A1 and having a phase at an angle of θ toward the first layer A1 while maintaining the linear polarization and the phase at an angle of θ.

The first layer A1 transmits the light LT2 entering the first layer A1 through the second boundary surface 12 and outputs the light LT2 through the first boundary surface 11 toward the outside of the first layer A1. Specifically, the first layer A1 outputs the light LT2 while changing the polarization state of the light LT2 from linear polarization to circular polarization. In such a case, the first structural bodies B1 (nematic liquid crystal) having an orientation angle θ as viewed in the Z direction (positive Z direction) have an orientation angle (π-θ) as viewed in a direction (negative Z direction) opposite to the Z direction. Accordingly, the polarization state of the light LT2 at incidence on the first boundary surface 11 is the same as the polarization state of the light LT2 at output through the first boundary surface 11. Furthermore, the first layer A1 outputs the light LT2 while changing the phase of the light LT2 at incidence on the second boundary surface 11 by an angle of θ.

The first layer A1 outputs the light LT2 from the first boundary surface 11 while changing the phase of the light LT2 by an angle of θ both in the forward light path and in the backward light path of the light LT2. That is, the first layer A1 outputs the light LT2 while changing the phase of the light LT2 by an angle of 2θ(=2×θ). As a result, the light LT2 is output through the first boundary surface 11 with the wavefront F2 of the light LT2 inclined by an angle of 2θ with respect to the wavefront F2 of the light LT2 entering through the first boundary surface 11.

Note that the first layer A1 outputs the light LT3 while changing the phase of the light LT3 by an angle of "−2θ" (=−2×θ) likewise for the light LT2. As a result, the light LT3 is output through the first boundary surface 11 with the wavefront F3 of the output light LT3 inclined by an angle of "−2θ" with respect to the wavefront F3 of the light LT3 entering through the first boundary surface 11.

As described with reference to FIG. 24, the first layer A1 having a retardation Rd of ¼ of the wavelength changes the polarization state of the light LT2 from circularly polarized light to linear polarization in Embodiment 2. The reflection substrate SBR accordingly reflects the light LT2 while maintaining the polarization state (i.e., linear polarization). Therefore, directions of phase change of the light LT2 with respect to the propagation direction of the light LT2 are the same between in the forward light path and in the backward light path in the first layer A1. In addition, the first layer A1 changes the phase of the light LT2 both in the forward light path and in the backward light path of the light LT2 in the first layer A1. As a result, the phase of the light LT2 can be changed by the first layer A1 with a reduced thickness L1 when compared to a case with the first layer A1 functioning as a half-wavelength plate. Similarly, the phase of the light LT3 can be changed by the first layer A1 with a reduced thickness L1 when compared to a case with the first layer A1 functioning as a half-wavelength plate. Reduction in thickness L1 of the first layer A1 can increase response speed of the first elements Q1.

Furthermore, the same phase change as that the phase change in the optical element according to Comparative Example 4 can be implemented with a reduced thickness L1 in Embodiment 2 when compared to a case where light is transmitted and output after entering the optical element according to Comparative Example 4 that includes only a nematic liquid crystal layer.

For example, in a situation in which the first layer A1 in Embodiment 2 functions as a ¼ wavelength plate, the phase change rate of light is the same as the phase change rate of the light in a situation in which the nematic liquid crystal layer in Comparative Example 4 functions as a half-wavelength plate. However, when the birefringence $\Delta n1$ of the first layer A1 is the same as the birefringence of the nematic liquid crystal layer in Comparative Example 4, the thickness L1 of the first layer A1 is ½ of that of the nematic liquid crystal in Comparative Example 4.

Furthermore, the same phase change as the phase change in the optical element according to Comparative Example 5 can be implemented with a reduced thickness L1 in Embodiment 2 when compared to a case where light enters and is reflected after entering the optical element according to Comparative Example 5 that includes only a cholesteric crystal layer.

For example, the phase change rate of light where the retardation Rd of the first layer A1 in Embodiment 2 is set to ¼ of the wavelength of the light is the same as the phase change rate of the light where the retardation of the cholesteric liquid crystal layer in Comparative Example 5 is set to ½ of the wavelength. However, when the birefringence $\Delta n1$ of the first layer A1 is the same as the birefringence of the cholesteric liquid crystal layer in Comparative Example 5, the thickness L1 of the first layer A1 is ½ of that of the cholesteric liquid crystal in Comparative Example 5.

The reflection substrate SBR is provided in Embodiment 2, and therefore, the optical element 1X is favorable as a reflection element.

Furthermore, an amount of phase change of the light LT2 can be increased in Embodiment 2 when compared to a case where the phase of the light is changed only through refractive index modulation by external stimulus such as voltage application. The amount of phase change of the light LT3 can be increased in a similar manner.

Similarly to Embodiment 1, the first layer A1 includes a plurality of first structural bodies B1 of which directions of orientation differ from one another in Embodiment 2. In the above configuration, the wavefront F2 of the light LT2 output from the first layer A1 toward the outside of the first layer A1 is non-parallel to the wavefront F2 of the light LT2 at incidence to the first layer A1 from the outside of the first layer A1. As a result, differentiation among directions of orientation of the first structural bodies B1 can achieve output of the light LT2 having any desirable wavefront from the first layer A1. Similarly, differentiation among directions of orientation of the first structural bodies B1 can achieve output of the light LT3 having any desirable wavefront from the first layer A1.

Similarly to Embodiment 1, patterning of the first structural bodies B1 can be facilitated and the first structural bodies B1 can be easily and precisely set in a desired alignment pattern in Embodiment 2 when compared to a case with a cholesteric liquid crystal.

Note that the first structural bodies B1 of the first layer A1 can be arranged for example in any of the first to sixth alignment patterns in Embodiment 1.

The following describes, using Jones vector, a principle that the phase of the light LT1 output toward the outside of the first layer A1 is changed by an angle of "$2\theta$" or "$-2\theta$" when the directions of orientation of the first structural bodies B1 vary by an angle of "$\theta$".

Phase change by an optical element according to Comparative Example 6 will described first for the sake of easy understanding. The optical element according to Comparative Example 6 is the optical element 1X in FIG. 24 functioning as a half-wavelength plate. That is, the first layer A1 of the optical element according to Comparative Example 6 has a retardation Rd that enables the optical element to function as a half-wavelength plate for the light LT1 having a wavelength k. Note that description of Comparative Example 6 is made using the same reference signs as in Embodiment 2 for the sake of description. Further, Comparative Example 6 will be described with reference to FIG. 24 for convenience' sake.

As illustrated in FIG. 24, the light LT1 propagating in the Z direction enters the first layer A1 in Comparative Example 6. When the directions of orientation of the first structural bodies B1 are identical to the X direction, the Jones matrix $M_r$ of the first layer A1 is given by the following expression (18).

[Expression 18]

$$M_r = \begin{bmatrix} -1 & 0 \\ 0 & 1 \end{bmatrix} \tag{18}$$

A characteristic of the light LT1 through a course series from incidence to propagation in the first layer A1, reflection by the reflection substrate SBR, re-propagation in the first layer A1, and then output is given by expressions (19) and (20).

That is, when the light LT1 has either right circular polarization or left circular polarization, the Jones vector $V_{in}$ of the light LT1 at incidence on the first boundary surface 11 is expressed by the following expression (19).

[Expression 19]

$$V_{in} = \begin{bmatrix} 1 \\ \mp i \end{bmatrix} \tag{19}$$

The Jones vector $V_{out}$ of the light LT1 at output through the first boundary surface 11 is expressed by the following expression (20).

[Expression 20]

$$V_{out} = M'M_r M V_{in} = \\ i\begin{bmatrix} \cos2\theta & -\sin2\theta \\ -\sin2\theta & -\cos2\theta \end{bmatrix}\begin{bmatrix} -1 & 0 \\ 0 & 1 \end{bmatrix} i\begin{bmatrix} \cos2\theta & \sin2\theta \\ \sin2\theta & -\cos2\theta \end{bmatrix}\begin{bmatrix} 1 \\ \pm i \end{bmatrix} = \\ -1\begin{bmatrix} -1 & 0 \\ 0 & 1 \end{bmatrix}\begin{bmatrix} 1 \\ \mp i \end{bmatrix} = \begin{bmatrix} 1 \\ \mp i \end{bmatrix} \tag{20}$$

As is clear from expression (20), the polarization state of the light LT1 is reversed between at incidence on and at output through the first boundary surface 11 and the phase of the light LT1 does not change in Comparative Example 6.

The following describes phase change by the optical element 1X according to Embodiment 2. The first layer A1 (nematic liquid crystal) has a retardation Rd that enables the optical element 1X to function as a ¼ wavelength plate for the light LT1 having a wavelength λ. The light LT1 propagating in the Z direction enters the first layer A1. The light LT1 has either left circular polarization or right circular polarization.

Where the directions of orientation of the first structural bodies B1 are identical to the X direction, a Jones matrix $M_0$ of the first layer A1 is given by the following expression (21).

[Expression 21]

$$M_0 = \begin{bmatrix} \exp(i\frac{\pi}{4}) & 0 \\ 0 & e(-i\frac{\pi}{4}) \end{bmatrix} = \frac{1}{\sqrt{2}} \begin{bmatrix} 1+i & 0 \\ 0 & 1-i \end{bmatrix} \quad (21)$$

A Jones matrix M of the first layer A1 in propagation of light to the second boundary surface 12 from the first boundary surface 11 is given by the following expression (22).

[Expression 22]

$$M = R(\theta)M_0 R(-\theta) = \exp\left(-i\frac{\pi}{4}\right)\begin{bmatrix} \cos^2\theta + i\sin^2\theta & (1-i)\cos\theta\sin\theta \\ (1+i)\cos\theta\sin\theta & \sin^2\theta - i\cos^2\theta \end{bmatrix} \quad (22)$$

A Jones matrix M' of the first layer A1 in propagation of light from the second boundary surface 12 to the first boundary surface 11 is given by the following expression (23).

[Expression 23]

$$M' = R(\pi - \theta)M_0 R(\theta - \pi) = \qquad (23)$$
$$\exp\left(-i\frac{\pi}{4}\right)\begin{bmatrix} \cos^2\theta - i\sin^2\theta & -(1+i)\cos\theta\sin\theta \\ -(1+i)\cos\theta\sin\theta & \sin^2\theta - i\cos^2\theta \end{bmatrix}$$

When the light LT1 has either left circular polarization or right circular polarization, the Jones vector $V_{in}$ of the light LT1 at incidence on the first boundary surface 11 is expressed by the following expression (24).

[Expression 24]

$$V_{in} = \begin{bmatrix} 1 \\ \mp i \end{bmatrix} \quad (24)$$

The Jones vector $V_{out}$ of the light LT1 at output through the first boundary surface 11 is given by the following expression (25).

[Expression 25]

$$V_{out} = \qquad (25)$$
$$M'M_r MV_{in} = \exp\left(-\frac{\pi}{4}\right)\begin{bmatrix} -\cos 2\theta & -\sin 2\theta \\ \sin 2\theta & -\cos 2\theta \end{bmatrix}\begin{bmatrix} 1 \\ \mp i \end{bmatrix} \propto \exp(\mp i2\theta)\begin{bmatrix} 1 \\ \mp i \end{bmatrix}$$

As is clear from expression (25), in a situation in which the light LT1 has right circular polarization at incidence on the first boundary surface 11, the light LT1 at output through the first boundary surface 11 has a phase at an angle of "−2θ" in correspondence to the rotational angle "θ" indicating the direction of orientation of each first structural body B1. By contrast, in a situation in which the light LT1 has left circular polarization at incidence on the first boundary surface 11, the light LT1 at output through the first boundary surface 11 has a phase at an angle of "2θ" in correspondence to the rotational angle "θ" indicating the direction of orientation of each first structural body B1. Furthermore, the propagation direction is reversed and the polarization state of the light LT1 does not change between at incidence on and at output through the first boundary surface 11.

Accordingly, it is only required to change the rotational angle "θ" indicating the direction of orientation of each first structural body B1 from 0 (radians) to π (radians) in order to change the phase of the light LT1 having a wavelength λ from 0 (radians) to 2π (radians) in Embodiment 2.

Also, in order to change the phase of the light LT1 from 0 (radians) to 2π (radians) in Embodiment 2, it is only required that the first layer A1 having a birefringence Δn1 have a retardation Rd of ¼ of the wavelength. In the above configuration, the thickness L1 of the first layer A1 can be reduced when compared to a configuration in which the phase of light is changed from 0 (radians) to 2π (radians) using only a cholesteric liquid crystal layer having a birefringence equal to the birefringence Δn1. For example, the thickness L1 of the first layer A1 can be reduced to ½ of the thickness of the cholesteric liquid crystal layer.

Note that expressions (18) to (25) are used for calculation under a condition that the light LT1 is incident normally on the first boundary surface 11. However, even in a situation in which the light LT1 is incident obliquely with respect to the first boundary surface 11, the phase characteristic is the same as that calculated using expressions (18) to (25). However, the reflection characteristic depends on properties of the first layer A1.

Embodiment 3

Figure 25:
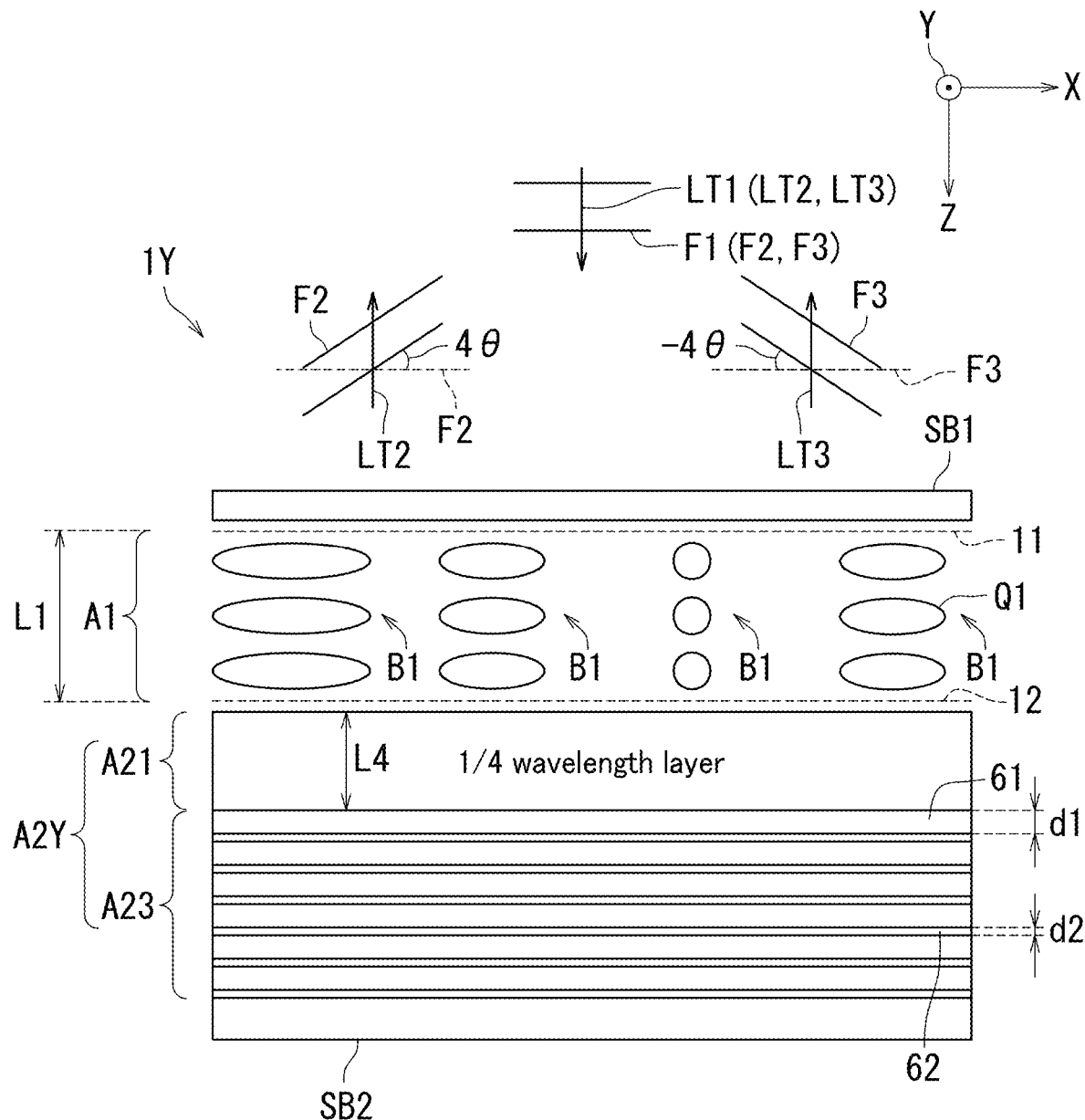
FIG. 25 is a cross-sectional view illustrating an optical element according to Embodiment 3 of the present invention.

The following describes an optical element 1Y according to Embodiment 3 of the present invention with reference to FIG. 25. The optical element 1Y according to Embodiment 3 differs from that in Embodiment 1 in inclusion of a second layer A2Y including a ¼ wavelength layer A21 and a reflection layer A23 in place of the second layer A2 (see FIG. 1) in Embodiment 1. The following mainly describes differences of Embodiment 3 from Embodiment 1.

FIG. 25 is a cross-sectional view illustrating the optical element 1Y according to Embodiment 3. As illustrated in FIG. 25, the optical element 1Y has the same configuration as the optical element 1 according to Embodiment 1. However, the optical element 1Y includes the second layer A2Y in place of the second layer A2 in Embodiment 1.

The second layer A2Y reflects light while maintaining the polarization state of the light at incidence and at reflection.

Specifically, the second layer A2Y includes the ¼ wavelength layer A21 and the reflection layer A23. The ¼ wavelength layer A21 faces the first layer A1. The ¼ wavelength layer A21 is formed of for example nematic liquid crystal (nematic phase). However, no particular limitations are placed on the material of the ¼ wavelength layer A21. The ¼ wavelength layer A21 has a retardation Rd4 expressed by the following expression, where Δn4 represents a birefringence of the ¼ wavelength layer A21 and L4 represents a thickness of the ¼ wavelength layer A21.

$Rd4=\Delta n4 \times L4$

The birefringence Δn4 is expressed as "ne4−no4" where ne4 represents a refractive index of extraordinary light with respect to the ¼ wavelength layer A21 and no4 represents a refractive index of ordinary light with respect to the ¼ wavelength layer A21.

The retardation Rd4 of the ¼ wavelength layer A21 corresponds to a ¼ wavelength of incident light. That is, the retardation Rd4 corresponds to ¼ of the wavelength of light. In the above configuration, the ¼ wavelength layer A21 functions as a ¼ wavelength plate to induce a 90-degree phase difference between extraordinary light and ordinary light.

The reflection layer A23 reflects incident light. The reflection layer A23 faces the ¼ wavelength layer A21 and the substrate SB2. The reflection layer A23 for example specularly reflects incident light. The reflection layer A23 is for example a dielectric multi-layer film.

Specifically, the reflection layer A23 includes a plurality of first dielectric layers 61 and a plurality of second dielectric layers 62. The number of the first dielectric layers 61 is the same as the number of the second dielectric layers 62. The first dielectric layers 61 and the second dielectric layers 62 are stacked in an alternate manner. For example, a refractive index nd1 of the first dielectric layers 61 is smaller than a refractive index nd2 of the second dielectric layers 62. For example, a thickness d1 of the first dielectric layers 61 is larger than a thickness d2 of the second dielectric layers 62. The first dielectric layers 61 are formed of a dielectric. The second dielectric layers 62 are formed of a dielectric different from the dielectric forming the first dielectric layers 61.

The ¼ wavelength layer A21 and the reflection layer A23 cooperate to reflect light while maintaining the polarization state of the light at incidence and at reflection of the light. That is, the second layer A2Y has the same reflection characteristic as the second layer A2 according to Embodiment 1.

The following further describes reflection of light using specific examples with reference to FIG. 25. The light LT1 enters the optical element 1Y. The light LT1 is incident normally on the first boundary surface 11 of the first layer A1 through the substrate SB1. Note that the light LT1 may obliquely enter the first layer A1. The light LT1 includes either the light LT2 or the light LT3. The light LT2 is in the first polarization state (e.g., left circular polarization). The light LT3 is in the second polarization state (e.g., right circular polarization). Further, the first layer A1 functions as a half-wavelength plate for the sake of easy understanding. In addition, in one example, the directions of orientation of the first structural bodies B1 arranged in the Y direction are identical to one another and the directions of orientation of the first structural bodies B1 arranged in the X direction vary linearly. Specifically, the directions of orientation of the first structural bodies B1 vary angle θ by angle θ in the X direction.

The following is focused on the light LT2. Similarly to Embodiment 1, the first layer A1 reverses the polarization state of the light LT2 from the first polarization state to the second polarization state, and outputs the light LT2 toward the second layer A2Y. Furthermore, the first layer A1 outputs the light LT2 toward the second layer A2Y while changing the phase of the light LT2 at incidence on the first boundary surface 11 by an angle of 2θ(=2×θ).

The second layer A2Y reflects the light LT2 output from the first layer A1 through the second boundary surface 12 toward the second boundary surface 12 of the first layer A1 while maintaining the polarization state. That is, the second layer A2Y reflects the light LT2 in the second polarization state output from the first layer A1 toward the first layer A1 while maintaining the second polarization state.

Similarly to Embodiment 1, the first layer A1 outputs the light LT2, which has entered the first layer A1 through the second boundary surface 12, from the first boundary surface 11 toward the outside of the first layer A1, while reversing the polarization state of the light LT2 from the second polarization state to the first polarization state. Furthermore, the first layer A1 outputs the light LT2 from the first boundary surface 11 toward the outside of the first layer A1 while changing the phase of the light LT2 at incidence on the second boundary surface 12 by an angle of 2θ.

The first layer A1 outputs the light LT2 from the first boundary surface 11 while changing the phase of the light LT2 by an angle of 2θ in each of the forward light path and the backward light path of the light LT2 likewise in Embodiment 1. That is, the first layer A1 outputs the light LT2 while changing the phase of the light LT2 by an angle of 4θ(=4×θ).

Note that the light LT3 differs from the light LT2 in direction of phase change. That is, the second layer A2Y reflects the light LT3 in the first polarization state output from the first layer A1 toward the first layer A1 while maintaining the first polarization state. In the above configuration, the first layer A1 outputs the light LT3 from the first boundary surface 11 toward the outside of the first layer A1 while changing the phase of the light LT3 by an angle of "−2θ" (=−2×θ) in each of the forward light path and the backward light path. That is, the first layer A1 outputs the light LT3 while changing the phase of the light LT3 by an angle of "−4θ" (=−4×θ).

As described with reference to FIG. 25, the second layer A2Y in Embodiment 3 reflects light while maintaining the polarization state of the light likewise in Embodiment 1. In the above configuration, the direction of phase change of the light with respect to the propagation direction of the light is the same between in the forward light path and in the backward light path of the light in the first layer A1. In addition, the first layer A1 changes the phase of the light in each of the forward light path and the backward light path of the light in the first layer A1.

Accordingly, the amount of phase change (i.e., an amount of phase modulation) of light (output light) output from the first layer A1 toward the outside of the first layer A1 can be relatively increased with respect to an amount of change in directions of orientation of the first structural bodies B1 in Embodiment 3 likewise in Embodiment 1. Besides, Embodiment 2 also achieves the same advantages as Embodiment 1.

Specifically, in Embodiment 3, the second layer A2Y reflects circularly polarized light while maintaining the polarization state of the light, that is, the direction of circulation of the circularly polarized light at incidence of the circularly polarized light to the second layer A2Y and at reflection of the circularly polarized light from the second layer A2Y toward the first layer A1. Therefore, the direction of the phase change of the circularly polarized light with respect to the propagation direction of the circularly polarized light does not change between before incidence and after reflection of the circularly polarized light. As a result, the rate of phase change of the circularly polarized light to variation in orientation angles of the first structural bodies B1 can be relatively increased since the first layer A1 changes the phase of the circularly polarized light in the same direction between in the forward light path and in the backward light path of the circularly polarized light. In particular, in a situation in which the first layer A1 functions as a half-wavelength plate, the rate of phase change of the circularly polarized light to change in orientation angle of the first structural bodies B1 is 4 times, which is favorable.

In particular, the second layer A2 including the ¼ wavelength layer A21a21 and the reflection layer A23 including dielectrics effectively functions as a reflection body that reflects light while maintaining the polarization state of the light in Embodiment 3.

Note that the optical element 1Y can be utilized for example as a mirror having polarization dependency that performs light condensation or the like or a spectroscope that evaluates circular dichroism. Alternatively, a reflection layer formed of a metamaterial may be provided as the second layer A2Y in place of the ¼ wavelength layer A21 and the reflection layer A23. Further, a metal-made mirror may for example be provided in place of the reflection layer A23.

The following describes optical properties of the optical element 1Y under a specific condition with reference to FIGS. 25 to 27B. Note that grayscales in FIGS. 26A, 26B, 27A, and 27B are color scales actually. The specific conditions are as described below.

That is, a reflectance and a phase characteristic of circularly polarized light at incidence are calculated by a matrix method on the assumption that the first layer A1 includes a single first structural body B1 as nematic liquid crystal and that the ¼ wavelength layer A21 includes a single structural body as nematic liquid crystal similarly to the first layer A1.

The first layer A1 is set to have a retardation Rd that enables the first layer A1 to function as a half-wavelength plate. Specifically, the first layer A1 functions as a half-wavelength plate for light having a wavelength of 600 nm to reverse the direction of circulation of circularly polarized light. That is, the retardation Rd of the first layer A1 corresponds to ½(=300 nm) of the wavelength of the light.

The refractive index ne1 of extraordinary light with respect to the first layer A1 is "1.7", and the refractive index no1 of ordinary light with respect to the first layer A1 is "1.5". The first layer A1 has a thickness L1 of "1,500 nm". Similarly to Embodiment 1, the direction of orientation of each first structural body B1 is also represented by an orientation angle φ.

The second layer A2 has a thickness L2 of "750 nm". The refractive index ne4 of extraordinary light with respect to the ¼ wavelength layer A21 is "1.7", and the refractive index no4 of ordinary light with respect to the ¼ wavelength layer A21 is "1.5". Accordingly, the birefringence Δn4 (=ne4−no4) of the ¼ wavelength layer A21 is equal to the birefringence Δn1 (=ne1−no1) of the first layer A1.

A first dielectric layer 61 constituted by six layers is provided. The first dielectric layer 61 has a refractive index nd1 of "1.46" and a thickness d1 of "104 nm". A second dielectric layer 62 constituted by six layers is also provided. The second dielectric layer 62 has a refractive index nd2 of "2.35" and a thickness d2 of "63 nm".

Figure 26A:
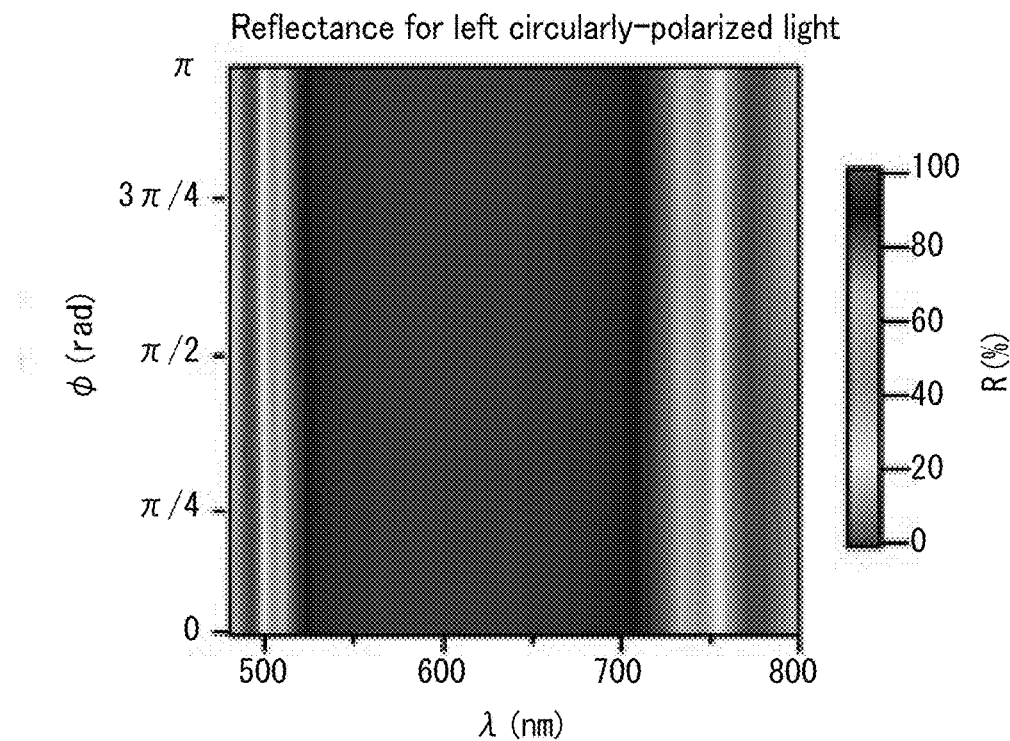
FIG. 26A is a graph representation showing dependencies of reflectance on wavelength and orientation angle when left circularly polarized light enters the optical element according to Embodiment 3.

First, reflectance R and reflection phase Φr at incidence of left circularly polarized light as the light LT2 will be described with reference to FIGS. 26A and 26B. FIG. 26A is a graph representation showing dependencies of reflectance R on wavelength λ and orientation angle φ when left circularly polarized light enters the optical element 1Y. In FIG. 26A, a horizontal axis indicates wavelength λ (nm) of the light LT2, a vertical axis on the left side indicates orientation angle φ (radian) of the first structural body B1, and a grayscale on the right side indicates reflectance R (%) of the light LT2. The reflectance R is a ratio of intensity of the light LT2 reflected by the second layer A2Y to intensity of the light LT2 entering the second layer A2Y. Note that the same definitions of the reflectance R and axes in the graph representation are applied to those in later-described FIG. 27A.

As shown in FIG. 26A, the second layer A2Y reflects light, of the light LT2, having a wavelength λ in a range from no less than 510 nm to no greater than 730 nm when the orientation angle φ of the first structural body B1 is in a range from no less than 0 to no greater than π.

Figure 26B:
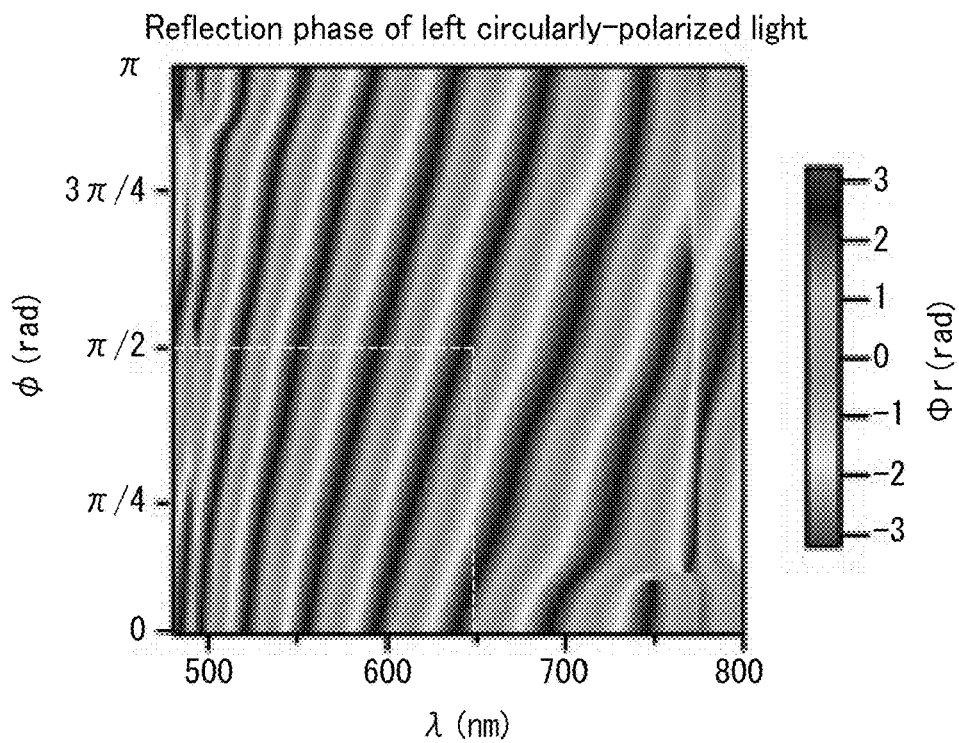
FIG. 26B is a graph representation showing dependencies of reflection phase on wavelength and orientation angle when left circularly polarized light enters the optical element according to Embodiment 3.

FIG. 26B is a graph representation showing dependencies of reflection phase Φr on wavelength λ and orientation angle φ when left circularly polarized light enters the optical element 1Y. In FIG. 26B, a horizontal axis indicates wavelength λ (nm) of the light LT2, a vertical axis on the left side indicates orientation angle φ (radian) of the first structural body B1, and a grayscale on the right side indicates reflection phase Φr (radian) of the light LT2. The reflection phase Φr is a phase of the light LT2 at output by the first boundary surface 11 through reflection by the second layer A2Y after incidence through the first boundary surface 11. Note that the same definitions of the reflection phase Φr and the axes in the graph representation are applied to those in later-described FIG. 28A.

As shown in FIG. 26B, the reflection phase Φr of light, of the light LT2, having a wavelength λ in a range from no less than 510 nm to no greater than 730 nm changes depending on the orientation angle φ of the first structural body B1. Specifically, when the orientation angle φ is changed from 0 to π/2, the reflection phase Φr of the light LT2 changes by 2π (see a broken line in the drawing, for example).

Figure 27A:
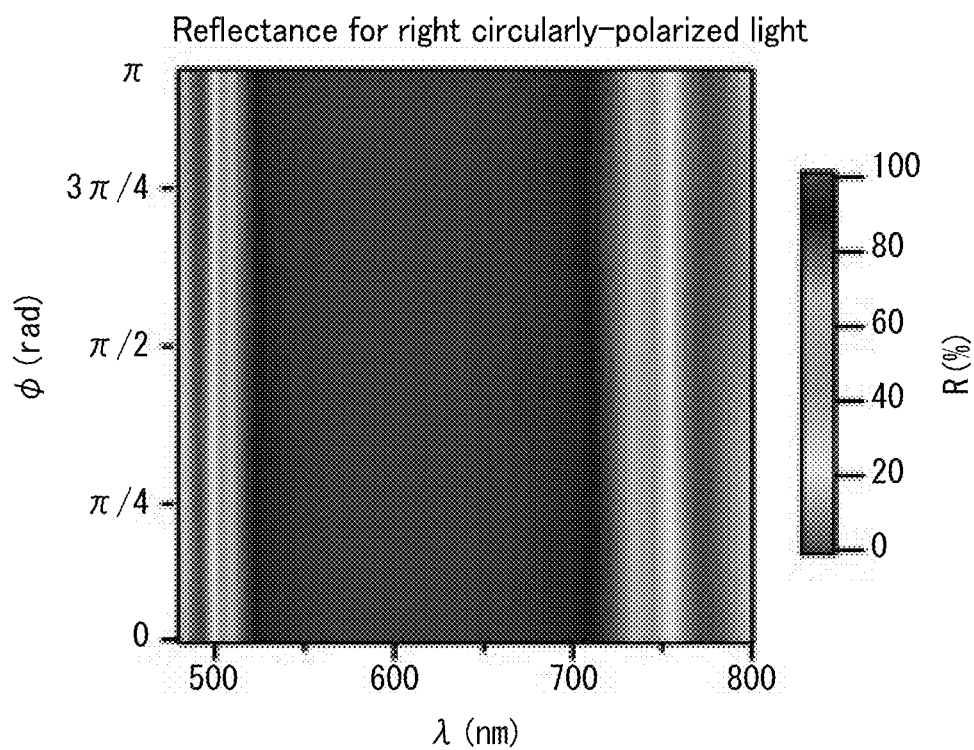
FIG. 27A is a graph representation showing dependencies of reflectance on wavelength and orientation angle when right circularly polarized light enters the optical element according to Embodiment 3.

Next, reflectance R and reflection phase Φr at incidence of right circularly polarized light as the light LT3 will be described with reference to FIGS. 27A and 27B. FIG. 27A is a graph representation showing dependencies of reflectance R on wavelength λ and orientation angle φ when left circularly polarized light enters the optical element 1Y. As shown in FIG. 27A, the second layer A2Y reflects light, of the light LT3, having a wavelength λ in a range from no less than 510 nm to no greater than 730 nm when the orientation angle φ of the first structural body B1 is in a range from no less than 0 to no greater than π.

Figure 27B:
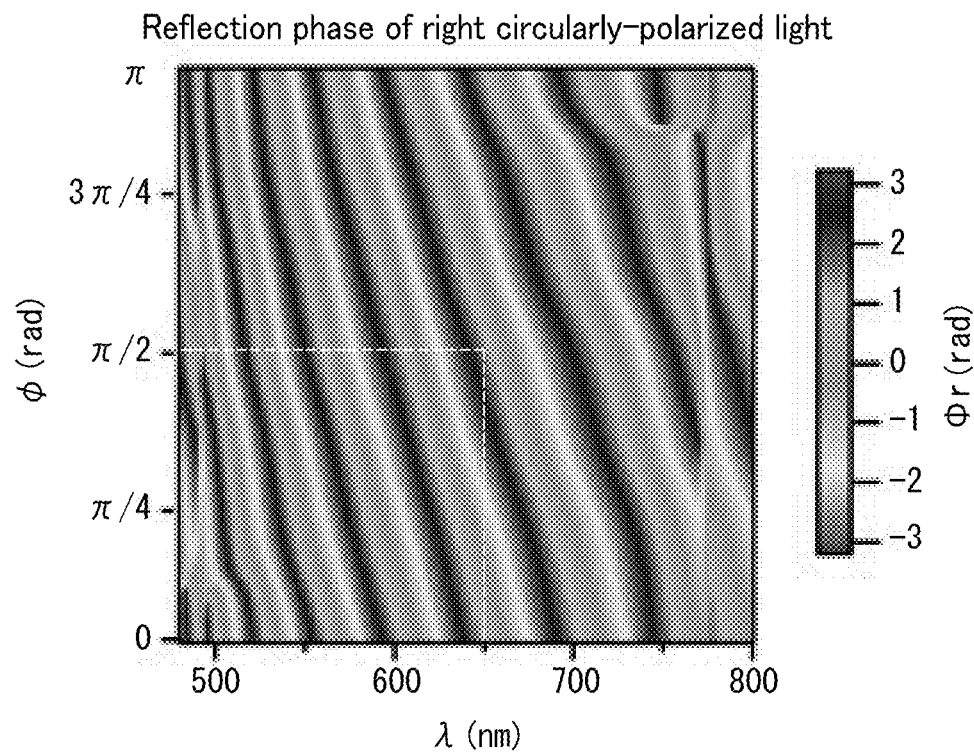
FIG. 27B is a graph representation showing dependencies of reflection phase on wavelength and orientation angle when right circularly polarized light enters the optical element according to Embodiment 3.

FIG. 27B is a graph representation showing dependencies of reflection phase Φr on wavelength λ and orientation angle φ when right circularly polarized light enters the optical element 1Y. As shown in FIG. 27B, the reflection phase Φr of light, of the light LT3, having a wavelength λ in a range from no less than 510 nm to no greater than 730 nm changes depending on the orientation angle φ of the first structural body B1. Specifically, when the orientation angle φ is changed from 0 to π/2, the reflection phase Φr of the light LT3 changes by 2π (see a broken line in the drawing, for example).

However, as shown in FIGS. 26B and 27B, inclination of change of the reflection phase Φr is opposite between the left circularly polarized light and the right circularly polarized light. That is, a direction of change of the reflection phase (Dr differs from and opposite to each other between the left circularly polarized light and the right circularly polarized light. For example, the phase of the right circularly polarized light delays while the phase of the left circularly polarized light advances.

As described with reference to FIGS. 26A, 26B, 27A, and 27B, similarly to Embodiment 1, the rate of phase change of light to change (θ) in orientation angle φ of the first structural body B1 is 4 times (4θ) when the first layer A1 functions as a half-wavelength plate in Embodiment 3. Note that the number of the first dielectric layers 61 is not limited to "6" and may be single or plural other than "6", and the number of the second dielectric layers 62 is not limited to "6" and may be single or plural other than "6".

Embodiment 4

Figure 28:
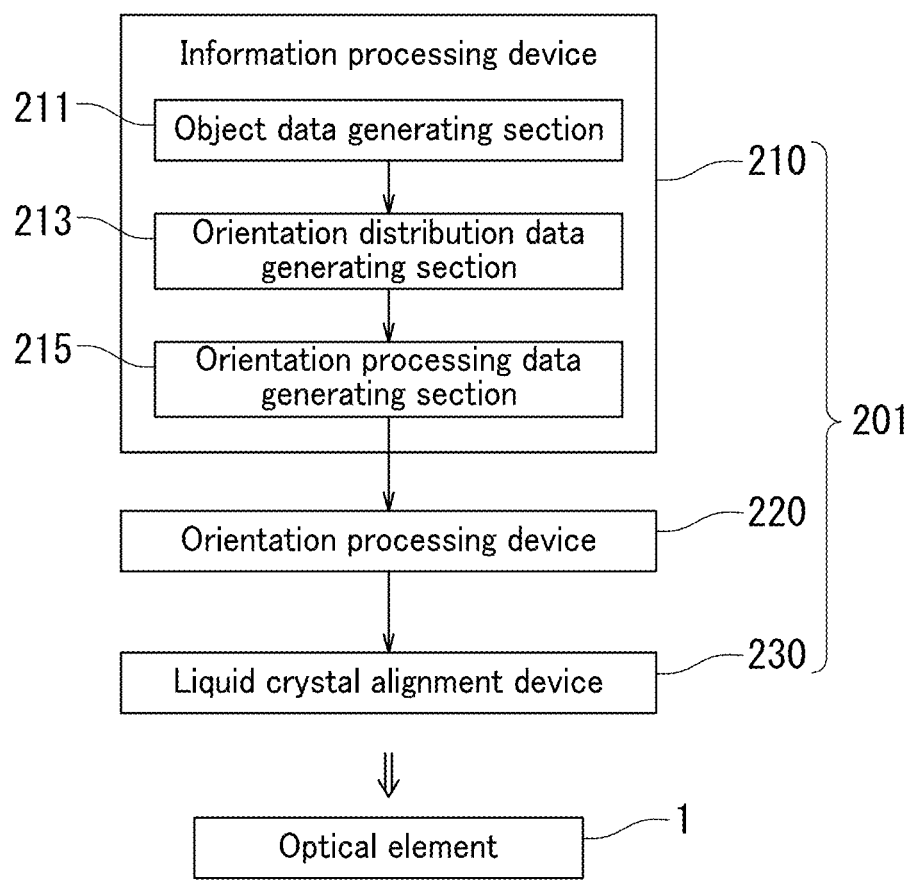
FIG. 28 is a block diagram illustrating an optical element production apparatus according to Embodiment 4 of the present invention.
Figure 29:
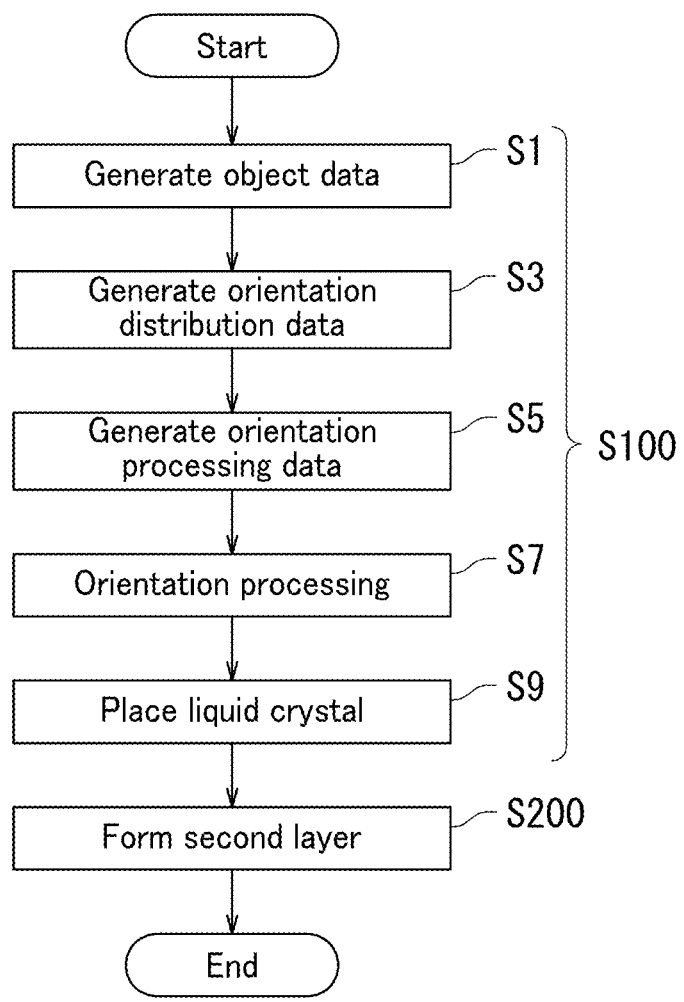
FIG. 29 is a flowchart depicting a production method for an optical element implemented by the production apparatus according to Embodiment 4 of the present invention.

The following describes an optical element 1, a production apparatus, and a production method according to Embodiment 4 of the present invention with reference to FIGS. 28 and 29. The optical element 1 according to Embodiment 4 differs from the optical element 1 according to Embodiment 1 in that the optical element 1 according to Embodiment 4 functions as a hologram element. The following mainly describes differences of Embodiment 4 from Embodiment 1. Also, he following describes Embodiment 4 using the reference signs used in the description of Embodiment 1 in order to facilitate understanding.

A configuration of a production apparatus 201 for producing the optical element 1 according to Embodiment 4 will be described first with reference to FIGS. 1 and 28. FIG. 28 is a block diagram illustrating the production apparatus 201. As illustrated in FIGS. 1 and 28, the production apparatus 201 produces the liquid crystal element 1. The first layer A1 of the optical element 1 outputs the light LT2 reflected by the second layer A2 toward the outside of the first layer A1 to form an image of a virtual object corresponding to the light LT2. The virtual object is an example of an "object". The virtual object is an object placed in a virtual space generated by a computer. The virtual object may be a solid or a plane. Further, the second layer A2 outputs the light LT3 transmitted through the second layer A2 toward the outside of the second layer A2 to form an image of a virtual object corresponding to the light LT3.

The production apparatus 201 includes an information processing device 210, an orientation processing device 220, and a liquid crystal alignment device 230. The information processing device 210 includes an object data generating section 211, an orientation distribution data generating section 213, and an orientation processing data generating section 215. Specifically, the information processing device 210 is a computer and includes a processor and a storage device. The processor functions as the object data generating section 212, the orientation distribution data generating section 213, and the orientation processing data generating section 215 through execution of computer programs stored in the storage device. The storage device includes for example memory such as semiconductor memory and may include a hard disk drive.

The following describes operation of the production apparatus 201 with reference to FIGS. 28 and 29. FIG. 29 is a flowchart illustrating a production method for the optical element 1 that is implemented by the production apparatus 201. As illustrated in FIG. 29, the production method includes a Step S100 and a Step S200 to produce the optical element 1. The step S100 includes Steps S1 to S9.

In Step S100, the production apparatus 201 forms the first layer A1.

In Step S200, the production apparatus 201 forms the second layer A2.

Specifically, as illustrated in FIG. 29, the object data generating section 211 generates object data representing a virtual object in Step S1. Specifically, the object data represents a form of the virtual object. The form of the virtual object represents a shape, a pattern, a color, or a unit of some or all of them. The pattern includes a sign and a figure. The sign includes a character, a numeral, and a mark.

In Step S3, the orientation distribution data generating section 213 calculates directions of orientation of the first structural bodies B1 based on the object data to generate orientation distribution data (first orientation data). The orientation distribution data represents distribution of directions of orientation of the first structural bodies B1.

For example, the orientation distribution data represents directions of orientation of first elements Q1 located at the first boundary surface 11, that is, the directions of orientation of the first structural bodies B1 within a first angular range. The first angular range is for example in a range from no less than 0 radians to no greater than $2\pi$ radians. Note that the directions of orientation of the first elements Q1 may not be substantially parallel to the first boundary surface 11 and may incline with respect to the first boundary surface 11.

In Step S5, the orientation processing data generating section 215 generates orientation processing data (second orientation data) based on the orientation distribution data. The orientation processing data is generated in correspondence to an orientation processing method implemented by the orientation processing device 220 and used in the orientation processing device 220. The orientation processing data represents an orientation pattern corresponding to the distribution of directions of orientation represented by the orientation distribution data. Specifically, the orientation processing data specifies either or both surface structure and surface properties of an alignment layer such that the directions of orientation of first elements Q1 located on the first boundary surface 11 are the directions of orientation indicated by the orientation distribution data. The alignment layer is formed on the substrate SB1 and aligns the first structural bodies B1 by being in contact with the first elements Q1. The alignment layer for example is an orientation film or a structure (specifically, microstructure) formed on the substrate SB1. Examples of the surface properties of the alignment layer include an anchoring direction of the alignment layer for liquid crystal in the alignment layer.

For example, the orientation processing data represents directions of orientation of first elements Q1 located at the first boundary surface 11, that is, the directions of orientation of the first structural bodies B1 within a second angular range. The second angular range is for example ¼ of the first angular range. This is because the phase of the light L3 changes by $2\pi$ radians when the directions of orientation of the first elements Q1 vary by $\pi/2$ radians from a certain value. Note that the second angular range may for example be ½ of the first angular range.

The orientation processing data generating section 215 for example generates the orientation processing data in correspondence to the orientation processing method based on the orientation distribution data. In a situation for example in which the orientation processing method is a photo-alignment method, the first elements Q1 are oriented in parallel to or perpendicular to illuminating polarized light. The orientation processing data is accordingly generated reflecting the orientation processing method and the properties of a material of the liquid crystal.

In Step S7, the orientation processing device 220 processes the alignment layer according to the orientation processing data. As a result, either or both the surface structure and the surface properties of the alignment layer are changed such that the directions of orientation of first elements Q1 in contact with the alignment layer are the directions of orientation represented by the orientation distribution data. Note that processing on the alignment layer according to the orientation processing data may be referred to as orientation processing.

For example, the orientation processing device 220 may for example adopt a photo-alignment method, a micro-rubbing method, an oblique vapor deposition method, or a structure orientation method as the orientation processing method.

The photo-alignment method involves irradiating a photosensitive alignment film formed on a substrate with polarized light, and thus controlling directions of orientation of liquid crystal molecules in contact with the alignment film. Depending on a combination of the alignment film and the liquid crystal material, the liquid crystal molecules are oriented in parallel to or perpendicular to the illuminating polarized light.

The micro-rubbing method involves rubbing an alignment film (e.g., a polyimide-based alignment film) formed on a substrate with cloth, and thus encouraging orientation of liquid crystal molecules. Depending on the properties of the alignment film, the liquid crystal molecules are oriented in parallel to or perpendicular to a rubbing direction.

The oblique vapor deposition method involves forming an alignment film (e.g., a silicon dioxide film) obliquely to a substrate, and thus encouraging orientation of liquid crystal molecules in contact with the alignment film. The film is formed through vapor deposition of a material on the substrate. The directions of orientation of the liquid crystal molecules vary depending on the angle of vapor deposition.

The structure orientation method involves forming microstructures as an alignment layer on a substrate, and thus encouraging orientation of liquid crystal molecules in contact with the alignment layer. For example, rod-like liquid crystal molecules are oriented along fine groove structures formed in the substrate. Processing of the alignment layer includes forming the microstructures as the alignment layer on the substrate.

In Step S9, the liquid crystal alignment device 230 places liquid crystal such that the liquid crystal corresponding to the first layer A1 is in contact with the alignment layer. Since the orientation processing has been performed on the alignment layer, the first elements Q1 of the liquid crystal are oriented to form the first layer A1.

Note that the production apparatus 201 forms the second layer A2 in Step S200 in a manner similar to Steps S3 to S9.

According to Embodiment 4, as described with reference to FIGS. 28 and 29, it is possible to produce the liquid crystal element 1 functioning as a holographic element.

That is, the production apparatus 201 generates the orientation distribution data based on the object data representing the virtual object and generates the orientation processing data based on the orientation distribution data. Accordingly, the image of the virtual object is recorded as distribution of directions of orientation of the first structural bodies B1 in the first layer A1. The image of the recorded virtual object is reproduced through irradiation of light to the first layer A1 and output of the light reflected by the second layer A2 toward the outside of the first layer A1. That is, the optical element 1 functions as a holographic element. According to Embodiment 4, as described above, it is possible to produce the optical element 1 functioning as a holographic element.

Furthermore, the image of the virtual object is recorded as distribution of directions of orientation of the first structural bodies B1 through orientation of the first elements Q1 by executing the orientation processing. It is therefore possible to easily produce the optical element 1 functioning as a holographic element as compared to production of common holographic elements. Common holographic elements for example requires fine processing of a master using an electron beam writer for semiconductor manufacturing for recording.

Furthermore, according to Embodiment 4, it is possible to select any virtual object and generate object data thereof. It is therefore possible to easily record an image of a desired virtual object on the optical element 1.

Furthermore, according to Embodiment 4, the optical element 1 reflects light entering through the light incidence surface 11 to form an image of a virtual object corresponding to the light. That is, the optical element 1 is capable of recording and reproducing the image of the virtual object, functioning as a holographic element. As a result, the application range of the optical element 1 can be further extended. For example, the optical element 1 can function as a security element. For example, the optical element 1 functioning as a security element changes an image (e.g., a motif) being reproduced depending on incoming polarized light. In such a case, the optical element 1 is effective particularly in authenticity determination. For example, the optical element 1 functioning as a security element reproduces an image (e.g., a motif) only when the optical element 1 receives light having specific polarization. Also in such a case, the optical element 1 is effective particularly in authenticity determination. In Embodiment 4, selective reflectivity of the second layer A2 can be effectively utilized. For example, the optical element 1 may function as a transparent security element. Specifically, the pitch p is set so that light having a wavelength in the non-visible wavelength range (e.g., a near-infrared range) is reflected. Accordingly, the optical element 1 is transparent when the liquid crystal element 1 receives light having a wavelength in the visible wavelength range. By contrast, the image of the virtual object is formed when the optical element 1 is irradiated with light having a wavelength in the non-visible wavelength range (e.g., the near-infrared range).

Embodiment 5

Figure 30A:
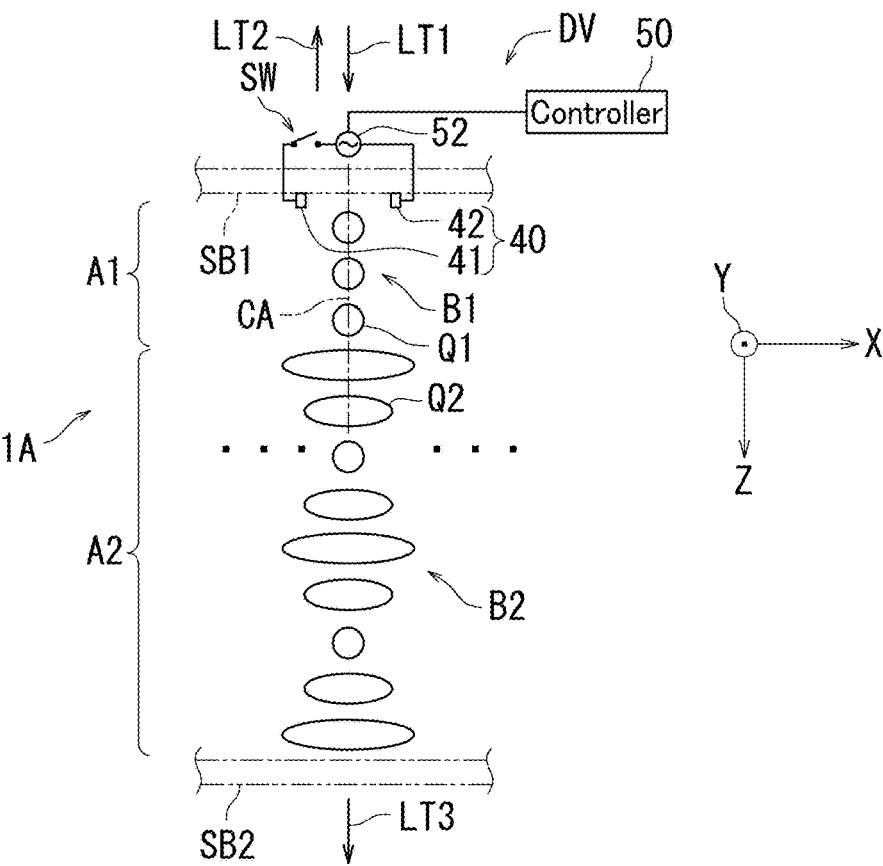
FIGS. 30A and 30B each are a cross-sectional view illustrating an optical element according to Embodiment 5 of the present invention.
Figure 30B:
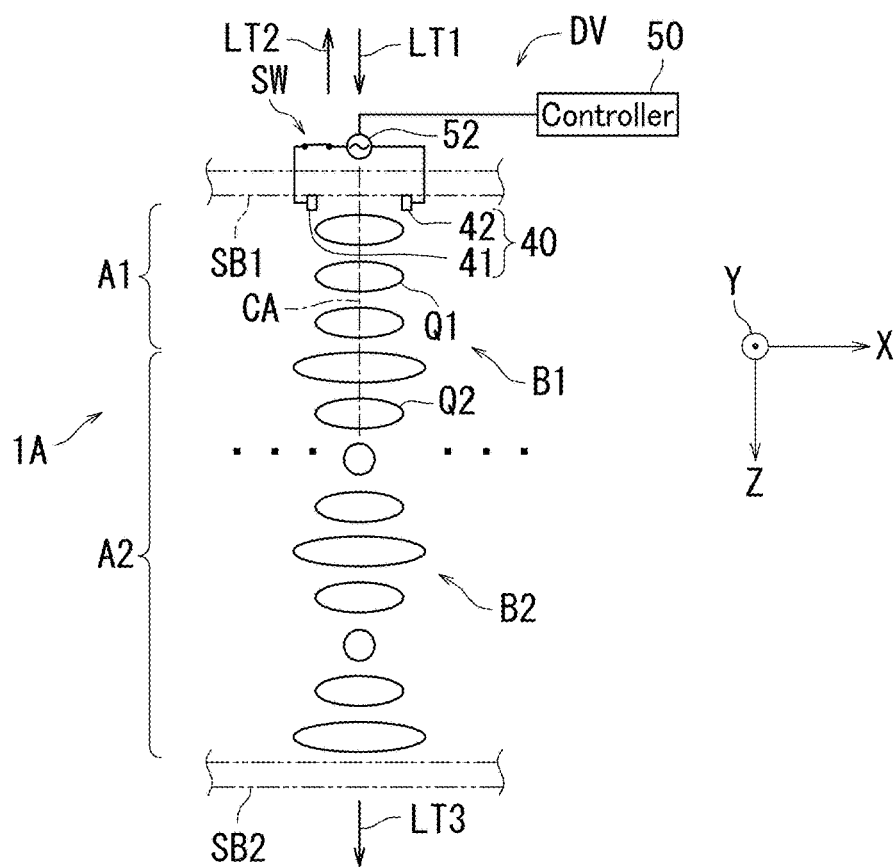
Figure 31:
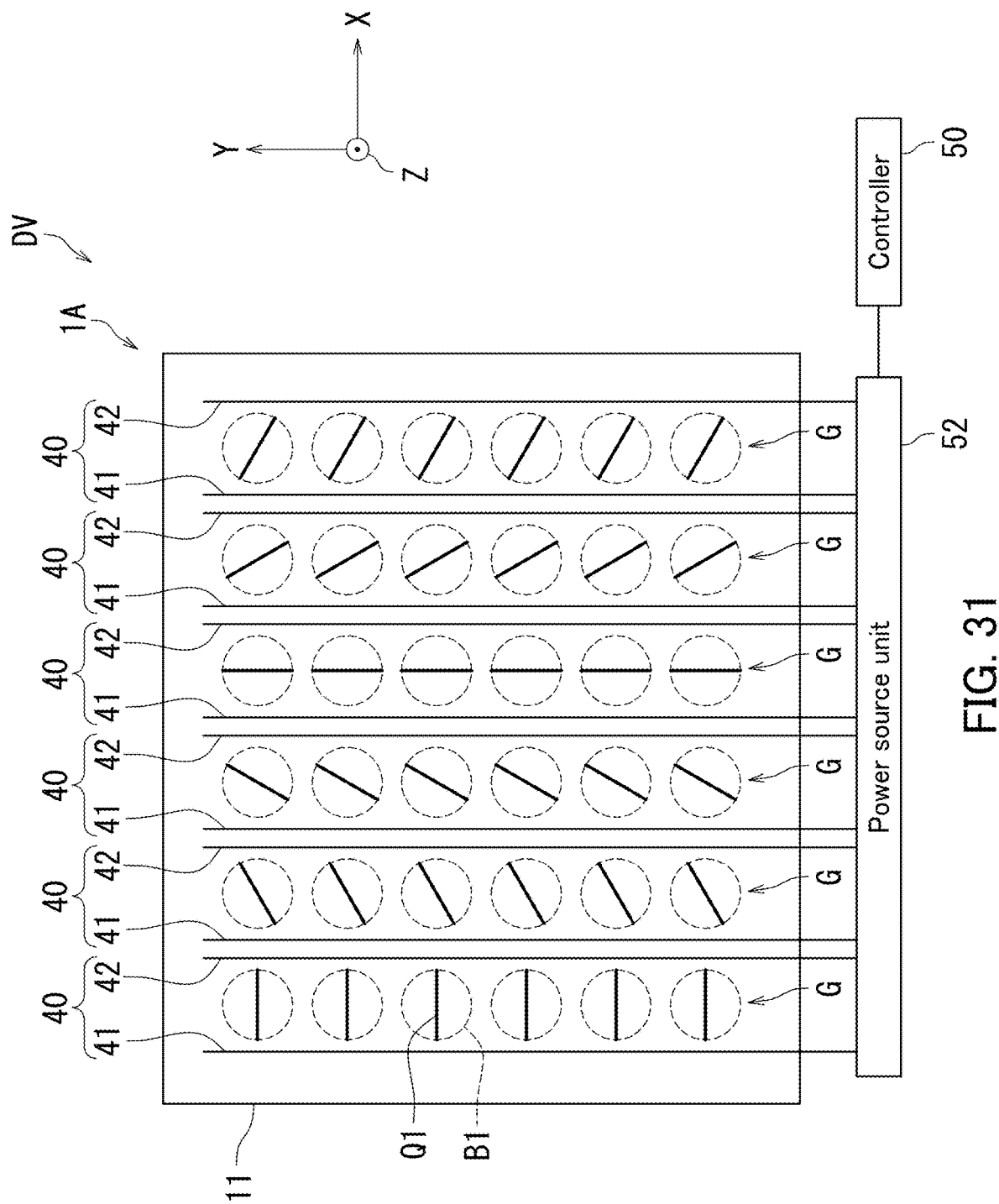
FIG. 31 is a plan view illustrating the optical element according to Embodiment 5.

The following describes a liquid crystal element 1A according to Embodiment 5 of the present invention with reference to FIGS. 30A, 30B, and 31. The optical element 1A according to Embodiment 5 differs from the optical element 1 according to Embodiment 1 in that the directions of orientation of the first structural bodies B1 of the optical element 1A are dynamically controlled in Embodiment 5. The following mainly describes differences of Embodiment 5 from Embodiment 1.

FIGS. 30A and 30B are diagrams each illustrating an optical device DV including the optical element 1A according to Embodiment 5. Note that dashed and double dotted lines indicates the substrate SB1 and the substrate SB2 and one first structural body B1 and one second structural body B2 are illustrated in FIGS. 30A and 30B in order to simplify the drawings.

As illustrated in FIG. 30A, the optical device DV includes the optical element 1A, a controller 50, a power source unit 52, and a plurality of switches SW.

The optical element 1A includes a plurality of electrode units 40 in addition to the elements of configuration of the optical element 1 illustrated in FIG. 1. The electrode units 40 are each provided for one or more first structural bodies B1. The electrode units 40 are disposed on one of a pair of main surfaces of the substrate SB1 that faces the first layer A1.

Each of the electrode units 40 includes a first electrode 41 and a second electrode 42. The first electrode 41 and the second electrode 42 are arranged with a central axis CA of a corresponding first structural body B1 therebetween. The central axis CA extends in the Z direction, passes through the center of the first structural body B1. Each of the first and second electrodes 41 and 42 is for example transparent and is made of indium tin oxide (ITO). Note that each of the first and second electrodes 41 and 42 may be semitransparent or colored.

The controller 50 controls the power source unit 52 and the switches SW. Specifically, the controller 50 includes a processor and a storage device. The processor executes computer programs stored in the storage device to control the power source unit 52 and the switches SW.

The power source unit 52 under control of the controller 50 generates control voltages (voltages) for the respective electrode units 40 and applies the control voltages to the respective electrode units 40. Each of the electrode units 40 applies the control voltage for controlling the direction of orientation of a corresponding one of the first structural bodies B1 to the structural body B1. The controller 50 controls the control voltages that the power source unit 52 generates for the respective electrode units 40. The control voltages are each a direct current voltage or an alternating current voltage. The controller 50 controls voltage values of the control voltages for example where the control voltages each are a direct current voltage. The controller 50 controls the frequencies and/or the amplitudes of the control voltages for example where the control voltages each are an alternating current voltage. The alternating current voltage is for example in square waves, triangular waves, sine waves, or sawtooth waves.

Description of the operation of the optical device DV will be continued with reference to FIGS. 30A and 30B. As illustrated in FIG. 30A, the controller 50 turns off the switches SW (specifically, all of the switches SW) when the optical element 1A is in an initial state. No control voltage is accordingly applied to any of the electrode units 40. As a result, the directions of orientation of the first structural bodies B1 (specifically, all of the first structural bodies B1) are identical and substantially parallel to one another. In the example illustrated in FIG. 30A, the directions of orientation of the first structural bodies B1 are substantially parallel to the Y direction.

Next, the controller turns on the switches SW (specifically, all of the switches SW) as illustrated in FIG. 30B. The control voltages are accordingly applied to the respective electrode units 40. As a result, the directions of orientation of the first structural bodies B1 vary according to a characteristic of the applied control voltages. The characteristic of the control voltage is for example a voltage value where the control voltage is a direct current voltage, and is either or both frequency and amplitude where the control voltage is an alternating current voltage.

The following describes an aspect of the electrode units 40 with reference to FIG. 31. FIG. 31 is a plan view illustrating the optical element 1A. The optical element 1A is viewed in the Z direction in FIG. 31. FIG. 31 does not illustrate the substrates SB1 but illustrates the first boundary surface 11 in order to simplify the drawing. Although not illustrated, all of the switches SW are turned on.

As illustrated in FIG. 31, the first structural bodies B1 are arranged in the X direction and the Y direction. A plurality of first structural bodies B1 arranged substantially linearly in the Y direction form a group G. Therefore, a plurality of groups G are formed.

The electrode units 40 are provided in one to one correspondence with the groups G. When the optical element 1A is viewed in the Z direction, the first structural bodies B1 are each located between a first electrode 41 and a second electrode 42 in each group G.

The controller 50 controls the power source unit 52 to control the control voltages applied to the respective electrode units 4 for the electrode units 400. This enables the controller 50 to dynamically control, for each group G, the directions of orientation of the first structural bodies B1. For example, the controller 50 is capable of spatially differentiating the directions of orientation of the first structural bodies B1 among the groups G. For example, the controller 50 is also capable of temporally differentiating the directions of orientation of the first structural bodies B1. That is, the controller 50 is capable of differentiating the directions of orientation of the first structural bodies B1 with time. Furthermore, for example, the controller 50 is capable of making the direction of orientation of the first structural bodies B1 in the groups G different from that in the initial state through changing the directions of orientation of the first structural bodies B1 over the groups G.

As described with reference to FIGS. 30A, 30B, and 31, the electrode units 40 apply, to the first structural bodies B1 in Embodiment 5, the control voltages for controlling the directions of orientation of the first structural bodies B1. In the above configuration, control of the control voltages can result in dynamic control of the directions of orientation of the first structural bodies B1. As a result, the phase of the light LT2 reflected by the second layer A2 and output from the first layer A1 toward the outside of the first layer A1 can be controlled activity. That is, the wavefront of the light LT2 output toward the outside of the first layer A1 can be controlled dynamically. Also, the phase of the light LT3 transmitted through the second layer A2 and output toward the outside of the second layer A2 can be controlled dynamically. That is, the wavefront of the light LT3 transmitted through the second layer A2 and output toward the outside of the second layer A2 can be controlled dynamically. For example, the optical element 1A can be utilized as a spatial optical modulation element and the optical device DV can be utilized as a spatial optical modulator.

Note that the electrode units 40 may be provided for the respective first structural bodies B1. This can enable the controller 50 to dynamically control the directions of orientation of the first structural bodies B1 for each first structural body B1. Control voltages having an identical characteristic can be applied to the respective electrode units 40 of the optical element 1A. For example, in a situation in which a plurality of the optical elements 1A that each constitute a single pixel constitute a display, the characteristic of the control voltages applied to the respective electrode units 40 are identical within each optical element 1A. However, the control voltages are controlled for each optical element 1A. First structural bodies B1 included in each group G are not particularly limited and are determined optionally according to the specification of a manufactured product. In a case for example where the optical elements 1A are applied to a display, the groups G may be in one to one correspondence with pixels.

Embodiment 6

Figure 32:
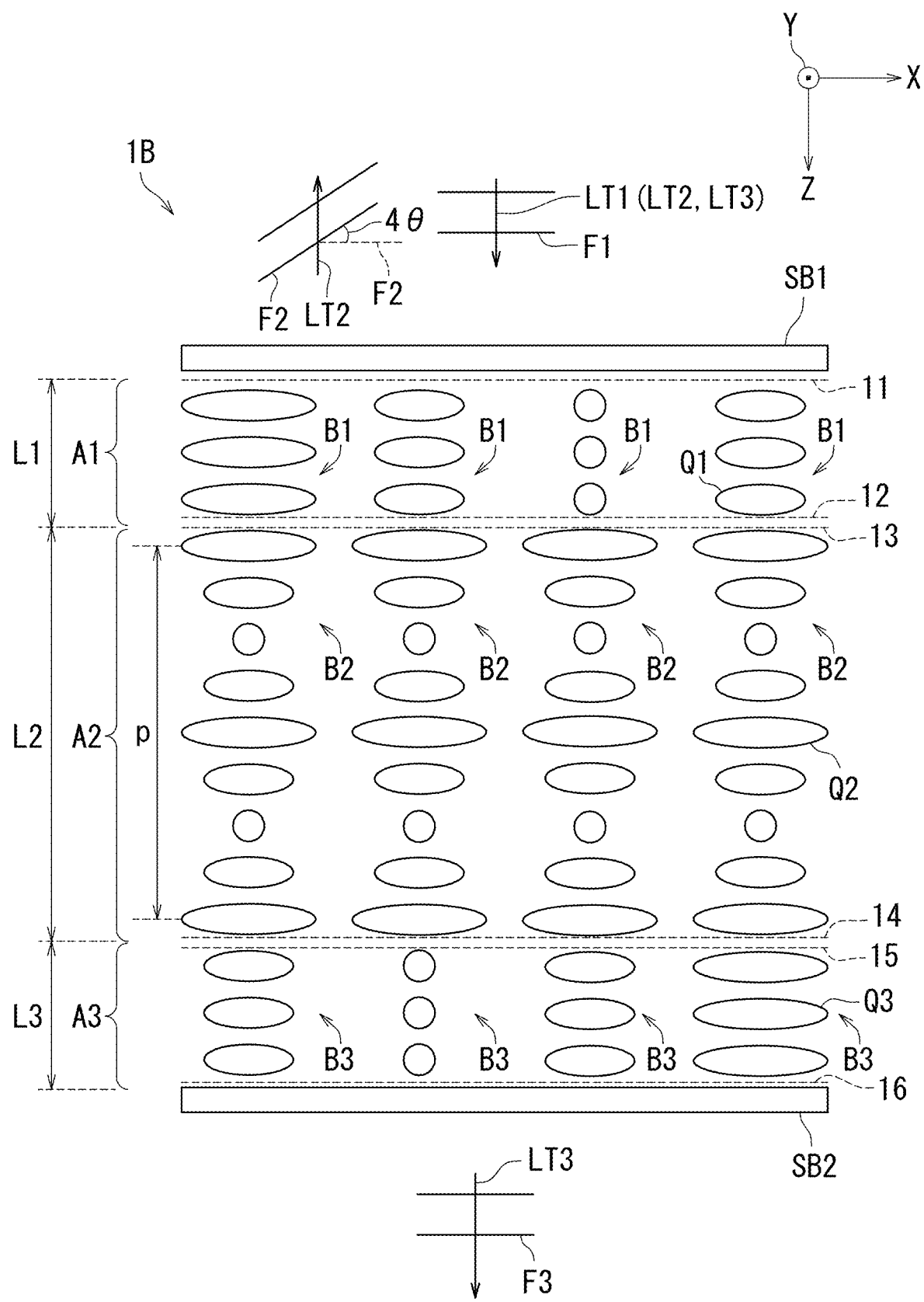
FIG. 32 is a cross-sectional view illustrating an optical element according to Embodiment 6 of the present invention.

The following describes an optical element 1B according to Embodiment 6 of the present invention with reference to FIG. 32. Embodiment 6 provides first to third layers A1 to A3, which is a difference from Embodiment 1 providing the first layer A1 and the second layer A20. The following mainly describes the difference of Embodiment 6 from Embodiment 1.

FIG. 32 is a cross-sectional view illustrating the optical element 1B according to Embodiment 6. As illustrated in FIG. 32, the optical element 1B further includes the third layer A3 in addition to the elements of configuration of the optical element 1 illustrated in FIG. 1. The second layer A2 faces the third layer A3. The second layer A2 is disposed between the first layer A1 and the third layer A3.

The third layer A3 has a fifth boundary surface 15 and a sixth boundary surface 16 opposite to each other. The fifth boundary surface 15 and the fourth boundary surface 14 face each other. For example, the fifth boundary surface 15 and the fourth boundary surface 14 are in contact with each other. The fifth boundary surface 15 and the sixth boundary surface 16 are perpendicular to the Z direction. The first layer A1, the second layer A, and the third layer A3 are disposed between the substrates SB1 and SB2. The first layer A1 faces the substrate SB1, and the third layer A3 faces the substrate SB2. The first boundary surface 11 faces the substrate SB1, and the sixth boundary surface 16 faces the substrate SB2.

Specifically, the third layer A3 is a liquid crystal layer formed of nematic liquid crystal. The third layer A3 has a thickness L3. The thickness L3 is a thickness in the Z direction. The third layer A3 includes a plurality of third structural bodies B3. The third structural bodies B3 form nematic liquid crystal. Each of the third structural bodies B3 extends in the Z direction. Each of the third structural bodies B3 includes a plurality of third elements Q1 successive in the Z direction. The third elements Q3 are liquid crystal molecules. Each of the third elements Q3 is in a rod-like shape, for example. Note that although a limited number of the third elements Q3 are illustrated in order to simplify the drawings in the present application, the third elements Q3 are arranged in a successive manner in each of the third structural bodies B3.

In each of the third structural bodies B3, the directions of orientation of the third elements Q3 are identical to one another. The directions of orientation of the third elements Q3 being identical to one another mean that the directions of orientation of the third elements Q3 are substantially parallel to one another. Therefore, the directions of orientation of the third element Q3 being identical to one another mean both a case where the directions of orientation of the third elements Q3 are substantially the same as one another and a case where the directions of orientation of the third elements Q3 differ from one another by approximately 180 degrees. The directions of orientation of the third elements Q1 in each third structural body B3 represent a direction of orientation of the third structural body B3.

The third elements Q3, third element groups, and directors of the third element groups in the third structural bodies B3 are defined in a manner similar to those in the first structural bodies B1. That is, one third element Q3 among a plurality of third elements Q3 located on one plane perpendicular to the Z direction represents a representative of third elements oriented in a direction of a director. Accordingly, in each third structural body B3, a plurality of third elements including the third element Q3 (also referred to below as "third element group") are located on one plane perpendicular to the Z direction. The direction of the director of the third element group in each third structural body B3 represents a direction of orientation of the third structural body B3.

The directions of orientation of the third elements Q3 (specifically, the directors of the third element groups) being identical to one another in each of the third structural bodies B3 is equivalent to the third layer A3 forming a structural body having orientation order with respect to one direction for each of the third structural bodies B3. Furthermore, definition of the directions of orientation of the third elements Q3 being identical to one another is the same as definition of the directions of orientation of the first elements Q1 being identical to one another (see Embodiment 1), and means not only strict identicalness in direction of orientation.

Each of the third structural bodies B3 exhibits the same behavior as the first structural bodies B1 for incident light according to the direction of orientation of the third structural body and the retardation of the third layer A3.

That is, each third structural body B3 changes the phase of light at output from the third structural body B1 relative to the phase at incidence to the third structural body B3 according to the direction of orientation of the third structural body B3, that is, according to the directions of orientation of a corresponding one of the third elements Q3.

Unless otherwise explicitly stated, the directions of orientation of the third structural bodies B3 are fixed to differ from one another in Embodiment 6. However, the directions of orientation of the third structural bodies B3 may be identical to one another. Alternatively, the directions of orientation of the third structural bodies B3 may be dynamically controlled.

Each third structural body B1 has optical anisotropy. Accordingly, each third structural body B3 changes a polarization state of light at output from the third structural body B3 relative to a state at incidence to the third structural body B3. The polarization state of light is defined with respect to the propagation direction of the light.

The third layer A3 changes, according to the birefringence of the third structural bodies B3, the polarization state of light at output from the third layer A3 toward the outside of the third layer A3 relative to a state of light at incidence to the third layer A3 from the second layer A2. In addition, the third layer A3 changes, according to the directions of orientation of the third structural bodies B3, the phase of the light at output from the third layer A3 toward the outside of the third layer A3 relative to the phase thereof at incidence to the third layer A3 from the second layer A2. That is, the third layer A3 changes, according to the directions of orientation of the third structural bodies B, the wavefront of light at output from the third layer A3 toward the outside of the third layer A3 relative to the wavefront of light at incidence to the third layer A3 from the second layer A23.

Note that the direction of orientation of each third structural body B3 is represented by an orientation angle of the third element Q3 or an orientation angle of the director of a third element group, similarly to the direction of orientation of each first structural body B1.

An alignment pattern of the third structural bodies B3 may be different from or the same as the alignment pattern of the first structural bodies B1. A retardation Rd3 (=Δn3× L3) of the third layer A3 may be different from or the same as the retardation Rd of the first layer A1. A birefringence Δn3 (Δn3=ne3−no3) is expressed using a refractive index ne3 of extraordinary light and a refractive index no3 of ordinary light with respect to the third layer A3.

For example, the third structural bodies B3 are oriented by determining the directions of orientation of the third structural bodies B3 so that the phase of the light LT3 at output through the sixth boundary surface 16 is at an angle of 0 when the phase of the light LT3 at output through the fourth boundary surface 14 is at an angle of 2θ (see FIG. 1). That is, the third structural bodies B3 are oriented by determining the directions of orientation of the third structural bodies B3 so that the inclination angle of the wavefront F3 of the light LT3 at output through the sixth boundary surface 16 is 0 when the inclination angle of the wavefront F3 of the light LT3 at output through the fourth boundary surface 14 is 2θ (see FIG. 1). Specifically, the directions of orientation of the first structural bodies B1 are changed "θ" by "θ" in the X direction. By contrast, the directions of orientation of the third structural bodies B3 are changed "−θ" by "−θ" in the X direction.

For example, the third structural bodies B3 are oriented by determining the directions of orientation of the third structural bodies B3 so that the angle of the phase of the light LT3 at output through the sixth boundary surface 16 is 4θ when the angle of the phase of the light LT3 at output through the fourth boundary surface 14 is 2θ (see FIG. 1). That is, the third structural bodies B3 are oriented by determining the directions of orientation of the third structural bodies B3 so that the inclination angle of the wavefront F3 of the light LT3 at output through the sixth boundary surface 16 is 4θ when the inclination angle of the wavefront F3 of the light LT3 at output through the fourth boundary surface 14 is 2θ (see FIG. 1). Specifically, the directions of orientation of the first structural bodies B1 are changed "θ" by "θ" in the X direction. Further, the directions of orientation of the third structural bodies B3 are changed "θ" by "θ" in the X direction.

As described with reference to FIG. 32, the optical element 1B according to Embodiment 6 includes the third layer A3. In the above configuration, the phase of the light LT3 transmitted through the second layer A2 and entering the third layer A3 can be further changed according to the directions of orientation of the third structural bodies B3. That is, the wavefront F3 of the light LT3 transmitted through the second layer A2 and entering the third layer A3 can be further changed according to the directions of orientation of the third structural bodies B3.

According to Embodiment 6, birefringence by the third layer A3 further changes the polarization state of the light LT3 transmitted through the second layer A2 and entering the third layer A3. Note that the third structural bodies B3 of the third layer A3 can be arranged for example in any of the first to sixth alignment patterns in Embodiment 1.

Yet, Embodiment 6 provides the first layer A1 and the second layer A2 likewise in Embodiment 1. Therefore, Embodiment 6 also achieves the same advantages as Embodiment 1. However, the directions of orientation of the third structural bodies B3 may be identical to one another.

The light herein may enter through the sixth boundary surface 16 in addition to entering of the light only through the first boundary surface 11. In this case, for example, light that the second structural bodies B2 can selectively reflect is incident on the first boundary surface 11 and the sixth boundary surface 16. As a result, the light entering through the first boundary surface 11 is reflected by the second layer A2 and output from the first layer A1 toward the outside. The phase and the wavefront of the light output from the first layer A1 toward the outside are changed according to the directions of orientation of the first structural bodies B1 of the first layer A1. By contrast, the light entering through the sixth boundary surface 16 is reflected by the second layer A2 and output from the third layer A3 toward the outside. The phase and the wavefront of the light output from the third layer A3 toward the outside are changed according to the directions of orientation of the third structural bodies B3 of the third layer A3.

(Variations)

The third layer A3 in a variation of Embodiment 6 in the present invention has the same configuration as the second layer A2. That is, the third structural bodies B3 constituting the third layer A3 twist to form helices. For example, the third layer A3 forms cholesteric liquid crystal.

Specifically, of opposite ends in one period of a helix of each third structural body B3, a third element Q3 located at one end twists by approximately 360 degrees with respect to a third element Q3 located at the other end. The directions of orientation of the third elements Q3 on each of planes perpendicular to the Z direction are identical to and substantially parallel to one another over a plurality of third structural bodies B3. That is, spatial phases of the third structural bodies B3 are the same as one another. The helical directions of helices of the third structural bodies B3 are the same as one another. The directions of orientation of the third structural bodies B32 are fixed. The helical direction of the helix of each third structural body B3 is different from the helical direction of the helix of each second structural body B2.

Note that a medium that encourages orientation of the liquid crystal may be disposed between the first layer A1 and the second layer A2 and/or between the second layer A2 and the third layer A3. Alternatively, a thin insulating film or a conductive thin film may be disposed therebetween. Furthermore, an electrode or a medium that encourages orientation of the liquid crystal may be disposed between the substrate SB1 and the first layer A1. Alternatively, a thin insulating film or a conductive thin film may be disposed therebetween. Yet, an electrode or a medium that encourages orientation of the liquid crystal may be disposed between the substrate SB2 and the third layer A3. Alternatively, a thin insulating film or a conductive thin film may be disposed therebetween.

Embodiment 7

The following describes a film unit according to Embodiment 7 of the present invention with reference to FIG. 1. The film unit includes a first film and a second film. The first film is formed based on the first layer A1 according to Embodiment 1. The second film is formed based on the second layer A2 according to Embodiment 2. Note that the film unit does not include the substrate SB1 and the substrate SB2.

As illustrated in FIG. 1, the first film is for example formed through polymerization of the first structural bodies B1 of the first layer A1. Specifically, the first film is formed through polymerization of the first elements Q1 constituting the first layer A1. In the above configuration, for example, the first elements Q1 are polymerized through irradiation of the first layer A1 with light.

Alternatively, the first film is for example formed in a manner that orientation of a polymeric liquid crystal material that exhibits a liquid crystalline state at a specific temperature or a specific concentration is controlled such that the polymeric liquid crystal material in the liquid crystalline state forms the first structural bodies B1 that has a specific pattern in the liquid crystalline state, followed by causing transition of the polymeric liquid crystal material to solid while maintaining the orientation.

Through polymerization or transition to solid, adjacent structural bodies B1 in the first film are united together while maintaining the orientation of the first structural bodies B1. As a result, the directions of orientation of the first elements Q1 are fixed in the first film.

The second film is for example formed through polymerization of the second structural bodies B2 of the second layer A2. Specifically, the second film is formed through polymerization of the second elements Q2 constituting the second layer A2. In the above configuration, for example, the second elements Q2 are polymerized through irradiation of the second layer A2 with light.

Alternatively, the second film is for example formed in a manner that orientation of a polymeric liquid crystal material that exhibits a liquid crystalline state at a specific temperature or a specific concentration is controlled such that the polymeric liquid crystal material in the liquid crystalline state forms the second structural bodies B2 that have an identical spatial phase in the liquid crystalline state, followed by causing transition of the polymeric liquid crystal material to solid while maintaining the orientation.

Through polymerization or transition to solid, adjacent second structural bodies B2 in the second film are united together while maintaining the orientation of the second structural bodies B2. As a result, the directions of orientation of the second elements Q2 are fixed in the second film.

The film unit is formed by arranging the first and second films so as to face each other. For example, the film unit is formed in a manner that the first and second films adhere to each other so as to face each other.

A first film corresponding to any of those in Embodiments 2 to 6 can be formed based on the first layer A1 in any of Embodiments 2 to 6 in a manner similar to that for the first film according to Embodiment 7. Furthermore, a second film corresponding to any of those in Embodiments 4 to 6 can be formed based on the second layer A2 in any of Embodiments 4 to 6 in a manner similar to that for the second film according to Embodiment 7. Yet, a film unit corresponding to those in Embodiments 4 and 5 can be formed by arranging the first and second films so as to face each other in a manner similar to that for the film unit according to Embodiment 7. Alternatively, the film unit can be formed by arranging the first film and the reflection substrate SBR corresponding to those in Embodiment 2 so as to face each other. Yet, the film unit can be formed by arranging the first film and the second layer A2Y corresponding to those in Embodiment 3 so as to face each other.

In correspondence to Embodiment 6, the third film is for example formed through polymerization of the third structural bodies B3 of the third layer A3. Specifically, the third film is formed through polymerization of the third elements Q3 constituting the third layer A3. In such a case, for example, the third elements Q3 are polymerized through irradiation of the third layer A3 with light.

Alternatively, the third film may be formed in a manner that orientation of a polymeric liquid crystal material that exhibits a liquid crystalline state at a specific temperature or a specific concentration is controlled such that the polymeric liquid crystal material in the liquid crystalline state forms the third structural bodies B3 that has a specific pattern in the liquid crystalline state, followed by causing transition of the polymeric liquid crystal material to solid while maintaining the orientation.

Through polymerization or transition to solid, adjacent third structural bodies B3 in the third film are united together while maintaining the orientation of the third structural bodies B3. As a result, the directions of orientation of the third elements Q3 are fixed in the third film.

In correspondence to Embodiment 6, the film unit can be formed by stacking the first film, the second film, and the third film. In such a case, the second film is disposed between the first film and the third film.

In the following description, the film unit according to Embodiment 7 and the film units as the film units in Embodiments 1 to 6 are collectively referred to as a "present film unit" according to Embodiment 7. The present film unit functions as an optical element. The present film unit does not include the substrate SB1 and the substrate SB2.

According to Embodiment 7, the present film unit has the same advantages as the optical element 1, the optical element 1X, the optical element 1Y, the optical element 1A, and the optical element 1B according to Embodiment 1 to 6. The present film unit is applicable to circular polarization beam splitters, optical isolators, holographic elements, concave lenses, convex lenses, displays, optical reflection elements, screens, or security elements likewise in Embodiments 1 to 6.

The following specifically describes the present invention using an example. However, the present invention is not limited to the following example.

Example

The following describes the optical element 1 according to Example of the present invention and an optical element according to Comparative Example 7 with reference to FIGS. 1 and 33 to 36. In Example, the optical element 1 according to Embodiment 1 described with reference to FIG. 1 was used. As illustrated in FIG. 1, the thickness L1 of the first layer A1 was determined so that the first layer A1 functioned as a half-wavelength plate when the wavelength λ was 460 nm. The first layer A1 and the second layer A2 each in a film shape were bonded together for use. Therefore, the substrate SB1 and the substrate SB2 were not used. The first structural bodies B1 were arranged in the second alignment pattern. The helical direction of the helices of the second structural bodies B2 was a right helical direction.

Figure 33:
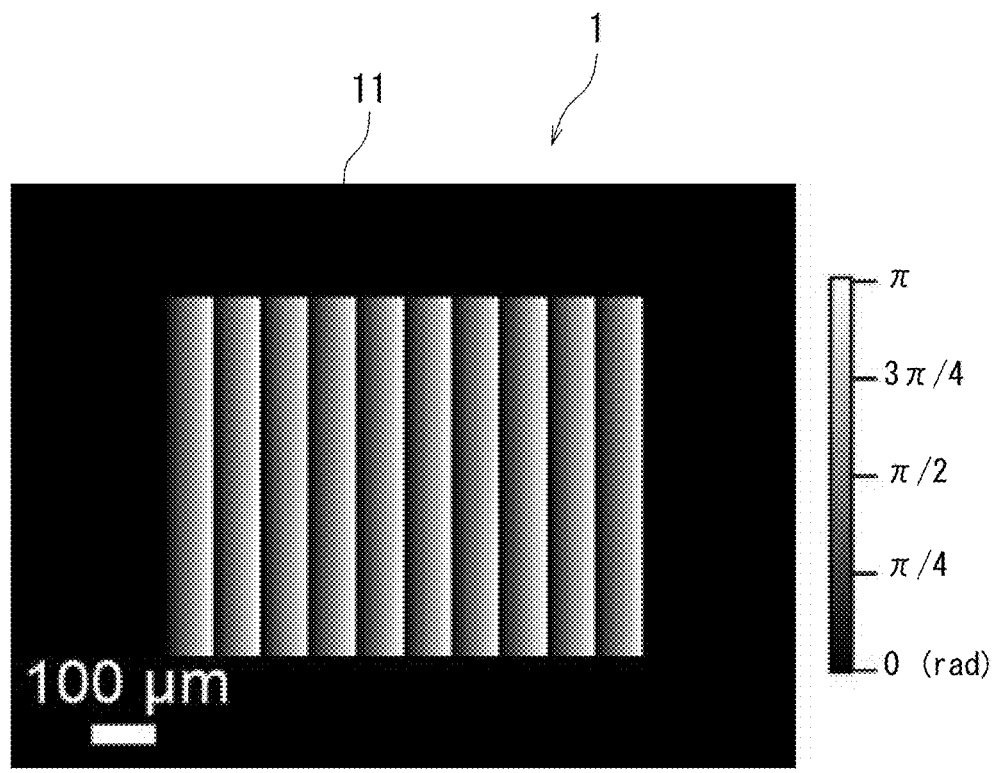
FIG. 33 is a plan view illustrating the second alignment pattern that an optical element according to Example of the present invention has.

FIG. 33 is a plan view illustrating the second alignment pattern adopted to the optical element 1 according to Example. The optical element 1 is viewed in the Z direction in FIG. 33. The first boundary surface 11 is illustrated in FIG. 33. The directions of orientation of the first structural bodies B1 are expressed in the same manner as in FIG. 21.

As illustrated in FIG. 33, the second alignment pattern in Example in which the first structural bodies B1 were arranged in 10 periods differed from the second alignment pattern illustrated in FIG. 19 in which the first structural bodies B1 were arranged in 2 periods.

Only the light LT2 with left circular polarization was allowed to enter the optical element 1. Specifically, only the light LT2 was allowed to be incident normally on the first boundary surface 11. The light LT2 reflected by the second boundary surface 12 and output through the first boundary surface 11 was observed using a Michelson Interferometer under a microscope. In observation, interference fringes were observed using a filter allowing only light having a wavelength λ of 460 nm to pass therethrough.

Figure 34:
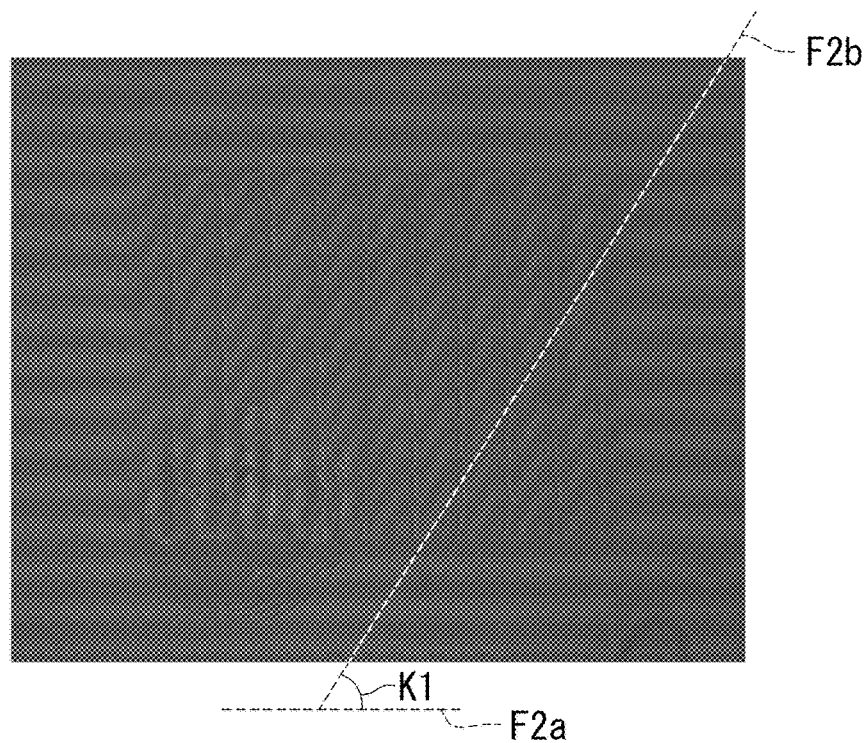
FIG. 34 is a diagram illustrating interference fringes corresponding to light output by the optical element according to Example.

FIG. 34 is a diagram illustrating interference fringes corresponding to the light LT2 output by the optical element 1 according to Example. As illustrated in FIG. 34, interference fringes F2b could be observed. The interference fringes F2b corresponded to phase change of the light LT2 output through the first boundary surface 11. That is, the interference fringes F2b expressed a wavefront of the light LT2. The interference fringes F2b had an inclined angle K1 with respect to interference fringes F2a of the light LT3 that involved no phase change.

Figure 35:
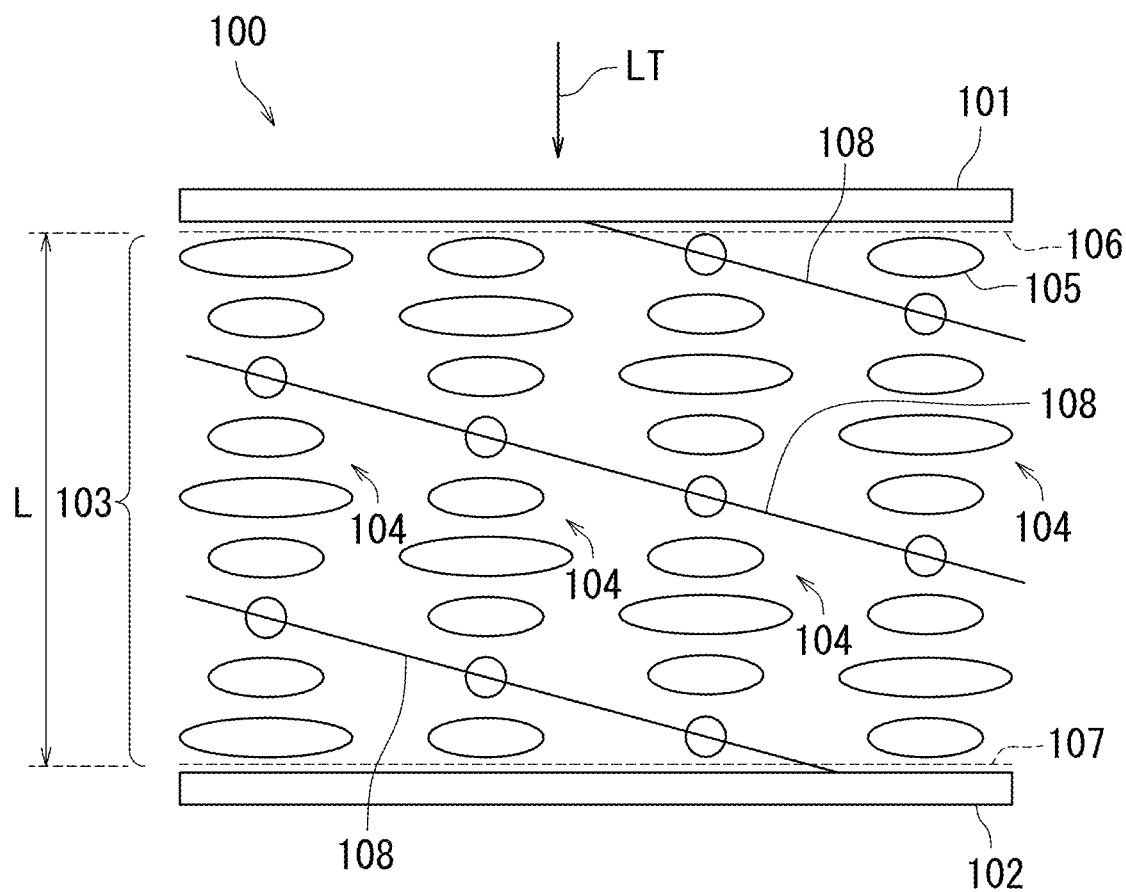
FIG. 35 is a cross-sectional view illustrating an optical element according to Comparative Example 7.

The following describes an optical element 100 according to Comparative Example 7 with reference to FIG. 35. FIG. 35 is a diagram illustrating the optical element 100. As illustrated in FIG. 35, the optical element 100 is the same as the optical element 100 described with reference to FIG. 9. However, the optical element 100 in Comparative Example 7 included multiple structural bodies 104 forming cholesteric liquid crystal. The structural bodies 104 each had a pitch p and a refractive index at which the light LT having a wavelength λ of 460 nm was reflected.

Spatial phases of helices of the structural bodies 104 were different from one another. A plurality of inclined reflection surfaces 108 were formed. The helical direction of the helix of each structural body 104 was a direction of right helical circulation. The thickness L of the layer 103 was the same as the thickness L1 of the first layer A1. The layer 103 was formed into a film for use. The substrate 101 and the substrate 102 were accordingly not used. The alignment pattern of the structural bodies 104 on the boundary surface 106 was the same as the second alignment pattern illustrated in FIG. 33.

Only the light LT with right circular polarization was allowed to be incident normally on the boundary surface 106. The light LT reflected by the reflection surface 108 and output through the boundary surface 106 was observed using a Michelson Interferometer under a microscope. In observation, interference fringes were observed using a filter allowing only light having a wavelength λ of 460 nm to pass therethrough.

Figure 36:
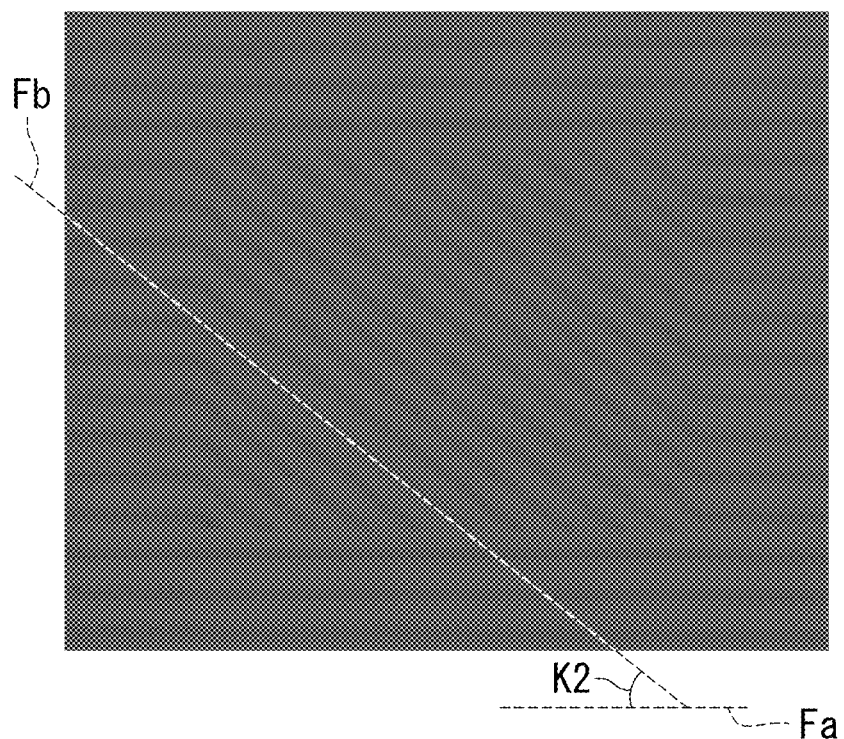
FIG. 36 is a diagram illustrating interference fringes corresponding to light output by the optical element according to Comparative Example 7.

FIG. 36 is a diagram showing interference fringes corresponding to the light LT output by the optical element 100 according to Comparative Example 7. As shown in FIG. 36, interference fringes Fb could be observed. The interference fringes Fb corresponded to phase change of the light LT output through the boundary surface 106. That is, the interference fringes Fb expressed a wavefront of the light LT. The interference fringes Fb inclined at an inclination angle K2 with respect to interference fringes Fa of the light LT with no phase change.

As illustrated in FIGS. 34 and 36, the inclination angle K1 in Example was larger than the inclination angle K2 in Comparative Example 7. Specifically, the inclination angle K1 in Example is approximately double the inclination angle K2 in Comparative Example 7.

The inclination angle K1 in Example being larger than the inclination angle K2 in Comparative Example 7 meant that phase change by the optical element 1 in Example was larger than phase change by the optical element 100 in Comparative Example 7. Specifically, it was shown that the phase change by the optical element 1 in Example was approximately double the phase change by the optical element 100 in Comparative Example 7.

Embodiments of the present invention have been described so far with reference to the drawings. However, the present invention is not limited to the above embodiments and Example, and may be implemented in various different forms that do not deviate from the essence of the present invention (for example, as described below in sections (1) to (9)). Elements of configuration disclosed in the above embodiments can be combined as appropriate to form various inventions. For example, some of the elements of configuration in the embodiments may be omitted. Furthermore, elements of configuration in three different embodiments may be combined as appropriate. The drawings schematically illustrate elements of configuration in order to facilitate understanding, and properties of elements of configuration illustrated in the drawings, such as thickness, length, number, and spacing may differ from actual properties thereof in order to facilitate preparation of the drawings. Furthermore, properties of elements of configuration described in the above embodiments, such as material properties, shapes, and dimensions, are merely examples and are not intended as specific limitations. Various alterations may be made so long as there is no substantial deviation from the effects of the present invention.

(1) The first structural bodies B1 of the first layer A1 described with reference to FIG. 1 can be arranged in any alignment pattern, and the alignment pattern is not limited to those in Embodiments 1 to 6. The third structural bodies B3 of the third layer A3 described with reference to FIG. 32 can also be arranged in any alignment pattern, and the alignment pattern is not limited to that in Embodiment 6.

(2) Light is allowed to be incident on the first boundary surface 11 at an incident angle of approximately 90 degrees with respect to the first boundary surface 11 in Embodiments 1 to 7. However, light may be allowed to be incident on the first boundary surface 11 at an acute incident angle with respect to the first boundary surface 11.

(3) The first layer A1 in each of Embodiments 1 to 7 is not limited to forming a nematic phase. The first layer A1 may form a liquid crystal phase having orientation order with respect to one direction other than the nematic phase. That is, the first layer A1 may form a liquid crystal phase having orientation order with respect to one direction for each of the first structural bodies B1 other than the nematic phase. Similarly, the third layer A3 in Embodiment 6 is not also limited to forming the nematic phase.

Furthermore, the second layer A2 is not limited to forming a cholesteric phase. The second layer A2 may form a chiral liquid crystal phase other than the cholesteric phase. That is, the second structural bodies B2 may form a chiral liquid crystal phase other than the cholesteric phase. Examples of chiral liquid crystal phases other than the cholesteric phase include a chiral smectic C phase, a twist grain boundary phase, and a cholesteric blue phase. The cholesteric phase may for example be a helicoidal cholesteric phase.

(4) The application of the present invention is not limited to liquid crystal. For example, the first layer A1 in any of Embodiments 1 to 7 may be a structure having orientation order with respect to one direction for each first structural body B1 in place of the liquid crystal. The first layer A1 is for example formed of an organic substance, inorganic substance, metal, or crystal having orientation order with respect to one direction for each first structural body B1. The first layer A1 may be formed of for example an anisotropic polymer or may have a nanorod structure of a metal or a dielectric. The third layer A3 in Embodiment 6 also is not limited to liquid crystal.

Further, a chiral structural body may be disposed in place of the liquid crystal in the second layer A2 in any of Embodiments 1 to 7. That is, the second structural bodies B2 may form a chiral structural body. The chiral structural body is for example a helical inorganic substance, a helical metal, or a helical crystal.

The helical inorganic substance is for example a chiral sculptured film (also referred to below as a "CSF"). The CSF is an optical thin film which is obtained through vapor deposition of an inorganic substance on a substrate being rotated and which has helical microstructures. Therefore, the CSF has the same optical characteristic as cholesteric liquid crystal.

The helical metal is for example a helix metamaterial (also referred to below as a "HM"). The HM is a substance which is obtained through processing on a metal into a helical microstructural body and which reflects circularly polarized light like cholesteric liquid crystal.

The helical crystal is for example gyroid photonic crystal (also referred to below as "GPC"). The GPC has a three-dimensional helical structure. Some of insects or artificial structural bodies include the GPC. Like a cholesteric blue phase, the GPC reflects circularly polarized light.

(5) Through production of a plurality of the optical elements 1, the optical elements 1X, the optical elements 1Y, the optical elements 1A, the optical elements 1B, or the film units according to Embodiments 1 to 7 (also referred to below as an "optical element 1 or the like"), plurality of the optical elements 1 or the like can be stacked one on another. In such a case, the optical elements 1 or the like may differ from one another in configuration. Also, one or more layers may be disposed between the substrate SB2 and the third layer A3 in Embodiment 6.

For example, a first-layer film unit forms an image of a "core" of an apple in a brown color as a virtual object, a second-layer film unit forms an image of a "leaf" of the apple in a green color as a virtual object, and a third-layer film unit forms an image of a "fruit" of the apple in a red color as a virtual object. As a result, an image of a colored apple composed of the "core", the "leaf" and the "fruit" is formed.

For example, the first-layer film unit forms an image of a first virtual object when light with certain polarization is irradiated, and the second-layer film unit forms an image of a second virtual object when light with different polarization is irradiated. According to the present invention, selective reflectivity of the second layer A2 can be effectively utilized.

(6) The optical element 1 or the like is applicable to a variety of fields. For example, the optical element 1 or the like can function as a holographic optical element. For example, the optical element 1 or the like functions as a fold mirror, a screen, or a lens through reflecting or diffusing light in a specific direction(s). The holographic optical element may for example be mounted on a wearable display.

The optical element 1 or the like can for example function as a decorative element or a decorative film. The optical element 1 or the like for example reflects light having the same color when viewed from any angle. As a result, the optical element 1 or the like functions as a decorative element or a decorative film of transflective type and with a metallic luster.

For example, a screen can be formed that includes a glass substrate and the film unit according to Embodiment 7. The film unit is attached to a surface of the glass substrate. The screen can be utilized for example as a display of a wearable device.

For example, a glass plate can be formed that includes a glass board and the film unit according to Embodiment 7. The film unit is attached to the glass board. A portion of incident light is reflected by the film unit as reflected light. In such a case, the film unit reflects the reflection light in a direction approximately opposite to an incidence direction of the incident light. Alternatively, the film unit reflects a portion of incident light as reflected light without depending on the incident angle of the incident light.

The glass plate including the glass board and the film unit according to Embodiment 7 is for example usable as a glass window of an automobile or a building. In such a situation, exposure of people to the reflected light can be prevented by controlling the reflection direction of the reflected light being heat rays when the incident light being heat rays comes in. Alternatively, the reflected light being heat rays can be concentrated in a specific direction so as to prevent exposure of people to the reflected light. For another example, the glass plate is usable as a transparent projector screen having a high viewing angle characteristic and transmittance.

(7) It is possible to dynamically control the characteristic of the optical element 1 or the like by stimulation. For example, an electrical stimulus is given (for example, application of voltage or current) to the optical element 1 or the like. In response to the electrical stimulus, the optical element 1 changes the directions of orientation of the first structural bodies B1. For example, an optical stimulus is given (for example, irradiation with light) to the optical element 1 or the like. In response to the optical stimulus, the optical element 1 changes the directions of orientation of the first structural bodies B1. For example, a mechanical stimulus is given (for example, stress application) to the optical element 1 or the like. In response to the mechanical stimulus, the optical element 1 changes the directions of orientation of the first structural bodies B1. For example, a chemical stimulus is given (for example, induction of a chemical reaction) to the optical element 1 or the like. In response to the chemical stimulus, the optical element 1 changes the directions of orientation of the first structural bodies B1. Note that it is possible to change the directions of orientation of the third structural bodies B3 by stimulating the optical element 1B in Embodiment 6.

(8) Light entering the optical element 1 or the like in any of Embodiments 1 to 7 is not limited to visible light, and may be light having a wavelength in a range other than the visible light range. For example, although no specific limitations are placed on wavelength and frequency, electromagnetic waves (e.g., terahertz waves) may enter the optical element 1 or the like.

(9) The optical element 1 or the like in Embodiments 1 to 7 is not limited to having a shape of a substantially flat plate. The optical element 1 or the like may be curved or bent, for example. In a case where a mirror is fabricated using the optical element 1 or the like that is curved, aberration correction can be facilitated in production of a mirror or the like. Furthermore, the optical element 1 or the like may be elastic. When the optical element 1 or the like is elastic, the optical element 1 or the like can for example be curved at any curvature.

INDUSTRIAL APPLICABILITY

The present invention provides an optical element and a production method for the optical element, and has industrial applicability.

REFERENCE SINGS LIST 1, 1X, 1Y, 1A, 1B optical element
electrode unit
A1 first layer
A2, A2Y second layer
A21 ¼ wavelength layer
A23 reflection layer
A3 third layer B1 first structural body
B2 second structural body
B3 third structural body
SIR reflection substrate (second layer)

The invention claimed is:
1. An optical element comprising:
a first layer; and
a second layer that faces the first layer, wherein
the first layer includes a plurality of first structural bodies that each have optical anisotropy,
in reflection of light entering from the first layer, the second layer reflects the light while maintaining a polarization state of the light at incidence and at the reflection,
the first layer
changes, according to directions of orientation of the first structural bodies, a wavefront of the light at output from the first layer toward the second layer relative to a wavefront of the light at incidence to the first layer from outside of the first layer, and
changes, according to the directions of orientation of the first structural bodies, the wavefront of the light at output from the first layer toward the outside of the first layer relative to a wavefront of the light at incidence to the first layer from the second layer, and
the directions of orientation of the first structural bodies vary so that the wavefront of the light at output from the first layer toward the outside of the first layer has a specific form.
2. The optical element according to claim 1, wherein
in transmission of light entering through the first layer, the second layer transmits the light while maintaining the polarization state of the light at incidence and at output.
3. The optical element according to claim 1, wherein
the first structural bodies of the first layer have the same birefringence,
the first layer has a retardation of no less than $3\lambda c(2m+1)/8$ and no greater than $5\lambda c(2m+1)/8$, and
where $\lambda c$ represents a wavelength of light entering the first layer, and "m" represents an integer of equal to or greater than 0.
4. The optical element according to claim 1, further comprising
electrode units each configured to apply a voltage to corresponding one or more first structural bodies of the first structural bodies, the voltage being for controlling directions of orientation of the corresponding one or more first structural bodies.
5. The optical element according to claim 1, wherein
the first layer includes plural first structural bodies of the first structural bodies, the plural structural bodies differing from one another in direction of orientation.
6. The optical element according to claim 1, wherein
the first layer forms a structure in which orientation order is set in one direction for each of the first structural bodies.
7. The optical element according to claim 1, wherein
the second layer includes a plurality of second structural bodies each forming a helix.
8. The optical element according to claim 1, further comprising
a third layer that faces the second layer, wherein
the third layer includes a plurality of third structural bodies each having optical anisotropy, and
the second layer is disposed between the first layer and the third layer.
9. The optical element according to claim 1, wherein
the second layer includes:
a ¼ wavelength layer that faces the first layer; and
a reflection layer that faces the ¼ wavelength layer and that reflects light, and
the ¼ wavelength layer has a retardation equal to a ¼ wavelength of light.
10. The optical element according to claim 1, wherein
the first structural bodies of the first layer have the same birefringence,
a plurality of light fluxes output from the respective first structural bodes are the same as one another in the polarization state, and
spatial phases of the light fluxes output from the respective first structural bodies are different from one another according to the directions of orientation of the first structural bodies.
11. The optical element according to claim 1, wherein
an image of an object is recorded as distribution of directions of orientation of the first structural bodies, and
the first layer outputs the light reflected by the second layer toward outside of the first layer to form the image of the object corresponding to the light.
12. The optical element according to claim 1, wherein
the directions of orientation of the first structural bodies vary so that the wavefront of the light output from the first layer toward the outside of the first layer has a linear gradient relative to the wavefront of the light at incidence to the first layer from the outside of the first layer, and the specific form is the linear gradient.
13. The optical element according to claim 1, wherein
the directions of orientation of the first structural bodies vary so that the wavefront of the light at output from the first layer toward the outside of the first layer has a curved surface, and
the specific form is the curved surface.
14. The optical element according to claim 13, wherein
the curved surface is symmetrical with respect to a symmetric axis.
15. The optical element according to claim 1, wherein
the directions of orientation of the first structural bodies vary so that the wavefront of the light at output from the first layer toward the outside of the first layer has an irregular shape, and
the specific form is the irregular shape.
16. The optical element according to claim 1, wherein
the directions of orientation of the first structural bodies vary so that the wavefront of the light at output from the first layer toward the outside of the first layer has a helical surface, and
the specific form is the helical surface.
17. An optical element comprising:
a first layer; and
a second layer that faces the first layer, wherein
the first layer includes a plurality of first structural bodies that each have optical anisotropy,
in reflection of light entering from the first layer, the second layer reflects the light while maintaining a polarization state of the light at incidence and at the reflection, the first layer
changes, according to directions of orientation of the first structural bodies, a wavefront of the light at output from the first layer toward the second layer relative to a wavefront of the light at incidence to the first layer from outside of the first layer, and
changes, according to the directions of orientation of the first structural bodies, the wavefront of the light at output from the first layer toward the outside of the first layer relative to a wavefront of the light at incidence to the first layer from the second layer, the first structural bodies of the first layer have the same birefringence, the first layer has a retardation of no less than $3\lambda c(2m+1)/8$ and no greater than $5\lambda c(2m+1)/8$, and where $\lambda c$ represents a wavelength of light entering the first layer, and "m" represents an integer of equal to or greater than 0.

18. An optical element comprising:

a first layer; and a second layer that faces the first layer, wherein the first layer includes a plurality of first structural bodies that each have optical anisotropy, in reflection of light entering from the first layer, the second layer reflects the light while maintaining a polarization state of the light at incidence and at the reflection, the first layer changes, according to directions of orientation of the first structural bodies, a wavefront of the light at output from the first layer toward the second layer relative to a wavefront of the light at incidence to the first layer from outside of the first layer, and changes, according to the directions of orientation of the first structural bodies, the wavefront of the light at output from the first layer toward the outside of the first layer relative to a wavefront of the light at incidence to the first layer from the second layer, the second layer includes:

a ¼ wavelength layer that faces the first layer; and a reflection layer that faces the ¼ wavelength layer and that reflects light, and the ¼ wavelength layer has a retardation equal to a ¼ wavelength of light.

* * * * *